United States Patent
Graves et al.

(10) Patent No.: US 6,606,427 B1
(45) Date of Patent: Aug. 12, 2003

(54) SWITCH FOR OPTICAL SIGNALS

(75) Inventors: Alan F. Graves, Kanata (CA); Nigel Baker, Harlow (GB); Peter Roorda, Hertford (GB); Robert William Spagnoletti, Hertford (GB)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/511,065

(22) Filed: Feb. 23, 2000

(30) Foreign Application Priority Data

Oct. 6, 1999 (CA) .............................................. 2285128

(51) Int. Cl.⁷ ................................................ G02B 6/35
(52) U.S. Cl. ........................................ 385/17; 359/128
(58) Field of Search .............................. 385/17, 16, 18, 385/24; 359/124, 127, 128

(56) References Cited

U.S. PATENT DOCUMENTS

| | | | | |
|---|---|---|---|---|
| 5,727,102 A | | 3/1998 | Jeong et al. ................... | 385/59 |
| 5,799,122 A | | 8/1998 | Jeong et al. ................... | 385/59 |
| 5,838,856 A | | 11/1998 | Lee .............................. | 385/54 |
| 5,841,917 A | * | 11/1998 | Jungerman et al. ........... | 385/17 |
| 5,878,177 A | * | 3/1999 | Karasan et al. ............... | 385/17 |
| 6,061,482 A | * | 5/2000 | Davis ........................... | 385/17 |
| 6,249,620 B1 | * | 6/2001 | Simeonidou et al. ......... | 385/16 |
| 6,320,995 B1 | * | 11/2001 | Schroeder ..................... | 385/17 |

OTHER PUBLICATIONS

Lee. Kwo–Chun and Li, V. O., "A Wavelength–Convertible Optical Network," Journal of Lightwave Technology, v11, No. 5/6, May/Jun. 1993.*

Alexander, et al., "A Precompetitive Consortium on Wide–Band All–Optical Networks," Journal of Lightwave Technology, v. 11, pp. 714–735 (May/Jun. 1993).*

Lin, et al., "Free–Space Micromachined Optical Switches with Submillisecond Switching Times for Large–Scale Optical Crossconnects," IEEE Photonics Tech. Letters, vol. 10, No. 4, pp 525–527 (Apr. 1998).*

(List continued on next page.)

*Primary Examiner*—Brian Healy
*Assistant Examiner*—Sarah U Song

(57) ABSTRACT

A cross-connect switch for switching optical signals, in particular, Dense Wavelength Division Multiplexed (DWDM) signals is disclosed. The switch includes a switching matrix for each of the predetermined wavelengths of the DWDM signals. The switching matrices include Micro-Electro-Mechanical (MEM) systems which have optically reflective elements, typically mirrors, arranged in rows and columns for switching an incoming optical signal travelling along a row of such elements to an output port aligned with a column of the elements. The switch has input demultiplexers to split an incoming DWDM signal into its component channel wavelengths, each of which is directed to a switching matrix where it is switched to an output port and recombined into an outgoing DWDM signal by a multiplexer before being transmitted out of the switch. A wavelength-converting switch, connected across the switching matrices, is also included for switching channels between wavelengths.

40 Claims, 35 Drawing Sheets

OTHER PUBLICATIONS

Lin, et al., "Free–Space Micromachined Optical Switches for Optical Networking," IEEE J. Selected Topics on Quantum Elec., vol. 5, No. 1, pp 4–9 (Jan./Feb. 1999).*

Brackett, et al., "A Scaleable Multiwavelength Multihop Optical Network: A Proposal for Research on All–Optical Networks," J. Lightwave Technology, vol. 11, No. 5/6, pp 736–753 (May/Jun. 1993).*

Lin, et al., "On the Expandability of Free–Space Micromachined Optical Cross Connects," J. Lightwave Technology, vol. 18, No. 4, pp 482–489 (Apr. 2000).*

Lin, et al., "Integrated Signal Monitoring and Connection Verification in MEMS Opical Crossconnects," IEEE Photonics Letters, vol. 12, No. 7, pp 885–887 (Jul. 2000).*

Lin, et al., "Angular–Precision Enhancement in Free–Space Micromachined Optical Switches," IEEE Photonics Tech. Letters, vo 11, No. 18, pp 1253–1255 (Oct. 1999).*

Kobrinski, H., "Corssconnection of Wavelength–Division Multiplexed High–Speed Channels," Electronic Letters, vol. 23, pp 974 976 (Aug. 1987).*

Chidgey, P. J.., and Hill, G. R., "Experimental Demonstration of Wavelength Routed Optical Networks Over 52km of Monomod Optical Fibre," Electronics Letters, vol. 25, No. 21, pp 1451–1452 (Oct. 1989).*

Sato, et al., "Network Performance and Integrity Enhancement with Optical Path Layer Tehcnologies," IEEE J. on Selected Area in Communications, vol. 12, No. 1, pp 159–170 (Jan. 1994).*

"'Seesaw' Swtich is First Practical Micro–Electro–Mechanical Optical Switch," BellSourth Press Release (Feb. 1999).*

Lin, L.Y., "Free–Space Micromachined Optical–Switching Technologies and Architectures", AT&T Labs–Research, OFC99, Session W14–1, Feb. 24/99, pp. 154–156.

* cited by examiner

TABLE 1
*Interconnect A*

| Inputs: | Outputs: |
|---|---|
| Bank1 | OXC_A |
| λ1,λ6,λ11,λ16 … λ156 | OXC1(I1,I2,I3,I4 … I32) |
| λ2,λ7,λ12,λ17 … λ157 | OXC2(I1,I2,I3,I4 … I32) |
| λ3,λ8,λ13,λ18 … λ158 | OXC3(I1,I2,I3,I4 … I32) |
| λ4,λ9,λ14,λ19 … λ159 | OXC4(I1,I2,I3,I4 … I32) |
| λ5,λ10,λ15,λ20 … λ160 | OXC5(I1,I2,I3,I4 … I32) |

TABLE 2
*Interconnect B*

| Inputs: | Outputs: |
|---|---|
| Bank2 | OXC_B |
| λ1,λ6,λ11,λ16 … λ156 | OXC1(I1,I2,I3,I4 … I32) |
| λ2,λ7,λ12,λ17 … λ157 | OXC2(I1,I2,I3,I4 … I32) |
| λ3,λ8,λ13,λ18 … λ158 | OXC3(I1,I2,I3,I4 … I32) |
| λ4,λ9,λ14,λ19 … λ159 | OXC4(I1,I2,I3,I4 … I32) |
| λ5,λ10,λ15,λ20 … λ160 | OXC5(I1,I2,I3,I4 … I32) |

FIG. 13

TABLE 3

*Interconnect C*

Inputs:

OXC_A

| | |
|---|---|
| OXC1(O1-O10; O11-O20; O21-O30; O31, O32) | |
| OXC2(O1-O10; O11-O20; O21-O30; O31, O32) | |
| OXC3(O1-O10; O11-O20; O21-O30; O31, O32) | |
| OXC4(O1-O10; O11-O20; O21-O30; O31, O32) | |
| OXC5(O1-O10; O11-O20; O21-O30; O31, O32) | |

OXC_B:

| |
|---|
| OXC1(O1-O10; O11-O20; O21-O30; O31, O32) |
| OXC2(O1-O10; O11-O20; O21-O30; O31, O32) |
| OXC3(O1-O10; O11-O20; O21-O30; O31, O32) |
| OXC4(O1-O10; O11-O20; O21-O30; O31, O32) |
| OXC5(O1-O10; O11-O20; O21-O30; O31, O32) |

Outputs:

WAVELENGTH CONVERTOR

TABLE 4
Interconnect D

| Inputs: WAVELENGTH CONVERTOR | Outputs: BANK1 |
|---|---|
| G1(O1-O16) | λ1-λ16 |
| G2(O1-O16) | λ17-λ32 |
| G3(O1-O16) | λ33-λ48 |
| G4(O1-O16) | λ49-λ64 |
| G5(O1-O16) | λ65-λ80 |
| G6(O1-O16) | λ81-λ96 |
| G7(O1-O16) | λ97-λ112 |
| G8(O1-O16) | λ113-λ128 |
| G9(O1-O16) | λ129-λ144 |
| G10(O1-O16) | λ145-λ160 |
| | BANK2 |
| G1(O17-O32) | λ1-λ16 |
| G2(O17-O32) | λ17-λ32 |
| G3(O17-O32) | λ33-λ48 |
| G4(O17-O32) | λ49-λ64 |
| G5(O17-O32) | λ65-λ80 |
| G6(O17-O32) | λ81-λ96 |
| G7(O17-O32) | λ97-λ112 |
| G8(O17-O32) | λ113-λ128 |
| G9(O17-O32) | λ129-λ144 |
| G10(O17-O32) | λ145-λ160 |

FIG. 15

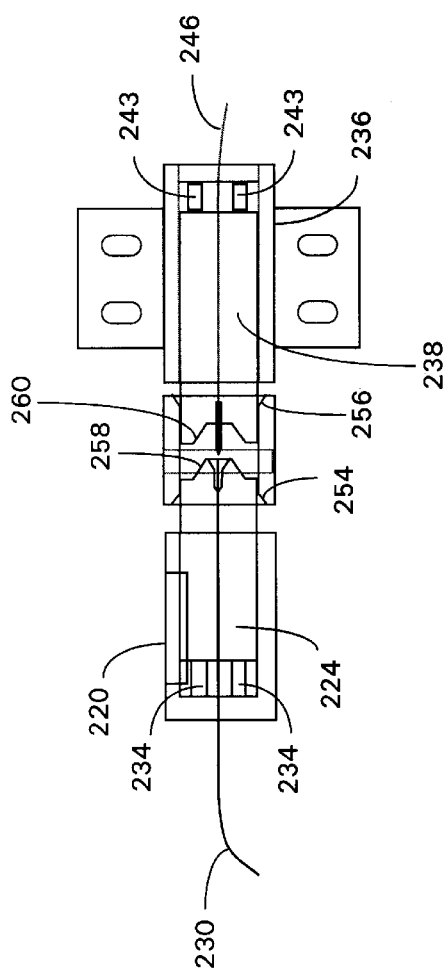
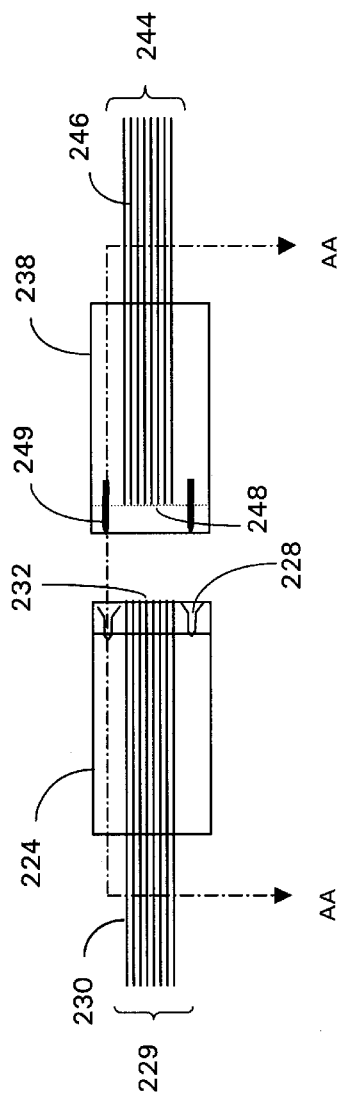
FIG. 18a
FIG. 18b

SWITCH FOR OPTICAL SIGNALS

FIELD OF THE INVENTION

This invention relates to optical switches and is particularly concerned with switches for switching optical signals composed of light of predetermined wavelengths, for example, Dense Wavelength Division Multiplexed (DWDM) optical signals used in optical telecommunications.

BACKGROUND OF THE INVENTION

Optical transmission systems achieve their end-to-end connectivity by concatenating multiple spans between intermediate switching nodes to achieve an overall end-to-end path. When the end-to-end granularity of any given transmission path is a fraction of the capacity of a given optical carrier, time division multiplexing is used to share the overall bandwidth, mandating the use of electronic switching in the intermediate nodes. However, the availability of Dense Wavelength Division Multiplexing (DWDM), combined with the availability of high capacity ports on data switches and routers, has increased the demand for concatenation of individual spans to make end-to-end connections at the wavelength level.

DWDM optical networks transmit multiple channel signals on each optical fiber in the network; each channel signal is modulated light of a predetermined wavelength allocated only to that signal. The result is a plurality of optical carriers on each optical fiber, each optical carrier carrying a channel signal separated from other carriers in optical wavelength. Current DWDM optical networks typically convert channel signals into electrical signals at every switching node in the network because optical switches having sufficiently large enough port counts are not available. To convert the channel signals to electrical signals, transponders are used at every port of the switching node and for every channel wavelength. As DWDM signals become denser, that is, as the number of channels per optical fiber increases, the required accuracy of the transponders, and hence the cost, also increases. Moreover, as the number of ports per switching node increases, the required number of transponders also increases. Consequently, large networks carrying dense DWDM signals require many costly transponders and are therefore costly to build.

To overcome this problem it has been proposed to build large, purely optical switches in various forms, to reduce or eliminate the need for opto-electronic conversion in order to switch channel signals electrically. Some effort has gone into conceiving methods of building very large switches that offer full connectivity between all their ports. However, fabrication of these large optical switches has proven difficult.

Many attempts to create a large non-blocking optical switch use a large number of small switch modules to create a multiple stage switch. One example of this envisages building a 128 port×128 port switch out of three stages of multiple 16×16 crosspoint matrices, or a 512×512 port switch out of three stages of multiple 32×32 crosspoint matrices, in a three stage CLOS architecture. The above is based on the availability of 16×16 or 32×32 switch matrices in the form of Micro-Electro-Mechanical (MEM) switch matrices (e.g. "Free-space Micromachined Optical-Switching Technologies and Architectures", Lih Y. Lin, AT&T Labs-Research, OFC99 Session W14-1, Feb. 24, 1999). Other multi-stage approaches use smaller matrices and more stages. Even the 3 stage CLOS architecture is limited to 512–1024 switched wavelengths with 32×32 switch matrix modules, which, in today's 160 wavelength per fiber DWDM environment, is only adequate to handle the output/input to 3–6 fiber pairs (480–960 wavelengths). Furthermore, the optical loss through each crosspoint stage (typically ~5 dB with a 16×16 or 32×32 MEMs device) is compounded by the use of three stages, plus a complex interconnect, to provide switch losses in the range of 15–18 dB.

Such multi-stage switches, even at three stages, have significant problems. These problems include high overall optical loss through the switch, since the losses in each stage are additive across the switch, and there is the potential for additional loss in the complex internal interconnect between the stages of the switch. Size limitations in terms of the number of wavelengths switched can be overcome by going to a five stage CLOS switch, but this further increases the loss through the switch as well as adding to its complexity and cost. Using current loss figures, the loss through a 5-stage switch would be in the order of 25–30 dB. This amount of loss is at or beyond the operating link budget of modern high-bandwidth transponders. In addition, one of the major cost-centres is the cost of the MEMs switch modules (or other small matrix modules). Sensitivity of the overall switch cost to the cost of the MEMS modules is exacerbated by the fact that a CLOS switch requires a degree of dilation (i.e. extra switch paths) to be non-blocking and that each optical path has to transit three (or five) individual modules in series.

In U.S. Pat. No. 5,878,177 entitled "Layered Switch Architectures for High-Capacity Optical Transport Networks" and issued to Karasan et al., on Mar. 2, 1999, another approach is disclosed. This approach relies on providing signals received by a switching node with access to any route leaving the node, but not access to every signal path (fiber) on those routes. In this way, Karasan's switching node avoids the large number of switch points that a fully interconnected, or fully non-blocking, switch fabric would require. Although this approach may be adequate at the node level, or even for small networks, it adds further complexity to network planning, which would become increasingly difficult with larger networks.

Some prior art approaches attempt to generate large, general purpose, non-blocking switches, which are then coupled to DWDM multiplexers for coupling into output fibers. This results in substantial waste of the capacity and capability of the non-blocking generic switches, since the DWDM multiplexers are themselves blocking elements on all their ports to any optical carrier except an optical carrier within the specific passband of that port of the multiplexer. Hence the non-blocking switch structure contains many crosspoints that direct specific input ports carrying a given wavelength to output ports that cannot support that wavelength, since it would be blocked in the WDM multiplexer. Such crosspoints cannot be used in operation of the switch, and this wasting of crosspoints makes inefficient use of expensive optical switching matrices.

Optical transmission networks that rely on electrical switching and electrical regeneration at intermediate nodes require one pair of transponders per wavelength channel at each intermediate switching node. Consequently, as the number of wavelength channels per fiber grows, the number of transponders and the resulting costs grow in proportion to the number of wavelength channels.

Optical transmission networks that rely on "opaque" optical switching and electrical regeneration at intermediate nodes experience the same growth in transponder number and cost. (In "opaque" optical switching, incoming optical signals are converted by transponders into different optical signals that are switched optically before being converted by further transponders to different optical signals for further transmission.)

However, in optically switched networks that use cascaded optical amplifiers to compensate for fiber loss on each span and for optical insertion loss of the optical switches, each optical amplifier simultaneously amplifies all wavelength channels on each fiber without the use of transponders. Consequently, the number and cost of the optical amplifiers does not grow with the number of wavelength channels per fiber, and the cost benefits of optically switched and amplified networks relative to electrically switched and regenerated networks increases with the number of wavelength channels per fiber.

Moreover, the cost advantages of optically switched and amplified networks over electrically switched and regenerated networks grow even faster as the maximum distance between electrical regeneration points grows, because optically switched and amplified networks can benefit from that increased optical reach by eliminating transponders. In contrast, electrically switched networks require a pair of transponders per wavelength channel at each intermediate switching point even if the optical range exceeds the distance between switching points.

Consequently, there is a substantial advantage in designing optical transmission networks such that the majority of wavelength channels can be routed end-to-end via optical switches and optical amplifiers, without the use of transponders on a per channel wavelength basis at intermediate sites or nodes. This leads to a need, previously unaddressed, for an optical cross-connect switch optimized for establishing per-wavelength paths from end-to-end, as opposed to a large opaque optical switching fabric designed to be located between banks of transponders.

SUMMARY OF INVENTION

This invention aims to provide an improved cross-connect switch which is well adapted for application to high capacity Wavelength Division Multiplexed (WDM) and Dense WDM (DWDM) transmission networks.

A first aspect of the invention provides a cross-connect switch comprising a plurality of switching matrices and a wavelength-converting inter-matrix switch. Each switching matrix has multiple input ports, multiple output ports, at least one inter-matrix input port and at least one inter-matrix output port. Each switching matrix is operable to switch an optical channel signal arriving on any input port to either any one of a plurality of the output ports or an inter-matrix output port. Each switching matrix is also operable to switch an optical channel signal arriving on any inter-matrix input port to an output port. Each switching matrix is further operable to switch optical channel signals having a respective distinct wavelength. The wavelength-converting inter-matrix switch is connected between the inter-matrix output ports of the switching matrices and the inter-matrix input ports of the switching matrices. The inter-matrix switch is operable to switch a channel signal arriving from any inter-matrix output port of any switching matrix to an inter-matrix input port of any of a plurality of other switching matrices. In switching a first channel signal having a first wavelength from an inter-matrix output port of a first switching matrix to an inter-matrix port of a second switching matrix, the wavelength-converting inter-matrix switch is operable to convert the first channel signal having the first wavelength to a second channel signal having a second wavelength.

Preferably, each switching matrix is operable to switch a channel signal arriving on any input port to any of the output ports. Furthermore, in such switches, the inter-matrix switch is operable to switch a channel signal arriving from any inter-matrix output port of any switching matrix to an inter-matrix input port of any of the other switching matrices. In this way, when networked together, such cross-connect switches provide increased flexibility in switching channel signals, thereby reducing the complexity of network planning as compared to other approaches.

This arrangement between the switching matrices and the intermatrix switch enables the assignment of each switching matrix to a respective channel wavelength of a WDM system. Channel signals having a particular wavelength can be routed through the cross-connect switch in the switching matrix assigned to that respective wavelength. Because this routing is through a single optical switching matrix, the optical loss can be relatively low.

When the next span of an end-to-end path does not have a particular channel wavelength available for a channel signal, the channel signal needs to be cross-connected to another channel wavelength. This cross-connection requires transponders to perform the necessary optical carrier wavelength conversion. This can be done by routing the channel signal, of a first channel wavelength, through a first switching matrix assigned to the first wavelength, to an inter-matrix output port of the first switching matrix. The channel signal is then routed from the inter-matrix output port of the first switching matrix to the wavelength-converting inter-matrix switch. The wavelength-converting inter-matrix switch converts the channel signal of the first wavelength to a channel signal of a second wavelength. The channel signal of the second wavelength is then routed to an inter-matrix input port of a second switching matrix, which is assigned to the second wavelength. The channel signal of the second wavelength is then routed to an output port of the second switching matrix, which completes the routing through the cross-connect switch to the next span, as required. Since wavelength conversion is only done as necessitated by network constraints, the cross-connect switch requires substantially fewer transponders than switches that convert all channel signals to electrical signals, or to a common channel wavelength, prior to switching.

Each switching matrix may have multiple inter-matrix output ports, and the wavelength-converting inter-matrix switch may comprise multiple switching elements connected in parallel. In this case, each inter-matrix output port of a particular switching matrix may be coupled to a respective one of the switching elements of the wavelength-converting inter-matrix switch. This arrangement provides multiple paths for routing a signal from one switching matrix through the inter-matrix switch to another switching matrix, thereby reducing potential for blocking in the inter-matrix switch.

Moreover, the physical interconnection between the multiple switching elements and the plurality of switching matrices may be accomplished efficiently by orienting the switching elements into a first set of parallel planes that are orthogonal to a second set of parallel planes into which the switching matrices have been oriented. For example, the switching matrices could be implemented on horizontally oriented switching cards and the switching elements fabricated on vertically oriented convertor cards, or vice versa. This physical arrangement allows the two orthogonal sets of parallel planes to be intersected by a third orthogonal plane, orthogonal to both sets of parallel planes, whereby each switching matrix of the second set of parallel planes can be brought into a proximal relationship, and optically interconnected, with each switching element of the first set of parallel planes. For example, a midplane representing the third orthogonal plane can be used to guide the switching cards and the convertor cards into a close physical arrangement, in which the switching and convertor cards can be optically interconnected with appropriate optical connectors on the cards and the midplane.

The inter-matrix switch may comprise at least one "add" input port and at least one "drop" output port. In this case, the inter-matrix switch is operable to couple an "add" input channel signal arriving at the "add" input port to an inter-matrix input port of any switching matrix, and to couple a channel signal arriving from an inter-matrix output port of any switching matrix to the "drop" output port. These features enable the cross-connect switch to "add" channel signals (i.e. to insert traffic signals at the cross-connect switch) and "drop" channel signals (i.e. extract traffic signals at the cross-connect switch) in addition to routing through channel signals.

The cross-connect switch may further comprise a plurality of wavelength division demultiplexers and a plurality of wavelength division multiplexers. Each demultiplexer is operable to separate an optical input signal into a plurality of output channel signals having respective distinct wavelengths. The demultiplexer applies each output channel signal to a respective input port of a respective switching matrix such that each switching matrix receives only channel signals having a respective distinct wavelength. Each multiplexer has a plurality of inputs, each respective input of each multiplexer being coupled to an output port of a respective switching matrix to receive a respective channel signal having a respective wavelength. Each multiplexer is operable to combine channel signals having distinct wavelengths into an optical output signal.

Such wavelength division demultiplexers and wavelength division multiplexers are normally associated with the cross-connect switch and may be packaged as part of the cross-connect switch. In this case, the wavelength division multiplexers and demultiplexers, implemented either separately or in combination on circuit cards, could have an orthogonal physical relationship with the plurality of switching matrices, in order to achieve efficiency in interconnection as described earlier. The demultiplexer receives an optical signal comprising multiple channel signals, each channel signal comprising an optical carrier at a respective distinct wavelength having a respective traffic signal modulated on the carrier signal. The demultiplexer separates the channel signals onto respective outputs for coupling to the switching matrices, each switching matrix receiving only channel signals at one of the distinct wavelengths. The multiplexer receives multiple channel signals, each having a different respective wavelength from respective switching matrices and combines the multiple channel signals for transmission on a single output fiber. In this arrangement, every cross-point of every switching matrix is usable, i.e. none of the cross-points route channel signals at a particular wavelength to a WDM multiplexer port that is unable to pass channel signals at that wavelength.

The wavelength-converting inter-matrix switch may comprise multiple optical receivers, multiple optical transmitters and an electrical switch connected between the optical receivers and the optical transmitters. The optical receivers are coupled to inter-matrix output ports of the switching matrices, and are operable to convert channel signals arriving from the inter-matrix output ports to electrical signals. The electrical switch is operable to switch electrical signals from any optical receiver to a plurality of the optical transmitters. The optical transmitters are operable to convert electrical signals to channel signals having predetermined wavelengths.

In most practical wavelength-converting inter-matrix switches, the electrical switch is operable to switch electrical signals from any optical receiver to any or substantially any optical transmitter. The electrical switch may be a single electrical switching element or multiple electrical switching elements connected in series or in parallel.

In this arrangement, the electrical switch is used to couple a receiver connected to a switching matrix assigned to a first wavelength to a transmitter operating at a second wavelength and connected to a switching matrix assigned to the second wavelength, thereby crossconnecting a channel operating at the first wavelength to a channel operating at the second wavelength.

Alternatively, the wavelength-converting inter-matrix switch may comprise an optical switch, and a plurality of optical transponders connected to the switch. Each optical transponder is operable to convert a channel signal having a first wavelength into a channel signal having a second wavelength. The optical switch is operable to couple a channel signal arriving from an inter-matrix output port of any switching matrix to an inter-matrix input port of any of a plurality of other switching matrices via an optical transponder.

The optical transponder may be a device having a receive half for recovering an information signal from the incoming wavelength channel, and a transmit half, having means to modulate the recovered information signal onto a light source of a specific, fixed or tunable, wavelength for output on a different wavelength channel. The optical switch may comprise a single optical switching element or multiple optical switching elements connected in series or in parallel for load sharing.

In most practical wavelength-converting inter-matrix switches, the optical switch is operable to couple a channel signal arriving from an intermatrix output port of any switching matrix to an inter-matrix input port of any or substantially any other switching matrix.

The optical switch may be coupled between the inter-matrix output ports and the optical transponders. In this arrangement, the optical switch is used to couple a first channel operating at a first wavelength to a selected transponder that converts the signal on the first channel to a signal at a second wavelength. The transponder is connected to an intermatrix input port of the switching matrix that is assigned to the second wavelength.

Alternatively, the optical switch may comprise plural optical switching stages and the optical transponders may be coupled between optical switching stages. For example, the optical switch may comprise a multistage optical CLOS switch. The relatively high insertion loss of a multistage optical switch is acceptable in the inter-matrix switch because the inter-matrix switch includes transponders that restore the optical signal level as they convert an optical signal at one wavelength to an optical signal at another wavelength. However attention must be paid to an overall system loss budget to keep all components operating within their specified range.

Some or all of the optical transponders may be tunable to transmit channel signals of selectable distinct wavelengths.

The use of tunable transponders reduces the number of transponders that need to be provided to allow for all possible wavelength conversion possibilities. Each tunable transponder can be provisioned remotely for any of a number of wavelength channels without requiring a visit to the switching site to physically provision a wavelength channel. It can be demonstrated statistically that a number of tunable transponders can provide more combinations of channel configurations than the same number of fixed wavelength transponders. Moreover, the use of tunable transponders reduces the number of different transponder types that must be stocked and inventoried.

However, tunable transponders are more expensive than fixed wavelength transponders and currently have limited tuning range. Consequently, some or all of the transponders may be fixed wavelength transponders that are operable to transmit channel signals of a single wavelength. Alternatively the tunable transponders may be arranged in groups, each group covering the ports associated with a specific wavelength band.

Another aspect of the invention provides an optical switching matrix comprising first and second pairs of switching elements and a plurality of optical combiners. Each pair of switching elements comprises a first switching element and a second switching element. Each switching element comprises a rectangular substrate having a plurality of input ports on a first side, a first plurality of output ports on a second side opposite the first side and a second plurality of output ports on a third side adjacent the first side and the second side. Each switching element further comprises a plurality of optical diverters aligned between each input port and a corresponding output port on the second side. Each diverter is aligned with a respective output port on the third side and is movable from a first position, in which the diverter allows an optical signal incident from the input port to propagate in a direction toward the respective output port on the second side, to a second position, in which the diverter diverts an optical signal incident from the input port toward a respective output port on the third side. For each of the first and second pairs of switching elements, each input port of the second optical switching element is optically coupled to a respective output port of the first optical switching matrix. Each combiner is coupled to a respective output port of the first pair of optical switching elements and to a respective output port of the second pair of optical switching elements.

Construction of larger switching matrices by assembly of smaller switching matrices as described above, may be attractive until switching matrices of the desired port count are readily available at attractive prices. Moreover, the ability to assemble larger switching matrices from smaller switching matrices enables modular construction of cross-connect switches so that the size of the switch (and its installed cost) can grow gracefully with capacity demands.

Accordingly, another aspect of the present invention provides a plurality of switching matrices, each switching matrix being assignable to a respective channel wavelength, as well as having multiple input and output ports and at least one pair of inter-matrix input and output ports. Additionally, each switching matrix has an expansion port for coupling to an input port of an extension-switching matrix, which is also assignable to the respective channel wavelength. In this way, each switching matrix can be extended, thereby increasing its switching capacity and further increasing the switching capacity of the cross-connect switch that includes the extended switching matrices. For example, the size of a switching matrix could originally be 32×32 and an extension switching matrix of the same size could be coupled to it, via the expansion port, to result in an extended switching matrix of size 32×64. A cross-connect switch having a plurality of these extended switching matrices could be coupled, via optical combiners, to another cross-connect switch having a similar plurality of extended switching matrices. This would result in a combined cross-connect switch with double the switching capacity and port count of either of the original cross-connect switches.

Another aspect of the invention provides a wavelength-converting switch for interconnecting optical switching matrices of an optical cross-connect switch, the wavelength-converting switch comprising an optical switch and a plurality of optical transponders connected to the switch. Each optical transponder is operable to convert a channel signal having a first wavelength into a channel signal having a second wavelength. The optical switch is operable to couple a channel signal arriving from an inter-matrix output port of any switching matrix to an inter-matrix input port of any of a plurality of other switching matrices via an optical transponder.

The wavelength-converting switch can be used in the construction of some embodiments of the cross-connect switch described above.

Another aspect of the invention provides a switching fabric for an optical cross-connect switch. The switching fabric comprises a plurality of optical switching matrices. Each switching matrix has multiple internode input ports and at least one intra-node input port for receiving incoming optical channel signals, the incoming optical channel signals having a wavelength that is particular to that particular switching matrix. Each switching matrix also has multiple through output ports and at least one intra-node output port. Each switching matrix is operable to switch optical channel signals arriving on any input port to any of a plurality of the through output ports and the intra-node output port.

In most practical switching fabrics, each switching matrix will be operable to switch optical channel signals arriving on any input port to any or substantially any of the output ports.

The switching fabric may further comprise an add/drop multiplexer coupled to the intra-node input port and intra-node output port of each switching matrix. The add/drop multiplexer is operable to couple, to the intra-node input port of any switching matrix of the plurality of switching matrices, optical channel signals having the wavelength that is particular to that switching matrix. The add/drop multiplexer is also operable to receive, from the intra-node output port of any switching matrix of the plurality of switching matrices, optical channel signals having the wavelength that is particular to that switching matrix.

Another aspect of the invention provides a method of cross-connecting optical channel signals at an optical cross-connect switch comprising a plurality of switching matrices. The method comprises coupling each optical channel signal having a particular wavelength to an input port of a particular switching matrix assigned to that particular wavelength, and switching the optical channel signal in the particular switching matrix to an output port selected according to a desired cross-connection of the optical channel signal.

The optical channel signal may be switched to an intra-node output port of the particular switching matrix when the optical channel signal is to be cross-connected to an optical channel having a wavelength other than the particular wavelength of the optical signal. In this case, the optical signal may be coupled from the intra-node output port to a wavelength converter for conversion to an optical channel signal having another wavelength. The optical signal at the other wavelength can be coupled to an intra-node input port of another switching matrix, the other switching matrix being assigned to that other wavelength. The other switching matrix can switch the optical channel signal to an output port selected according to the desired cross-connection of the optical channel signal.

The optical channel signal may also be switched to an intra-node output port of the particular switching matrix when the optical channel signal is to be dropped at the cross-connect switch.

According to another aspect of the invention, the invention provides an optical connection system for optically connecting circuit cards via a midplane. The interconnect includes a first connector for connecting a first plurality of optical fibers coupled to a first circuit card. The first connector has a first mounting means for mounting the first connector adjacent an edge of the first circuit card.

A second connector is included for connecting a second plurality of optical fibers coupled to a second circuit card. The second connector has a second mounting means for mounting the second connector adjacent an edge of the second circuit card. A first mating insert, disposed in the first connector, is included for aligning the first plurality of optical fibers in an optically coupled relationship with the second plurality of optical fibers. A second mating insert, disposed in the second connector, is included for aligning the second plurality of optical fibers in an optically coupled relationship with the first plurality of optical fibers. Finally, an alignment ferrule is included for mounting in an opening in the midplane. The alignment ferrule has an aperture for receiving the first mating insert on one side of the alignment ferrule and the second mating insert on the other side of the alignment ferrule. The aperture in the alignment ferrule is oriented to pass through the opening in the midplane when the alignment ferrule is mounted therein.

The alignment ferrule provides a means to align the mating inserts such that the final alignment features of the connectors, in this case a pair of guide pins with corresponding sockets, can engage and provide the final alignment of the optical fiber ends at the faces of the mating inserts. The final alignment features provide translational alignment along orthogonal axis parallel to the faces, as well as rotational alignment about an axis perpendicular to the faces such that the multi-fiber ribbon cables can be optically aligned.

According to yet another aspect of the present invention there is provided an optical network comprising at least one optical cross-connect switch wherein optical fibers couple the optical switching matrices to the optical network via the input and output ports. Alternatively, or additionally, where the optical cross-connect switch includes the wavelength division multiplexers and demultiplexers, optical fibers couple the wavelength division multiplexers and demultiplexers to the optical network for respectively transmitting and receiving optical output and input signals.

According to still another aspect of the present invention there is provided a method of upgrading an optical cross-connect switch having a plurality of switching matrices, each switching matrix assigned to a respective channel wavelength and having multiple input and output ports, the method comprising the steps of: providing each switching matrix with an expansion port; providing a plurality of extension switching matrices, each extension switching matrix having multiple input and output ports; and coupling a respective extension switching matrix to each switching matrix, via the expansion port and at least one of the input ports of the respective extension switching matrix, to form a plurality of expanded switching matrices.

Additionally, the optical cross-connect switch may be upgraded further by providing another similarly upgraded optical cross-connect switch having a plurality of the expanded switching matrices; and coupling each output port of an expanded switching matrix of the optical cross-connect switch to a respective output port of an expanded switching matrix of the another optical cross-connect switch.

Other aspects of the invention comprise combinations and subcombinations of the features described above other than the combinations described above.

BRIEF DESCRIPTION OF THE DRAWINGS

Embodiments of the invention are described below, by way of example only, with reference to the drawings in which:

FIG. 4b depicts an embodiment of a physical arrangement for the wavelength-converting switch of FIG. 4a;

FIG. 4e depicts another embodiment of a physical arrangement for the wavelength-converting switch of FIG. 4a;

FIG. 13 is a table of connections made by the interconnects A and B in FIG. 11;

FIG. 14 is a table of connections made by the interconnect C in FIG. 11;

FIG. 15 is a table of connections made by the interconnect D in FIG. 11;

FIG. 18a is a line drawing plan view of the optical connectors of FIG. 17 showing the connectors in a nearly connected position;

FIG. 18b is a side view of a portion of the connectors of FIG. 18a showing fiber polished at the face of each connector mating insert and alignment pins and sockets;

DETAILED DESCRIPTION

Figure 1A:
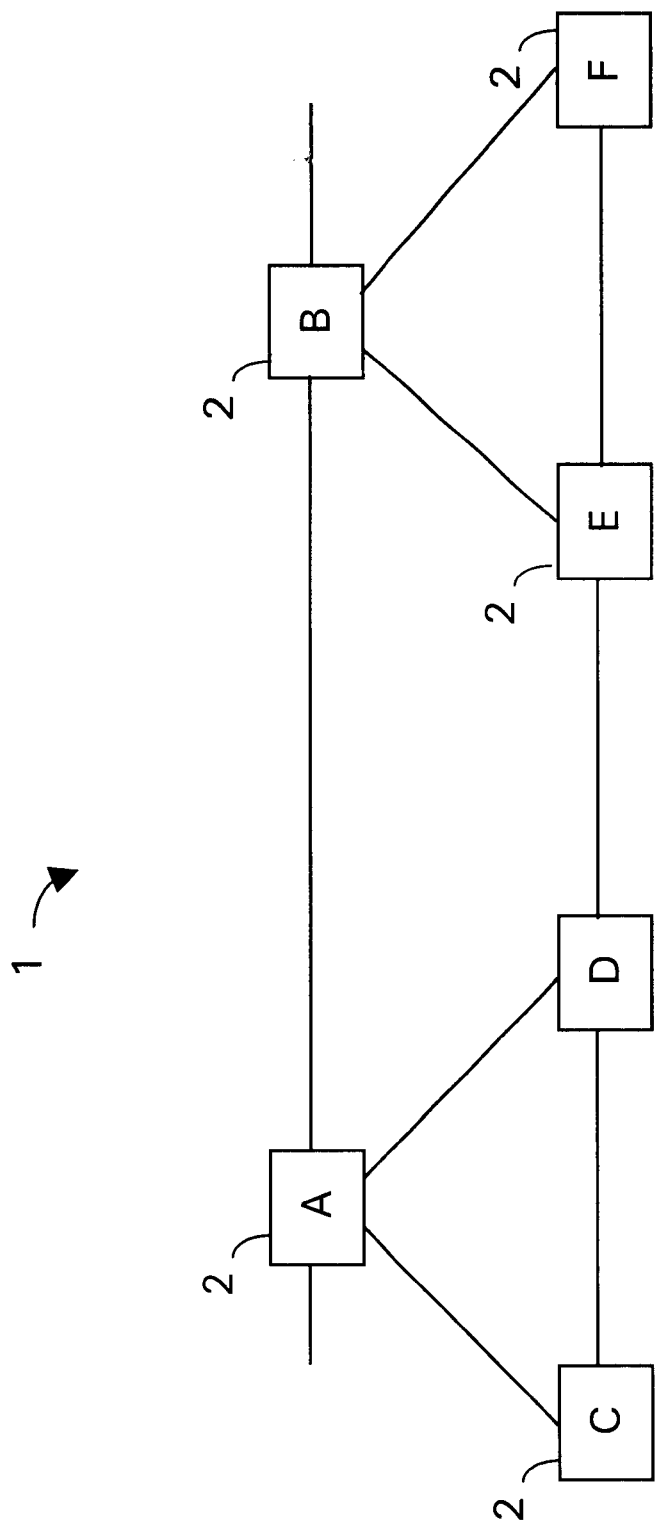
FIG. 1a is a diagram of a prior art optical network.
Figure 1B:
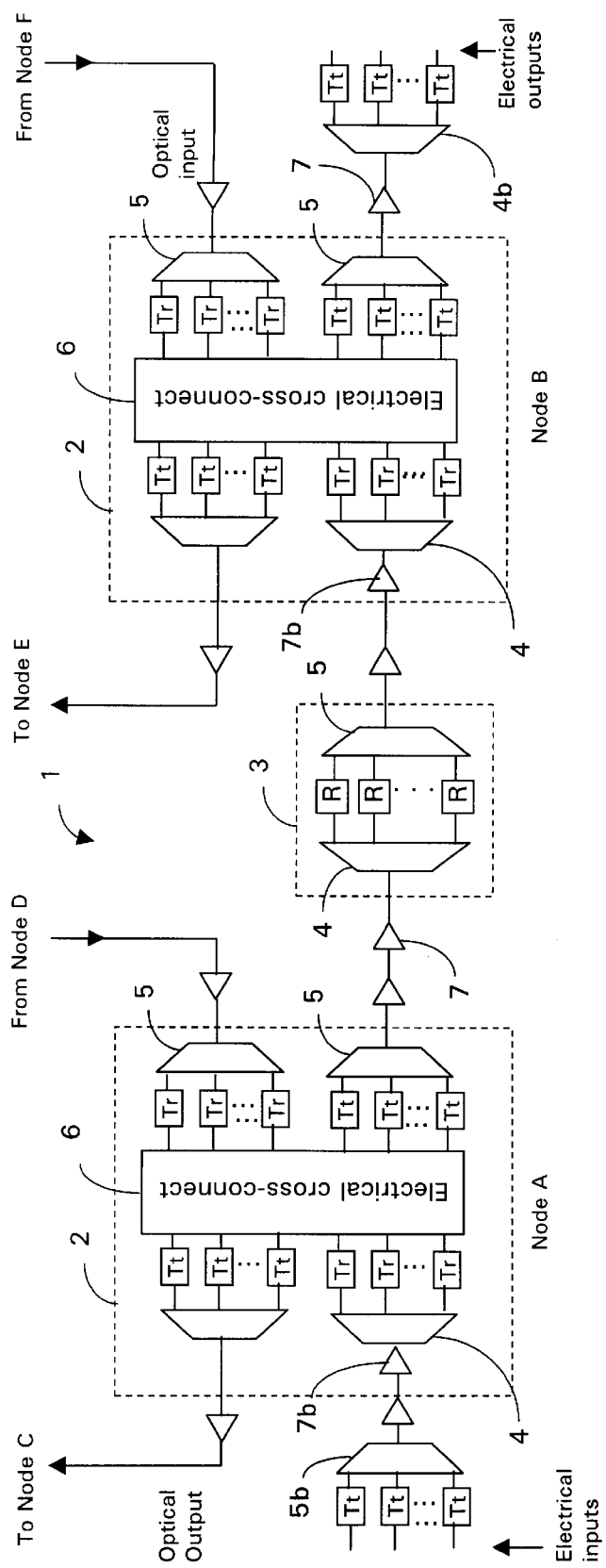
FIG. 1b is a diagram showing the nodes A and B of FIG. 1a in greater detail.
Figure 1C:
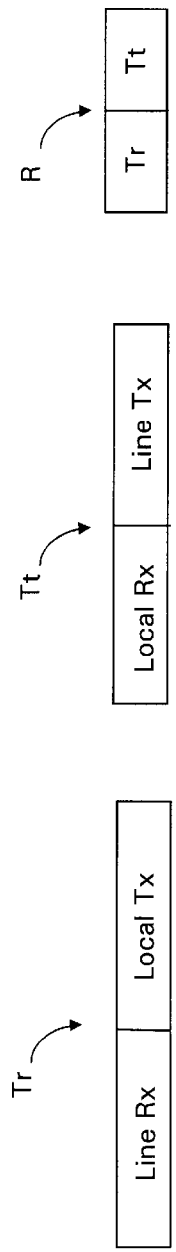
FIG. 1c is a diagram showing the transponders and regenerators of FIG. 1b in greater detail.

Referring to FIGS. 1a to 1c a prior art optical network 1 will now be described. In FIG. 1a a network 1 includes six interconnected electrical or opaque switching nodes 2, labelled A to F. In FIG. 1b nodes A and B are shown in greater detail. For simplicity, a unidirectional representation of a bi-directional network has been shown. In practice all links connecting the nodes A to F would have companion links connected in inverse parallel to carry return traffic, or the connecting links would be bi-directional links. The network 1 includes electrical cross-connect switches 2 interconnected by spans comprising optical fibers and optical amplifiers 7, which are spaced apart at appropriate intervals along the spans. Alternatively, so-called "opaque" optical cross-connect switches could be used in place of some or all of the electrical cross-connect switches 2. An opaque switch is one that uses transponders between the links connecting the switch to a network, such that the wavelength at which a signal from the network is switched is independent from the wavelength at which the signal is carried over the network. Each transponder is of one of two forms, those being a receive transponder (Tr) and a transmit transponder (Tt). The receive transponder (Tr) consists of a long-reach line wavelength receiver and a short-reach transmitter, which is usually a single fixed-wavelength optical, or electrical, cross-office short-reach transmitter. The transmit transponder (Tt) consists of a short-reach single fixed-wavelength optical, or electrical, cross-office receiver and a long haul optical transmitter working at the final line wavelength, either by equipping the unit with the appropriate wavelength laser or by exploiting tunable lasers. A bi-directional transponder (not shown here) is a commonly packaged transmitter and receiver transponder with distinct "line" and "office" sides. A regenerator (R) can also be made from transponders, by placing them in series, such that the short reach cross office transmitter of the receiver transponder (Tr) directly drives the short-reach, cross-office, receive port of the transmitter transponder (Tt). A bi-directional regenerator is two of these combinations of receiver transponder (Tr) and transmitter transponder (Tt) in an inverse parallel configuration. The electrical cross-connect switches 2 each comprise optical wavelength division (WD) demultiplexers 4 coupled to an electrical switch fabric 2 via receive transponders (Tr) on the ingress side of the switch 2. The receive transponders (Tr) convert demultiplexed line optical channel signals to electrical, or short-range optical signals, which are fed to the interfaces of, and are switched by the electrical switch fabric 2, or opaque optical switch fabric. An optical pre-amplifier 7b may be coupled to the input of a WD demultiplexer 4 to amplify received DWDM signals before switching. At the egress side of the switch 2, optical WD multiplexers 5 are coupled to the electrical switch fabric 2 via more transmit transponders (Tt). Switched electrical signals are converted to optical channel signals by the transmit transponders (Tt) at the egress side, and the WD multiplexers 5 multiplex the optical channel signals into DWDM signals, which are output by the switch 2. Electrical input signals to the optical network 1 are converted to optical signals by transmit transponders (Tt) and multiplexed into a DWDM signal by WD multiplexer 5b. Conversely, DWDM signals are demultiplexed by the WD multiplexers 4b into optical channel signals, which are converted by the receive transponders (Tr) and output from the network 1 as electrical signals.

It is apparent that a pair of transponders is required for each channel signal passing through the switch 2. Further, additional transponders (T) are required to add or drop channel signals from the switch 2. Still further, repeaters 3 comprising WD demultiplexers 4 coupled to WD multiplexers 5, via regenerators (R), require an additional pair of transponders per channel signal. These transponders (not shown) are used in the regenerators (R) to perform O/E conversion of demultiplexed channel signals before electrical regeneration, and E/O conversion of regenerated electrical signals into optical channel signals, which are then multiplexed into a regenerated DWDM signal. Thus a regenerator (R) includes back-to-back transmitter and receiver transponders and may also include reshaping/retiming functionality. With such a network 1, any increases in the number of channel signals in a DWDM signal requires an additional pair of transponders in every switch 2 and repeater 3 in the network 1.

Extensive work is currently underway throughout the optical communications industry to develop technology that will reduce the rate at which an optical signal degrades with transmission distance. This work is being done to achieve ever longer amplified span lengths between regeneration points, in order to eliminate the need for regenerators in all but a few cases. The result will be requirement for a network configuration that can exploit the resultant technology effectively. That is, for an optical signal to travel long distances between overall network ends in an all photonic network, it must be possible to add, drop, and switch traffic from intermediate nodes without reverting to electrical (or opaque optical) switching.

Figure 2A:
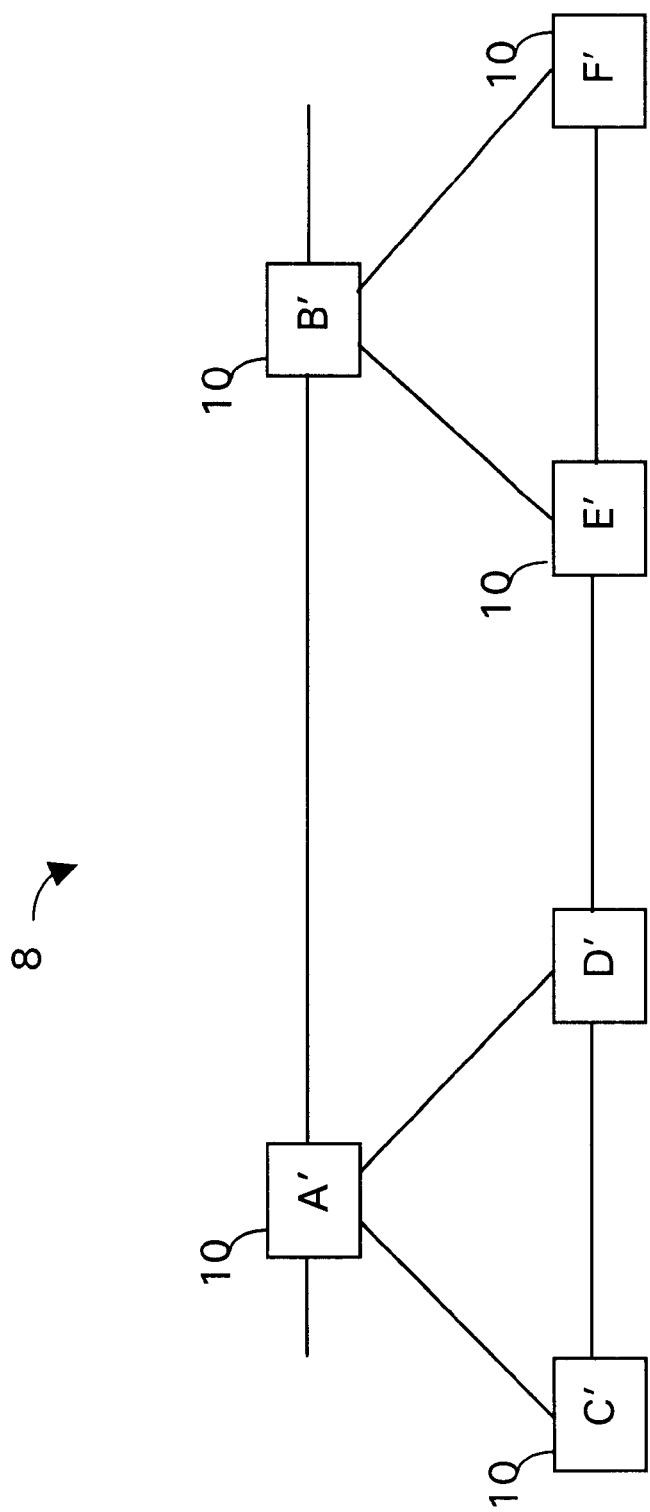
FIG. 2a is a diagram of an optical network in accordance with an embodiment of the present invention.
Figure 2B:
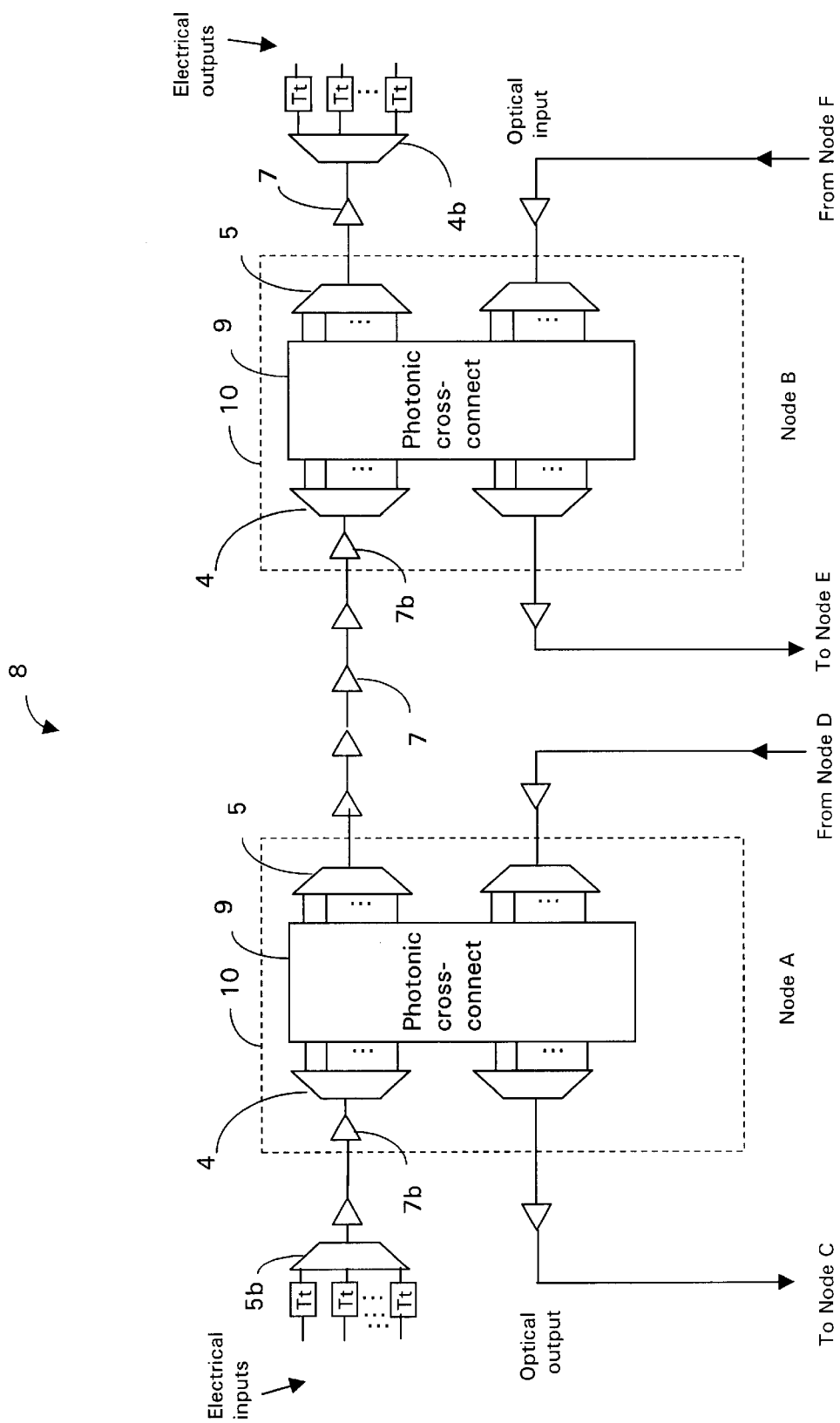
FIG. 2b is a diagram showing the nodes A' and B' of FIG. 2a in greater detail.

FIG. 2a shows an optical network 8 in accordance with an embodiment of the present invention. The network 8 includes six interconnected switching nodes A' to F' which are optical cross-connect switches 10. The optical cross-connect switches 10 are in accordance with another embodiment of the present invention and will be described in more detail later. FIG. 2b shows the nodes A' and B' in greater detail. For simplicity, a unidirectional representation of a bi-directional network has been shown. In practice all links connecting the nodes A' to F' would have companion links connected in inverse parallel to carry return traffic, or the connecting links would be bi-directional links. The optical cross-connect switches 10 are interconnected by spans comprising optical fibers and optical amplifiers 7. The optical cross-connect switches 10 include photonic cross-connects 9 coupled to the spans via WD demultiplexers 4 and optical pre-amplifiers 7b on the ingress side of the switch 10, and WD multiplexers 5 on the egress side of the switch 10. The photonic cross-connects 9 further include multiple optical switching matrices and a wavelength-converting inter-matrix switch (not shown) as will be described later with reference to FIG. 3. The wavelength-converting inter-matrix switch converts a channel signal from one channel wavelength to another channel wavelength as required, for example, by span limitations in terms of available channel wavelengths. Transponders are provided for this purpose. However, they are far fewer in number than a pair per channel signal. Typically, transponders are provided for 25% of the channel signals that can be switched by the switch 10. This percentage is determined by network engineering rules which will be set up to favor finding end-to-end clear wavelengths or paths with minimum wavelength conversion (i.e. lambda-hopping). Additional transponders for adding channel signals to, or dropping channel signals from, the switch 10 would not normally be required since the transponders included in the wavelength-converting inter-matrix switch can also be used for this purpose. Clearly, this optical network 8 requires fewer transponders than the prior art optical network 1, the actual reduction being dependent upon the network planning algorithms. This reduction in transponders leads to savings in costs and power requirements for a given network configuration, and as the configuration grows in switching nodes and channel signals per DWDM signal.

In the prior art approach of FIG. 1, transponders are required for every added, dropped and switched through wavelength irrespective of reach or distance. In embodiments of the present invention, for example as illustrated in FIG. 2, transponders are only needed to enter/leave the optical domain, or because the system reach (i.e. the maximum allowable distance between transponders) is too small for implementing a given route, or because wavelength conversion is necessary to get around a "blocked" wavelength.

Figure 3:
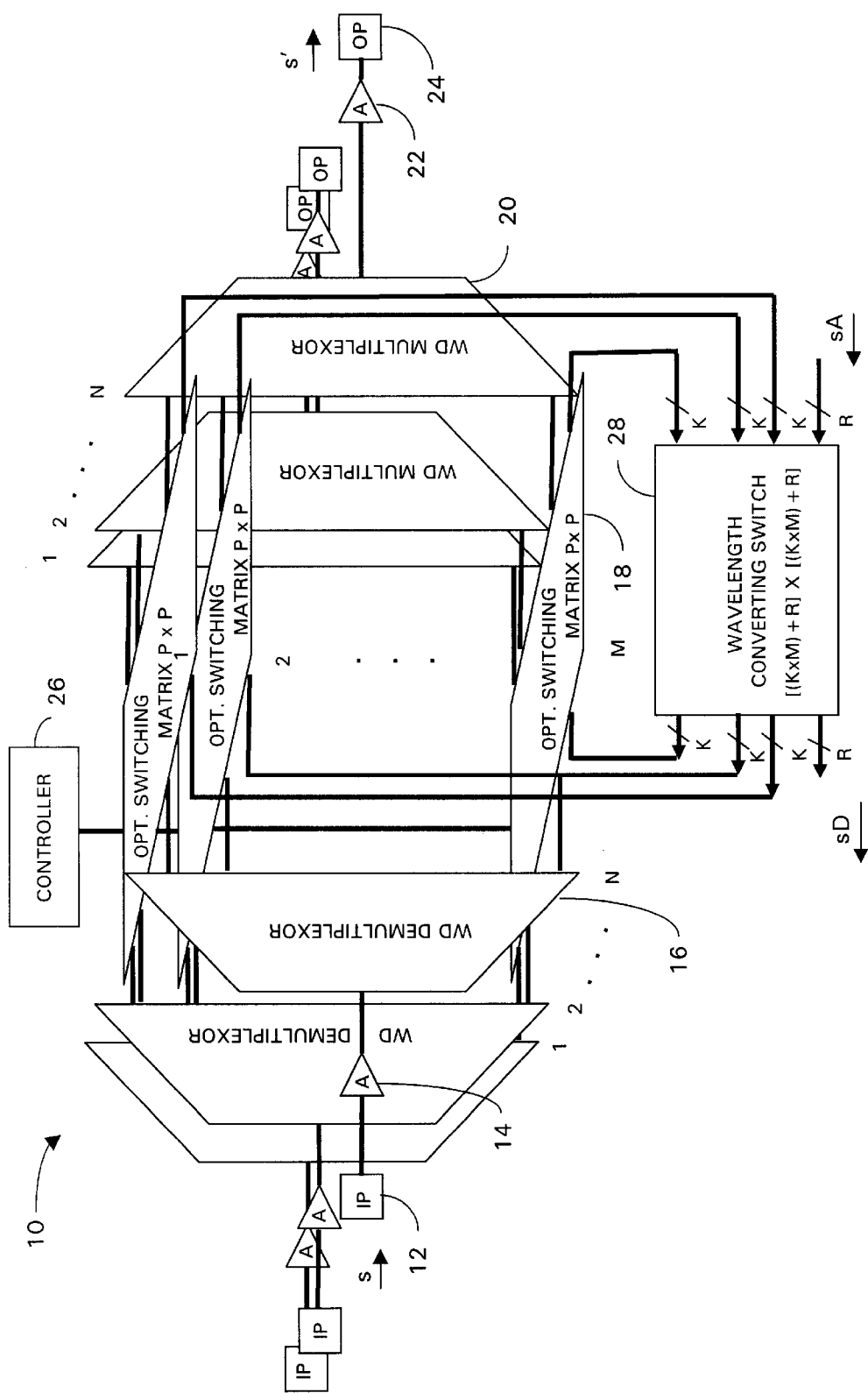
FIG. 3 is a functional block diagram of a cross-connect switch in accordance with an embodiment of the present invention.

Referring to FIG. 3 there is illustrated a cross-connect switch 10 in accordance with an embodiment of the present invention. The crossconnect switch 10 includes an input port 12 for receiving an optical signal s, for example a DWDM optical signal from an optical telecommunications network. The input port 12 is connected to an optical amplifier 14 via an optical fiber. Unless stated otherwise, all connections internal to the switch are made by way of optical fiber, which may or may not be assembled into ribbon cables with multiple fibers and associated multiway connectors. The amplifier 14 amplifies the optical signal s, which might, for example, be received from a fiber cable from the previous line amplifier to compensate for the insertion loss of the span before it is applied to a wavelength division (WD) demultiplexer 16. The demultiplexer 16 divides the optical signal s into its constituent channel wavelengths. Each channel has a predetermined wavelength, $\lambda 1$ to $\lambda M$ assigned to it. In the embodiment of FIG. 3 there are up to 160 such channels. A respective P×P optical switching matrix 18 is provided for each set of channels that have a common predetermined wavelength, one such channel coming from each of the WD demultiplexers 16. FIG. 3 shows M such optical switching matrices of which there are up to 160 in the present embodiment (i.e. M=160), since there are up to 160 channels on each inter-node long haul transmission fiber. At each channel wavelength, light from the optical signal s at the channel wavelength is input into the respective optical switching matrix 18 for that channel. A wavelength division (WD) multiplexer 20 aggregates a switched channel from each one of the optical switching matrices into another optical signal s' for outputting from an output port 24. Each output port 24 is connected to the WD multiplexer 20 through an optical amplifier 22. The optical amplifier 22 amplifies the optical signal s' to compensate for the insertion loss through the switch 10 before the optical signal s' is output from the switch 10 into an optical telecommunications network, for example.

Note that the cross-connect switch 10, in addition to performing optical switch functions, also restores the level of the optical signals for transmission to the next cross-connect switch 10 or destination node. Consequently, the cross-connect switch, as shown in its entirety in FIG. 3, replaces the entire WDM/WDD-transponder-cross-connect path that would be required in an electrically switched and regenerated transmission network.

The switch 10 has a plurality of input ports 12 and respective optical amplifiers 14 and WD demultiplexers 16 as well as a plurality of output ports 24 and respective optical amplifiers 22 and WD multiplexers 20. FIG. 3 shows N input ports 12, each of which has an accompanying optical amplifier 14 and WD demultiplexer 16. FIG. 3 also shows N output ports 24, each of which having an accompanying optical amplifier 22 and WD multiplexer 20. In the present embodiment there are up to 24 input ports and 24 output ports, that is N=24. However, expansion of the switch 10 to provide a greater number of input and output ports is possible, and will be described later. Also possible, are configurations in which the number of input ports does not equal the number of output ports. For example, rectangular (e.g. 16×32) optical switching matrices 18 could be used to map a reduced subset of transponders to a provisionable subset of ports within the wavelength group of those transponders.

An inter-matrix switch in the form of a wavelength-converting switch 28 with additional add/drop multiplexer capabilities is connected across each of the optical switching matrices 18. That is, for each P×P optical switching matrix 18, a number (K) of outputs of the wavelength-converting switch 28 are connected individually to the same number (K) of inter-matrix inputs of that optical switching matrix 18. As well, for each optical switching matrix 18, a number (K) of inputs of the wavelength-converting switch 28 are connected individually to the same number (K) of intermatrix outputs of that optical switching matrix 18. In the present embodiment, the number K is a variable over the range 0–16, covering the extreme cases of all wavelengths needing conversion or access to add-drop (K=16) or no wavelengths needing conversion or access to add-drop (K=0). The particular value of K in any particular case would be dependent on the location of the particular optical cross connect switch in the network and details of the network engineering algorithms. Typically, a practical value of K is K=8, (i.e. 25% of optical switching matrix 18 inputs/outputs, thereby permitting 33% of the remaining 24 inputs and outputs to be connected to the wavelength conversion/ add-drop inter-matrix switch.) That is, in this embodiment of the switch 10, the value of P=K+N. Other variations in the values of K, N, and P are possible and would need to be planned for in conjunction with the network engineering algorithms. The wavelength-converting switch 28 also has a capability of converting wavelengths. That is, it can receive information on one wavelength and transmit the same information on a different wavelength. This capability is useful for switching information between channels as described further below.

It should be noted that the wavelength-converting switch 28 can add/drop channel signals without performing wavelength conversion on the added/dropped channels signals, hence it can function solely as an add/drop multiplexer. Conversely, the wavelength-converting switch can perform wavelength-conversion without performing an add/drop function; hence it can function solely as a wavelength-converting switch. Moreover, the wavelength-converting switch 28 can perform both a wavelength conversion function and an add function on the same channel signal, and separate functions (i.e. add, drop, convert wavelength) on different signals at the same time, as will be described later.

The switch 10 also includes a controller 26 for controlling each of the optical switching matrices 18, the wavelength-converting switch 28 as well as any tunable transponders or sources associated with the wavelength-converting switch 28. For example, the controller 26 can set up the optical switching matrix 18, assigned to channel one, to switch light from the output of the WD demultiplexer 16, connected to the second input port 12, to the input of the WD multiplexer 20, connected to the first output port 24. The controller 26 is connected to each optical switching matrix 18 via electrical cable, and controls each optical switching matrix 18 using electrical control signals. The control signals and link over which they are transmitted could also be optical in nature, although the control of the crosspoint would likely remain electrical in nature. The control signals are generated by a real-time processor (not shown) of the switch 10 which configures crosspoints of the switch 10 in a manner similar to that used in an equivalent electrical switch operating under Element Manager control from a central Network Manager. Alternatively, the Element Manager may receive control signals from configuration controllers distributed among network switching nodes.

An important design consideration of the switch 10 is balancing the power gain/loss in the "through" path of the switch 10 with that in the "wavelength conversion" path. The "through" path, or link path, is any path through only one optical switching matrix 18, from amplifier 14 to amplifier 22. In such a path there is no optical regeneration and any losses must be within the optical link budget allotted to the switch 10, within the overall end-to-end optical link budget. In the wavelength conversion path, i.e. any path through two or more optical matrices 18 and the wavelength-converting switch 28, there is typically optical regeneration performed by transponders in the wavelength-converting switch 28. It is important that this path, also between the optical amplifiers 14 and 22 have a power loss/gain in the same range as the through path. By adjusting the power levels of the transponders in the wavelength-converting switch 28 the power loss/gain difference between the two types of paths can be balanced.

In operation, the switch 10 is capable of three modes of switching, they are port switching, channel switching, and switching that is a combination of channel and port switching. The operation of the switch 10 in each of these three modes will be described further by way of example.

In the port switching mode, an optical signal s arrives at input port one and is split into its constituent channels (1 to 160) by the WD demultiplexer 16 assigned to that port. The controller 26 has set up the optical switching matrix 18, for channel wavelength one, to switch optical signals from its input from port number one to its output for port number two. This causes light of wavelength $\lambda 1$ from the output of the WD demultiplexer 16 assigned to channel wavelength one to be directed to the input of the WD multiplexer 20 assigned to the output port two. This light is aggregated with light from the other channels by the WD multiplexer 20 into the signal s', which is output from the output port two. Thus, information received by the switch 10 on channel one input port one is switched to channel one output port two, and is outputted by the switch 10.

In the channel-switching mode, each channel of the optical signal s arrives at its respective optical switching matrix 18 from the WD demultiplexer 16 as before. However, in this case the controller 26 has set up the optical switching matrix 18 for channel two to switch its input for port one to one of its outputs connected to the wavelength-converting switch 28. For example, the optical switching matrix for channel two has been configured to switch its input for port one to the first input of the wavelength-converting switch 28. Recall, that in the present embodiment the wavelength-converting switch 28 has eight inputs and eight outputs (K=8) connected to each optical switching matrix 18. The wavelength-converting switch 28 is also configured by the controller 26 and connected thereto by electrical or optical links (not shown). In this example, the wavelength-converting switch 28 is configured to receive information on its first input for channel two $\lambda 2$ and output the information on channel three $\lambda 3$ at its first output port for channel three. This optical switching matrix 18 is set up to direct the light from this signal to its output connected to the WD multiplexer 20 for port one. Consequently, information received by the switch 10 on input port one channel two is output on output port one channel three. Thus, the switch 10 has performed channel switching, from channel two input port one to channel three output port one.

In switching that is a combination of port and channel switching, hereinafter referred to as port-channel switching, information arrives at the switch 10 on a particular input port number, carried by a particular channel wavelength, and leaves on another output port number, carried by a different channel wavelength. The operation of port-channel switching is the almost the same as channel switching except that in the last switching step the signal is switched to another output port number. For example, in the previous example of channel switching, instead of switching the channel signal back to output port one (on channel three) it would be switched to any of the other output ports (e.g. output port four).

The configuration control strategy used to control cross-connect switches 10 will favour port switching at the crossconnect switches 10 in preference to channel switching and port-channel switching. Channel switching and port-channel switching will generally be used only when no single wavelength channel is available from a source node to a destination node. The need for channel switching and port switching can be reduced by over-provisioning wavelength channels. Such over-provisioning has less cost impact in an optically switched network than in an electrically switched network since little of the required equipment is wavelength specific.

A further capability of the switch 10 is the ability to add or drop traffic using the add/drop multiplexer functionality of the wavelength-converting switch 28. The wavelength-converting switch 28 has R add inputs for adding traffic and also R drop outputs for dropping traffic. In the present embodiment R ranges from 480 to 960, corresponding to a 20% traffic add/drop on a half to fully configured switch, depending on the number of wavelength channels that are provisioned on the crossconnect switch 10.

In FIG. 3, a signal sA, which is to be added to the traffic flow processed by the switch, is shown being input to the wavelength-converting switch 28. This signal sA could go through wavelength conversion if necessary, as described above, before being output by the wavelength-converting switch 28 into one of the optical switching matrices 18. The signal sA is then output to one of the WD multiplexers 18 for aggregation into an optical signal, for example s', to be transmitted from a corresponding output port 24. Also referring to FIG. 3, a signal sD, which is to be dropped from the traffic flow processed by the switch, is shown being output from the wavelength-converting switch 28. This signal sD, could also go through wavelength conversion if necessary, before being output by the wavelength-converting switch 28 into other optical communications equipment (not shown).

Figure 4A:
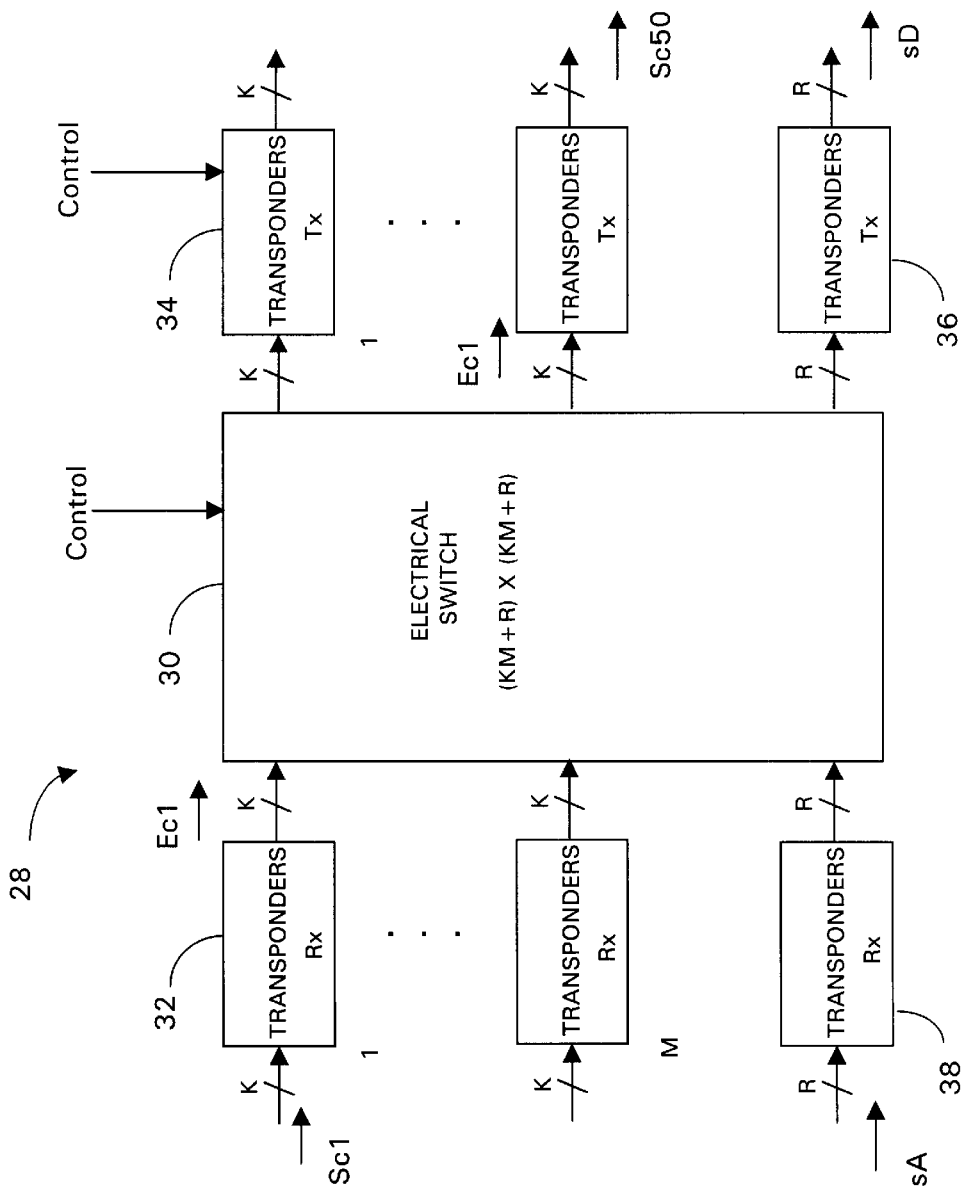
FIG. 4a is a functional block diagram of an embodiment of the wavelength-converting switch shown in FIG. 3.

FIG. 4a illustrates, in a functional block diagram, an embodiment of the wavelength-converting switch 28 shown in FIG. 3. The wavelength-converting switch 28 includes an electrical switch 30. A plurality of transponder receiver sections for converting line optical signals to electrical signals or short reach optical signals, as required by the electrical switch, are connected to the inputs of the electrical switch 30. Specifically, M groups of K receiver transponders 32 for converting optical signals from the optical switching matrices 18 are connected to the electrical switch 30. As well, receiver transponders 38 for converting optical signals (e.g. the signal sA) to be "added" to the traffic flow of the transport system via switch 10 are also connected to inputs of the electrical switch 30. In the present embodiment K=8 and M=160 and R=960, giving a cross-connect size of [(160×24)+960]×[(160×24)+960]=4800×4800. Such a cross-connect may be implemented as a single switch or as several (e.g. eight parallel planes of smaller (600×600)) switches, exploiting the lateral interplane cross-connection inherently available in the optical switch matrices 18 to minimize any resultant wavelength blocking. In addition, a plurality of transmitter transponders for converting electrical signals to optical signals is connected to the outputs of the electrical switch 30. That is, M groups of K transmitter transponders 34 for converting electrical signals for the optical switching matrices 18 are connected to the outputs of the electrical switch 30. As well, transmitter transponders 36 for converting electrical signals of dropped traffic into local cross-office optical signals are also shown connected to outputs of the electrical switch 30.

It should be noted, that the transponders 36, 38 are optional and would be required if optical signals (e.g. the signal sA) are to be added to the traffic flow or if dropped signals (e.g. the signal sD) are to be optical. Further, it should be noted that the number of transponders connected to the inputs of an optical switching matrix 18 does not have to be equal to the number connected to the outputs of the same optical switching matrix. Still further, the receiver transponders 32 need not be very sensitive since they are receiving light that has been amplified by the optical amplifier 14 and then only attenuated about 5–10 dB by a WD demultiplexer 16 and an optical switching matrix 18. However, the wavelength-accurate transmitter transponders 34 are usually expensive, due to their precision optical sources and the number of versions required (i.e. one for each wavelength in the case of fixed transponders or one for each wavelength band in the case of tunable transponders, shown with a control signal from the controller 26 to set the transmission wavelength of the transponder). Hence, more of the receiver transponders 32 than the transmitter transponders 34 may be provisioned to optimize the wavelength conversion capability at the lowest cost.

Operation of the wavelength-converting switch 28 will now be explained by way of example. The receiver transponder 32 receives an optical signal Sc1, on channel one (i.e. channel wavelength λ1) from a optical switching matrix 18 assigned to channel one and converts the information in this signal to an electrical signal Ec1, which is input to the electrical switch 30. The electrical switch 30 has a switching granularity of the entire signal payload of each wavelength channel. The electrical switch 30 switches the electrical signal Ec1 to one of its outputs assigned to channel fifty. The transmitter transponder 34 receives the signal Ec1 and converts the information carried by it to an optical signal Sc50 having a wavelength corresponding to channel fifty. This signal is output to the optical switching matrix 18 that is assigned to channel fifty, which directs it to a WD multiplexer 20, as described earlier. Thus, since the information in the optical signal Sc1 has been switched to the optical signal Sc50, a channel switching function, or wavelength conversion function (i.e. from channel wavelength λ1 to channel wavelength λ50) has been performed by the wavelength-converting switch 28. In a similar manner the signal sA is directed into the electrical switch 30 via the receiver transponder 38 and is forwarded into the one of the optical switching matrices 18 via one of the transmitter transponders 34. Likewise, the signal sD is directed out of the switch 10 via the receiver transponder 32 and into the electrical switch 30, where it is forwarded into other communications equipment via the transmitter transponder 36.

Figure 4B:
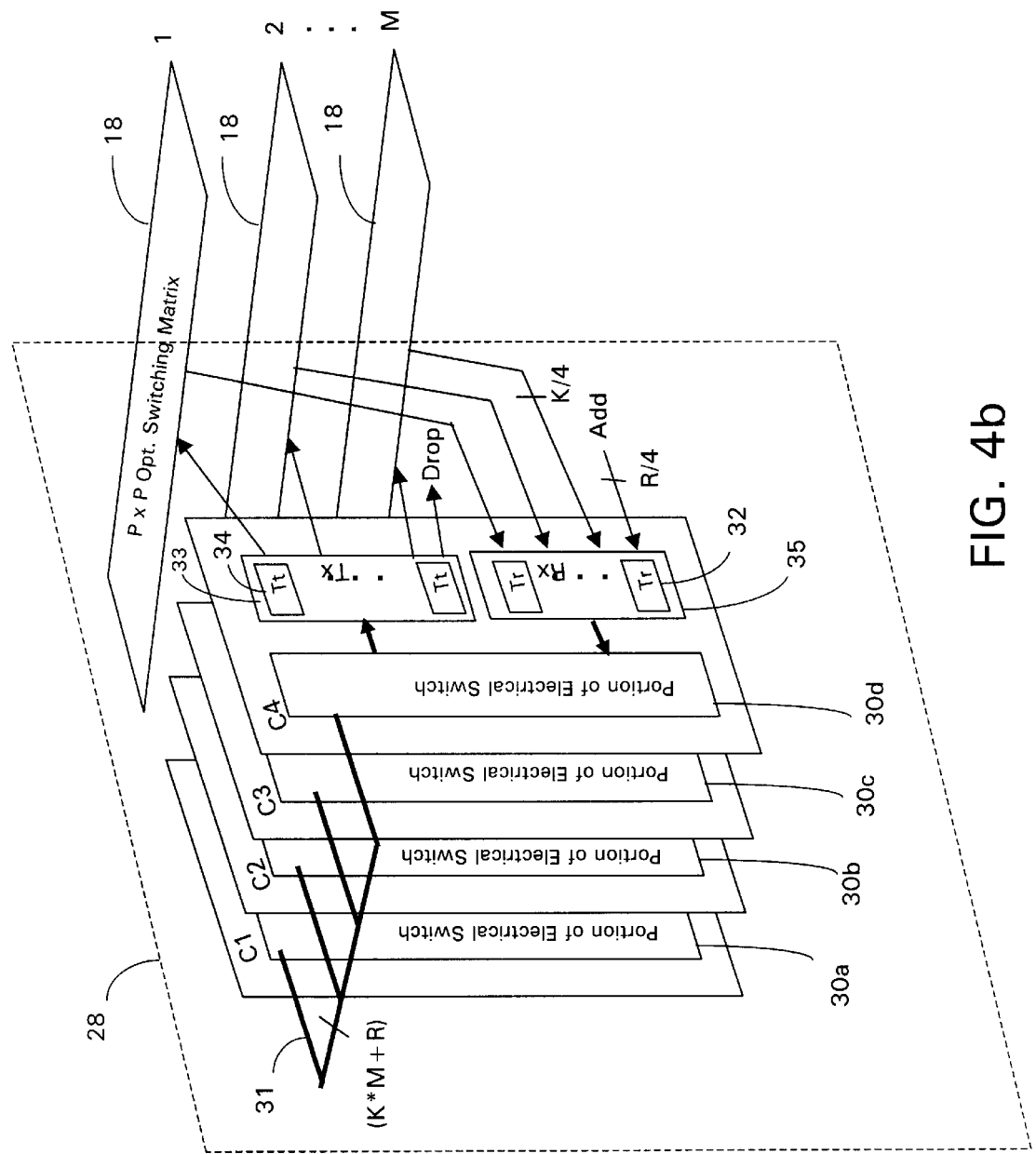

With reference to FIG. 4b an embodiment of a physical arrangement for the wavelength-converting switch 28 of FIG. 4a will now be described (details of the physical arrangement of the cross-connect switch 10 will be described later with reference to FIGS. 16a,b and FIG. 21). FIG. 4b shows the wavelength converting switch 28 connected to M P×P optical switching matrices 18; one switching matrix 18 for each distinct wavelength (i.e. M=160). The wavelength-converting switch 28 is physically implemented on four circuit cards C1 to C4, although it could well be implemented on more, or fewer, cards as will be understood from the following description of this implementation. Each of the circuit cards C1 to C4 includes a respective portion 30a to 30d, one fourth in this case, of the electrical switch 30. Each portion 30a to 30d is electrically connected to a transmit bank 33 of the transmitter transponders 34, and a receive bank 35 of the receiver transponders 32 on its card C1 to C4. Each of the banks 33, 35 is optically coupled to each of the optical switching matrices 18 by a respective optical connection of width K/4. Hence there are M*K/4 optical connections from the plurality of M optical switching matrices 18 to each of the banks 33,35. Add and Drop optical connections of width R/4 are also provided to the receive bank 35 and transmit bank 33, respectively. Each of the portions 30a to 30d is electrically interconnected to each of the other portions 30a to 30d via a high speed inter-card bus 31 of width K*M+R. The details of this interconnection will be described with reference to FIG. 4d.

In operation, optical signals from the switching matrices 18, or from the add connections, are received by the receive banks 33 of the cards C1 to C4, and are converted to electrical signals by receiver transponders 32,36 in the receive bank 33 of the respective card C1 to C4. The converted electrical signals are transmitted to the respective electrical switch portion 30a to 30d on that card C1 to C4. The signals are then either switched to the transmit bank 33 on the same card or to the inter-card bus 31 where they are input to the electrical switch portions 30a to 30d on the other cards. Signals switched to the other cards can then be selected by the respective electrical switch portion 30a to 30d on the other cards and switched to the transmit bank 33 of that card. Signals switched to the transmit banks 33 are converted to optical signals of an appropriate channel wavelength and transmitted to the optical switching matrix 18 for that wavelength.

Figure 4C:
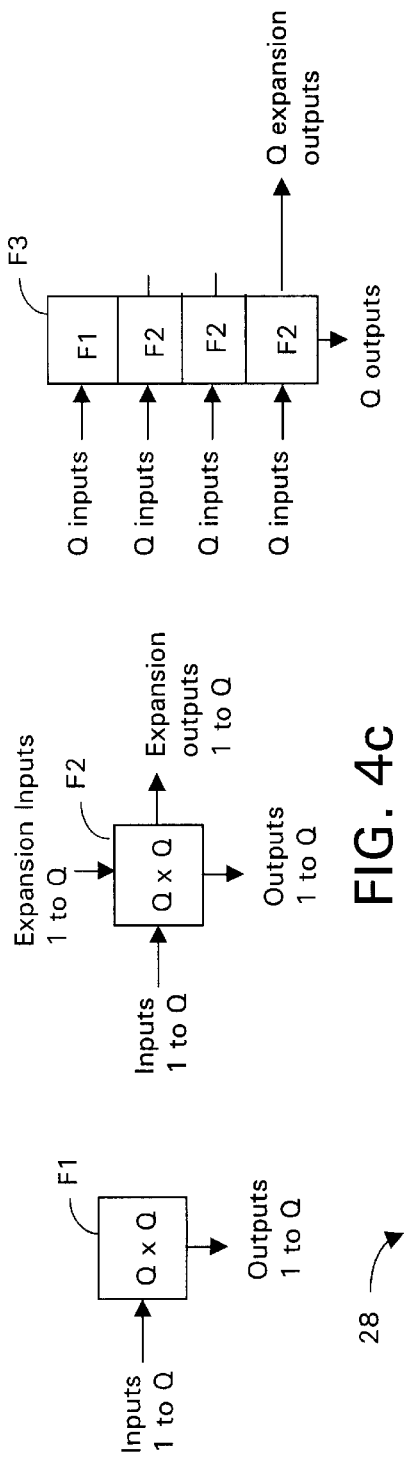
FIG. 4c is a functional block diagram of components of the electrical switch in FIG. 4b.

FIG. 4c is a functional block diagram of components of the electrical switch in FIG. 4b. A Q×Q electrical switching fabric F1 has Q inputs fully interconnected to Q outputs. That is, an electrical signal arriving on any one of the Q inputs can be switched to any one of the Q outputs. The dimension Q equals (K*M+R)/4. Another Q×Q electrical switching fabric F2 has Q inputs fully interconnected to Q outputs and Q expansion outputs, as well as Q expansion inputs fully interconnected with the Q outputs. The fabrics F1 and F2 can be interconnected into a larger electrical switching fabric F3 by serially connecting three F2 fabrics. This is done by connecting the outputs of one fabric F2 to the expansion inputs of the next fabric F2 and repeated until all three F2 fabrics are serially connected. Next an F1 fabric is serially connected to the front of the chain of F2 fabrics by connecting the outputs of the F1 fabric to the expansion inputs of the first F2 fabric. The resulting fabric F3 has four sets of Q inputs, one set of Q outputs, and four sets of Q expansion outputs although only the set of expansion outputs on the last F2 fabric is used.

The operation of the fabric F3 is as follows. Any input of the first three sets of Q inputs can be switched to any of the Q outputs of the last F2 fabric. Additionally, any input of the last set of Q inputs can be switched to any of the Q outputs of the last F2 fabric, or any of its Q expansion outputs.

Figure 4D:
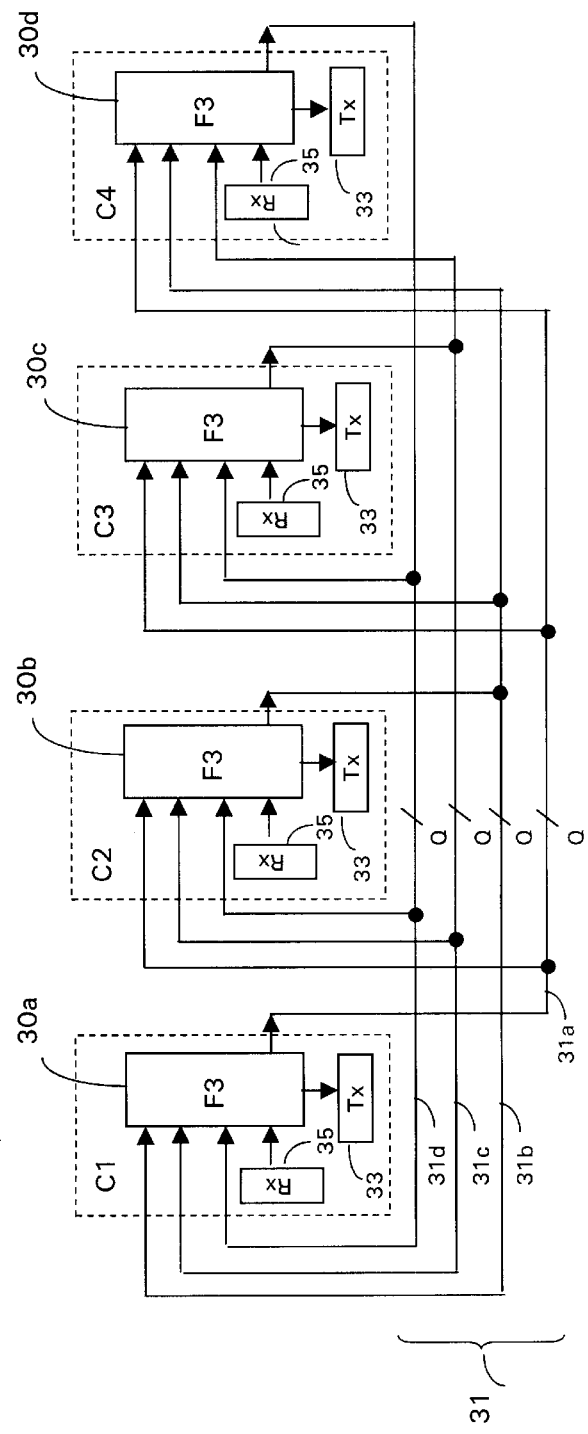
FIG. 4d is a functional block diagram, which provides further detail on the wavelength-converting switch of FIG. 4b.

With reference to FIG. 4d further detail on the wavelength-converting switch of FIG. 4b will now be provided. Each electrical switch portion 30a to 30d is comprised of the fabric F3 on a respective circuit card C1 to C4. The high-speed inter-card bus 31 is comprised of four buses 31a to 31d of width Q. Each of the four buses 31a to 31d is driven by the expansion outputs of a respective fabric F3 on one of the cards C1 to C4, and is connected to the inputs of the fabrics F3 on the remaining cards C1 to C4. Each of the buses 31a to 31d could in fact be comprised of three individual interconnects, of width Q, for example high-speed electrical interconnect or intra-system short reach optical connections. In this case, each of the three individual interconnects in a bus 31a to 31d would be point-to-point connection driven by one switching fabric F3 on one card C1 to C4 and received by only one other fabric F3 on another card C1 to C4.

The switching operation of the wavelength-converting switch will now be described by way of example with reference to card C1. The electrical switch portion 30a on card C1 can receive electrical signals from the receive bank 35 or from any of the buses 31b to 31d. Received electrical signals are either switched to the transmit bank 35 or to the bus 31a connected to the expansion outputs of the electrical switch portion 30a. Electrical signals switched to the bus 31a can be received by any of the other electrical switch portions 30b to 30d and switched to their respective transmit bank 35.

Figure 4E:
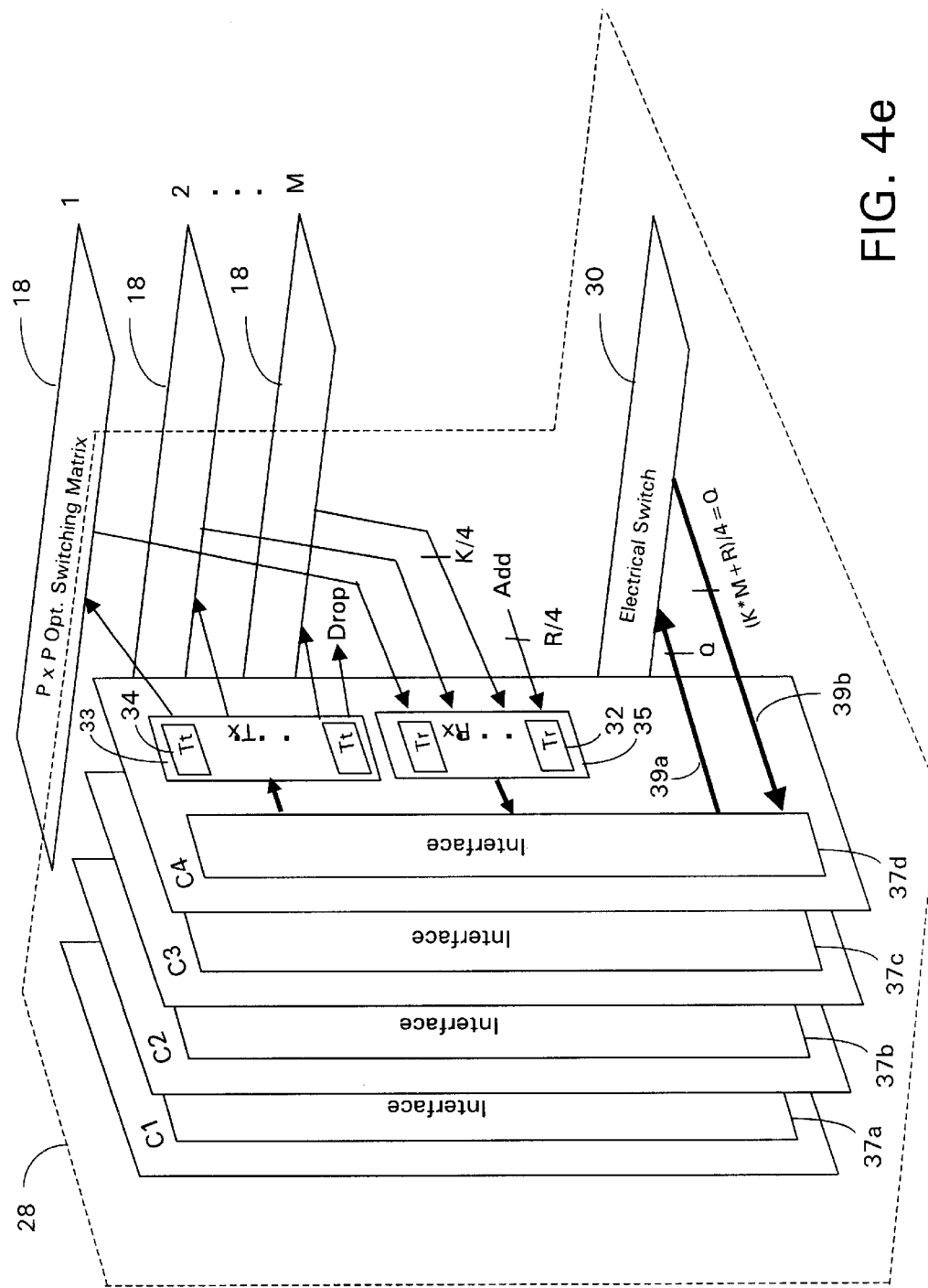

FIG. 4e depicts another physical arrangement for the wavelength-converting switch 28 of FIG. 4a. In this arrangement the electrical switch 30 is no longer partitioned between the circuit cards C1 to C4, but is implemented as one electrical switch 30 residing on a circuit card, or cards, which is physically parallel to the optical switching matrices 18. Each of the circuit cards C1 to C4 has a respective interface 37a to 37d, which interfaces the transmit bank 33 and receive bank 35 of the card to the electrical switch 30, either electrically or by short-reach optical connections 39a, 39b of width Q (where Q=(K*M+R)/4). The remainder of the topology and function of the circuit cards C1 to C4 is as described earlier with reference to FIG. 4b.

Figure 5:
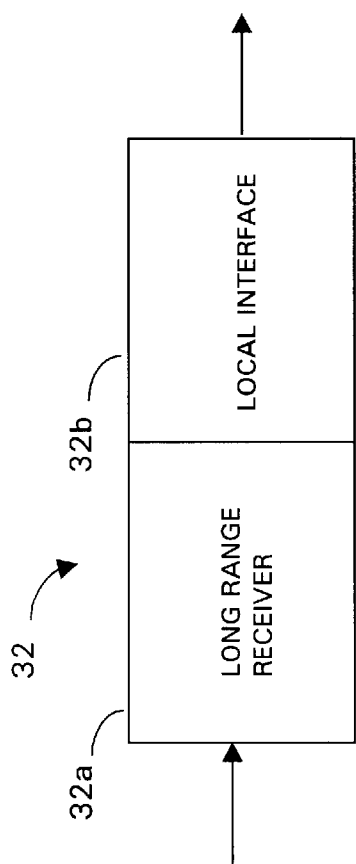
FIG. 5 is a functional block diagram of an embodiment of the receiver transponder of FIG. 4.

FIG. 5 illustrates, in a functional block diagram, an embodiment of the receiver transponders 32, 38 of FIG. 4, both of which are identical in structure. However, this need not be the case. The add-drop transponders 36, 38 may not need to be as high precision devices (i.e. high sensitivity receiver, precise wavelength transmitter) as the transponders linked to the switch matrices 18 unless they are going into another line system directly. If they are feeding a Terabit router they may well be short reach optics, for example, 1310 nm or 850 nm ribbon optics. The receiver transponder 32 includes a long range receiver 32a connected to its input for receiving an optical signal. The long range receiver 32a has enough sensitivity to receive and detect data on optical signals that are at the minimum specified power level and signal-noise ratio of the optical communications network in which the switch 10 is used. A local interface 32b is connected at the output of the receiver transponder 32 and is in communication with the long-range receiver 32a. The local interface 32b receives data from the long-range receiver 32a that it has detected and outputs this information in an electrical signal.

Figure 6:
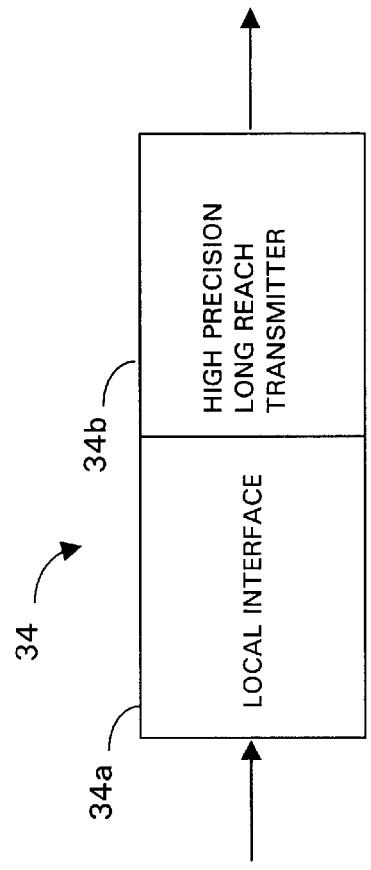
FIG. 6 is a functional block diagram of an embodiment of the transmitter transponder of FIG. 4.

FIG. 6 illustrates, in a functional block diagram, an embodiment of the transmitter transponders 34, 36 of FIG. 4, both of which are identical in structure. The transmitter transponder 34 includes a local interface 34a, connected to its input, for receiving an electrical signal and detecting data contained therein. A long reach transmitter 34b of high precision is connected at the output of the transmitter transponder 34 and is in communication with the local interface 34a. The long reach transmitter 34b receives the detected data from the local interface 34a and outputs this information in an optical signal.

Figure 7:
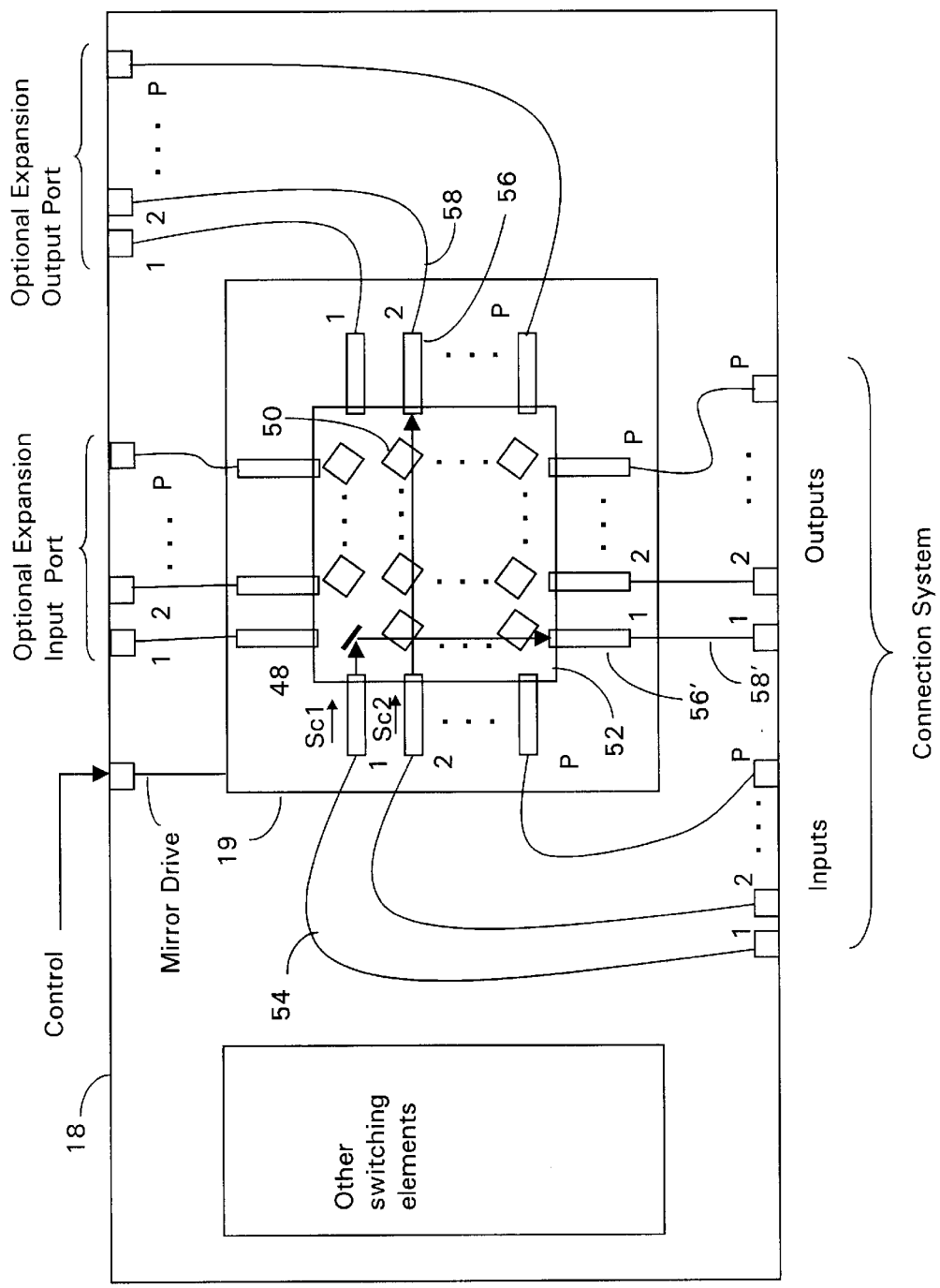
FIG. 7 is a pictorial diagram of part of the optical switching matrix of FIG. 3.

FIG. 7 illustrates, in a pictorial diagram, an embodiment of the switching matrix 18 of FIG. 3. The switching matrix 18 has P inputs and P outputs. A subset K of the inputs are intra-node inputs and are for receiving added or converted signals from the wavelength converting switch 28, which provides both add/drop and wavelength conversion capabilities as discussed previously. The remaining N inputs (i.e. N=P−K) are inter-node inputs for receiving channel signals from other nodes. Similarly, a subset K of the outputs are intra-node outputs and are for transmitting signals to the wavelength-converting switch 28 that are to be dropped or wavelength converted. The remaining N outputs are internode outputs for outputting channel signal destined for other nodes. Optionally, the switching matrix 18 has an expansion input port with P inputs and/or an expansion output port with P outputs. These expansion ports can be used to expand the size of the switching matrix 18 and/or for interconnection with the wavelength-converting switch 28, as will be described later with reference to FIGS. 9a–9g.

A switching element 19 is shown in the form of a Micro-Electro-Mechanical System (MEMS)-based switching element. A MEM switching device is disclosed in an OFC99 paper entitled "Free-space Micromachined Optical-Switching Technologies and Architectures", by Lih Y. Lin of AT&T Labs-Research, and published in OFC99 Session W14-1, Feb. 24, 1999 proceedings. The MEMs-based switching element 19 comprises optical diverters 48, 50 arranged in rows and columns to direct light from an input on the perimeter of the arrangement of optical diverters to an output also on the perimeter of the arrangement. The MEMS-based switching element 19 has row outputs, which are in alignment with the inputs and are on the opposite side of the arrangement of optical diverters 48, 50 relative to the inputs. The MEMS-based switching element 19 also has column outputs situated along paths at right angles with paths between the inputs and row outputs. A self-focusing collimating lens 52 at each input of the MEMS-based switching element 19 directs light received from an optical fiber 54 into the arrangement of optical diverters. At each row and column output another self-collimating lens 56 and 56', respectively, receives light from the arrangement and directs the light along a respective fiber 58 and 58'. The controller 26 controls the state of each of the optical diverters, through a mirror drive signal, in order to direct the light as required. FIG. 7 shows an optical diverter 48, or mirror, in an activated state, whereby, an optical signal Sc1 entering the arrangement of optical diverters along a row is redirected along a column to the self-collimating lens 56' at the respective column output of the MEMS-based switching element 19. The other optical diverters in the figure are shown in a non-activated state, for example, optical diverter 50, whereby an optical signal Sc2 is not redirected. The optical signal Sc2 passes through the arrangement and enters the collimating lens 56 where it is passed along the fiber 58. The switching matrix 18 is a self-contained switch circuit pack, providing all the switching interconnect needs of all the ports and all the inter-matrix feeds for one wavelength. It achieves this by incorporating, as part of its functionality, an optical crosspoint array (i.e. using one or more MEMS-based switching elements). One or more complete switching matrix can be accommodated on a physical circuit pack.

Figure 8:
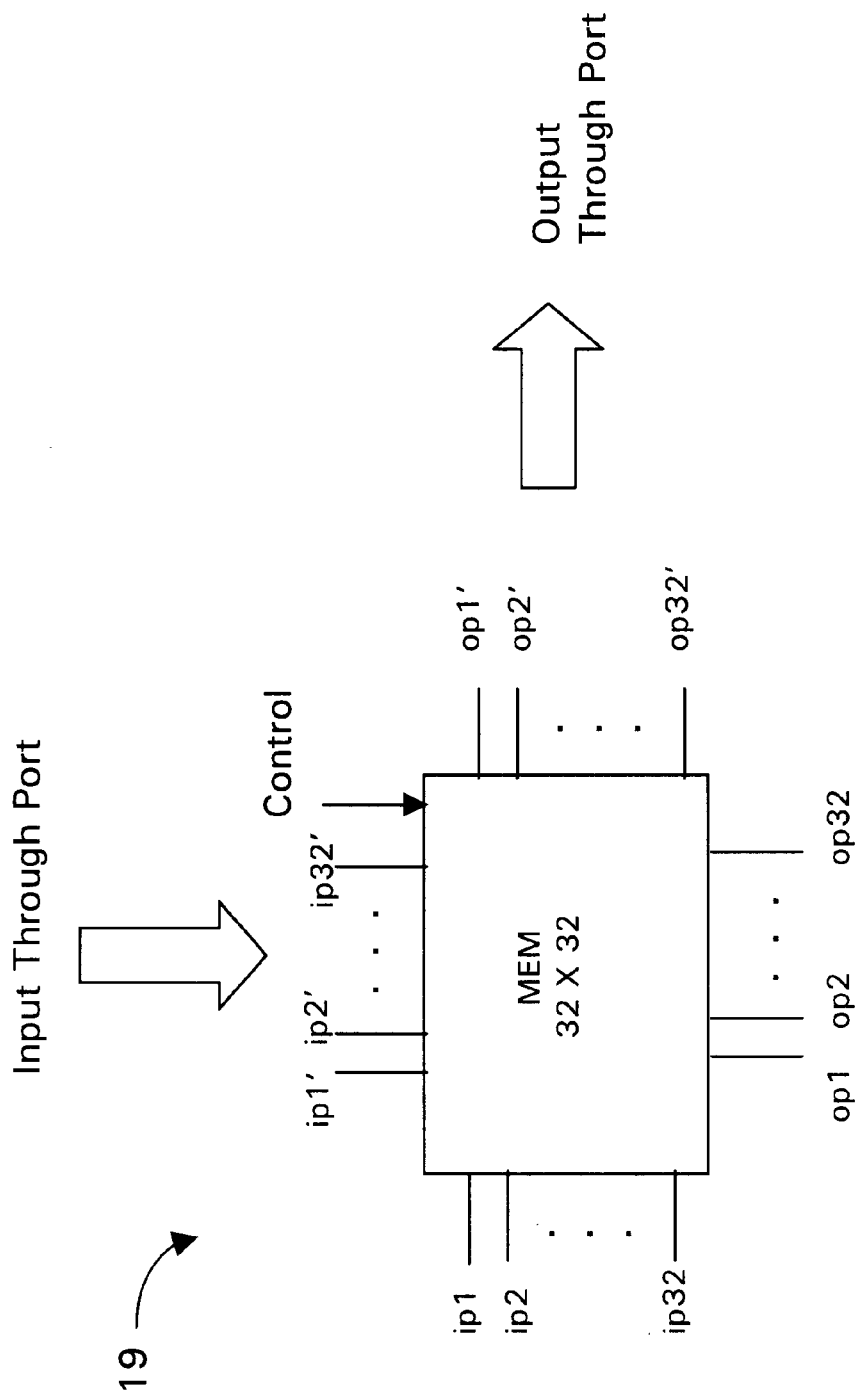
FIG. 8 is a functional block diagram of an embodiment of the optical switching element of FIG. 3.

FIG. 8 illustrates, in a functional block diagram, the MEMS-based switching element 19. The MEMS-based switching element 19 could be an 8×8, 16×16, or a 32×32 array, and in this case it is shown as a 32×32 array. MEMS switching devices are commercially available components manufactured using silicon microelectronic processing. MEMS switching devices can be "square" (i.e. the number of inputs equals the number of outputs), resulting in an n×n array where "n" conventionally equals 8, 16, 32, etc. MEMs switching devices can also be "rectangular" (i.e. the number of inputs is not equal to the number of outputs), resulting in an n×m array where n and m are conventionally 8, 16, 32, etc. The optical diverters 48, 50 of FIG. 7 are optically reflective elements, for example mirrors. An optical diverter in an activated state (e.g. the optical diverter 48 in FIG. 7) typically inserts a 3–7 dB loss in optical power in the redirected signal (e.g. the signal Sc1 in FIG. 7), depending upon the MEMS switching device port count, the quality of the design and the fabrication of the parts. A signal that passes through a MEM switching device into one of its row outputs (e.g. the signal Sc2 in FIG. 7) usually has a lower drop in power, typically 1–2 dB, again dependent upon device size and design. Although MEMS switching devices are shown in this embodiment of the active crosspoints of the switching matrix 18, any matrix of optical diverters capable of directing light of the required wavelength, and as desired, could be used.

Figure 9A:
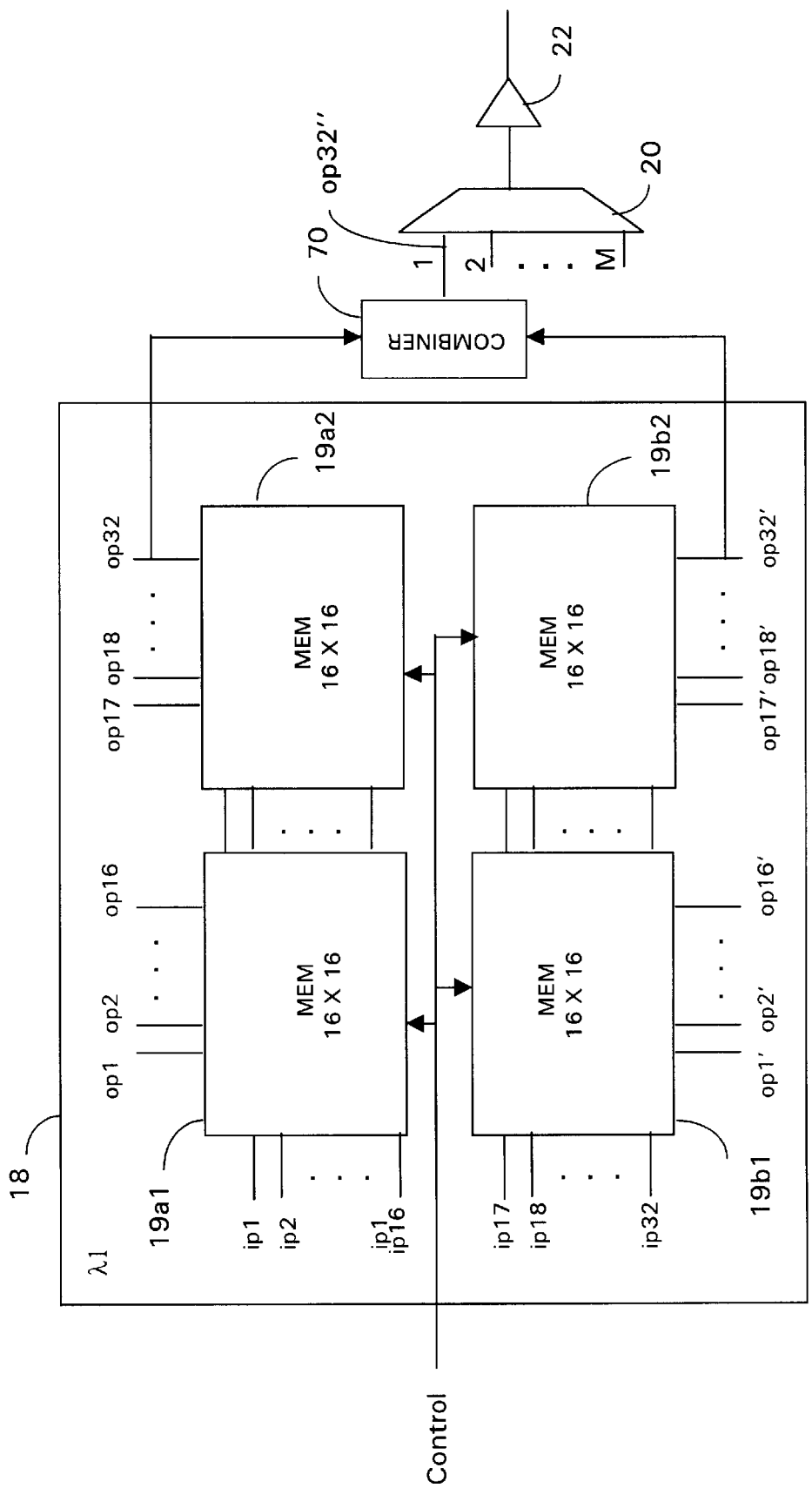
FIG. 9a is a functional block diagram illustrating a second embodiment of the optical switching matrix of FIG. 3.

FIG. 9a illustrates, in a functional block diagram, a second embodiment of the switching matrix 18, shown for the first channel wavelength. The switching element of the 32×32 optical switching matrix 18 is comprised of four 16×16 MEM devices 19a1, 19a2, 19b1, and 19b2, which are controlled by the controller 26. The MEM device 19a1 has sixteen inputs ip1 to ip16, which are connected to the WD demultiplexers 16 of the ports one to sixteen, respectively. The MEM device 19a1 has two sets of outputs, one set of column outputs corresponding to the resultant path of an optical signal that has been directed by an optical diverter in an activated state. The column outputs are labeled op1 to op16 in the figure. The other set of outputs are row outputs corresponding to the path of an optical signal which is not directed by any optical diverters. That is, all of the optical diverters in the path of the optical signal are in a non-activated state (e.g. the optical diverter 50 shown in FIG. 7). The row outputs of the MEM device 19a1 are connected to the inputs of the MEM device 19a2. The column outputs of the MEM device 19a2 are labeled op17 to op32. Likewise, the MEM devices 19b1 and 19b2 are connected in a similar manner for inputs ip17 to ip32 and outputs op1' to op32'. Each of the column outputs op1 to op32 from the MEM devices 19a1 and 19a2 are combined with its respective row output op1' to op32' from the MEM devices 19b1 and 19b2. This is done using thirty-two 2:1 combiners; one of such combiners 70 is shown for port thirty-two. These combiners are single mode compatible combiners. Both fused fiber couplers and Silica on Silicon waveguide structures are appropriate. Both of these technologies will add about 3–3.5 dB of loss to the cross-switch budget. The combiner 70 combines the outputs op32 and op32' to produce an output op32". An optical signal will appear at the output op32 or op32', depending on which input an optical signal destined for port thirty-two is applied. For example, an optical signal applied to the input ip1 will be output at one of the outputs op1 to op32, whereas an optical signal applied to the input ip17 will be output at one of the outputs op1' to op32'. The output of each 2:1 combiner is connected to the WD multiplexer 20 of its respective output port, or to an input of the wavelength-converting switch as described earlier. FIG. 9a shows the outputs of the combiner 70 coupled to the input for the first channel wavelength of the WD multiplexer 20 and the resultant multiplexed signal is forwarded to the optical amplifier 22 for that port. Using this arrangement an optical switching element 19 of a given dimension can be implemented using MEMs of smaller dimension. In this case, the switching element 19 is realized using two pairs of smaller switching elements 19a1, 19a2 and 19b1, 19b2.

Figure 9B:
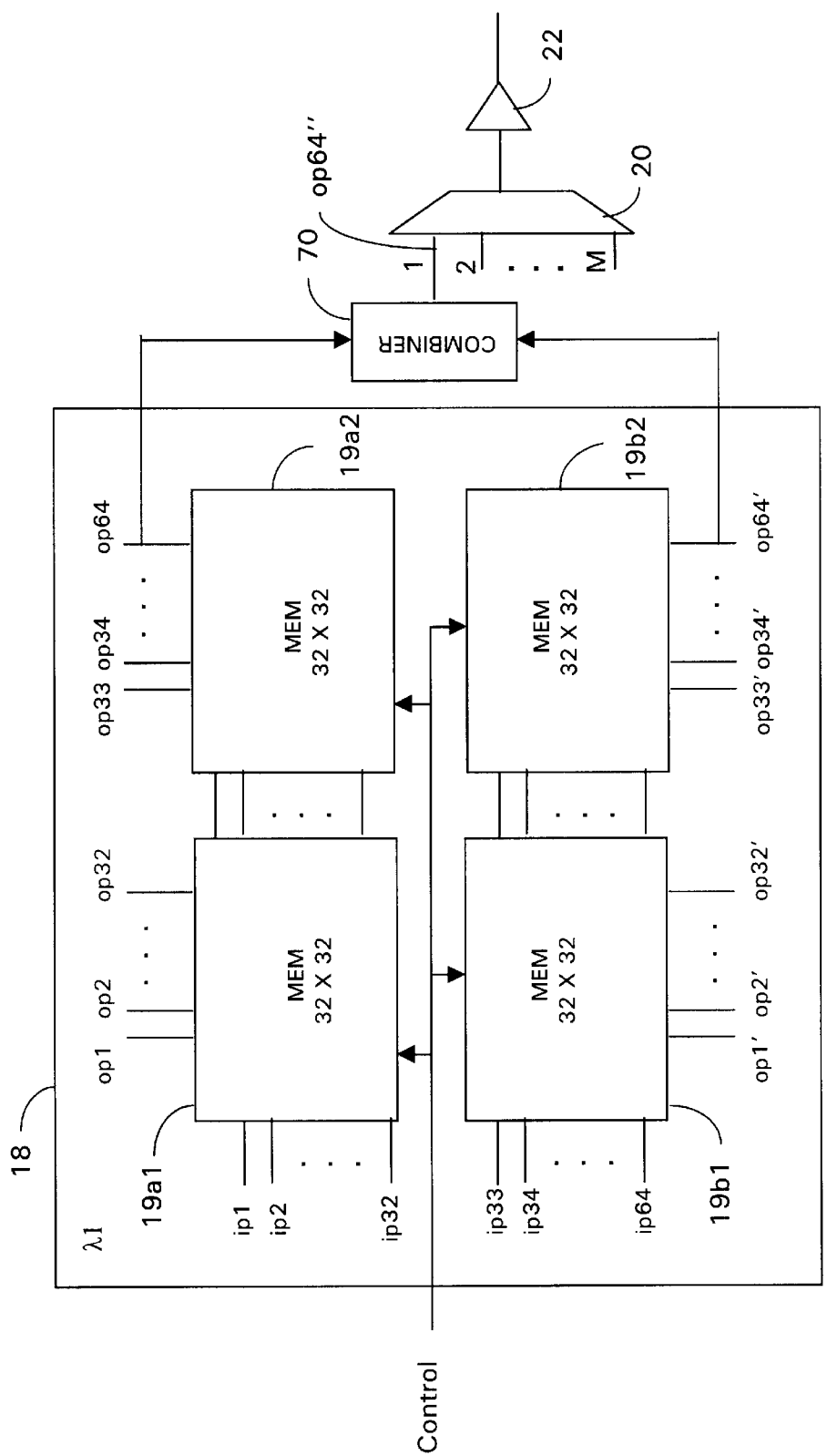
FIG. 9b is a functional block diagram of a third embodiment of the optical switching matrix of FIG. 3.
Figure 9C:
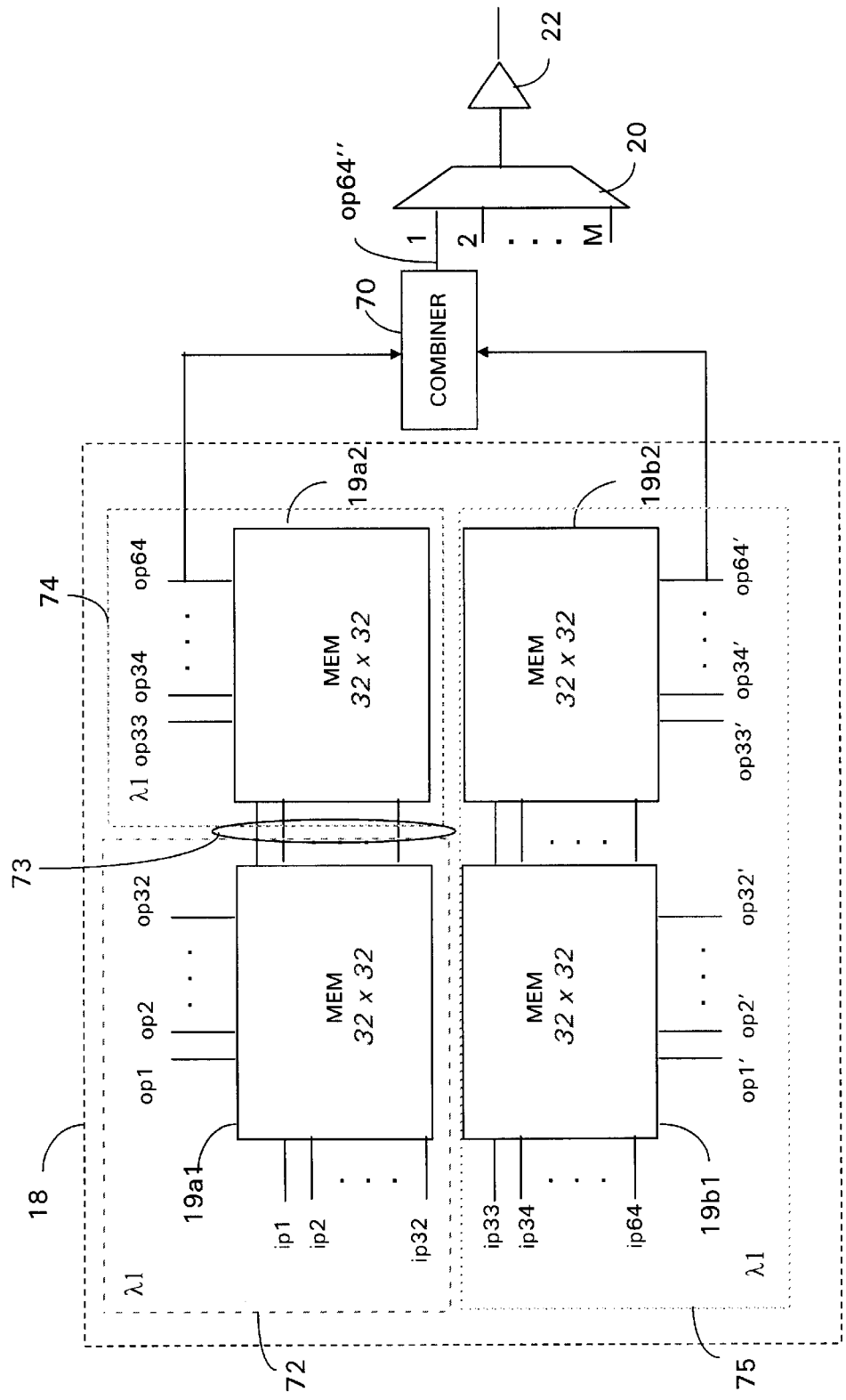
FIG. 9c is a functional block diagram of a fourth embodiment of the optical switching matrix of FIG. 3.
Figure 9D:
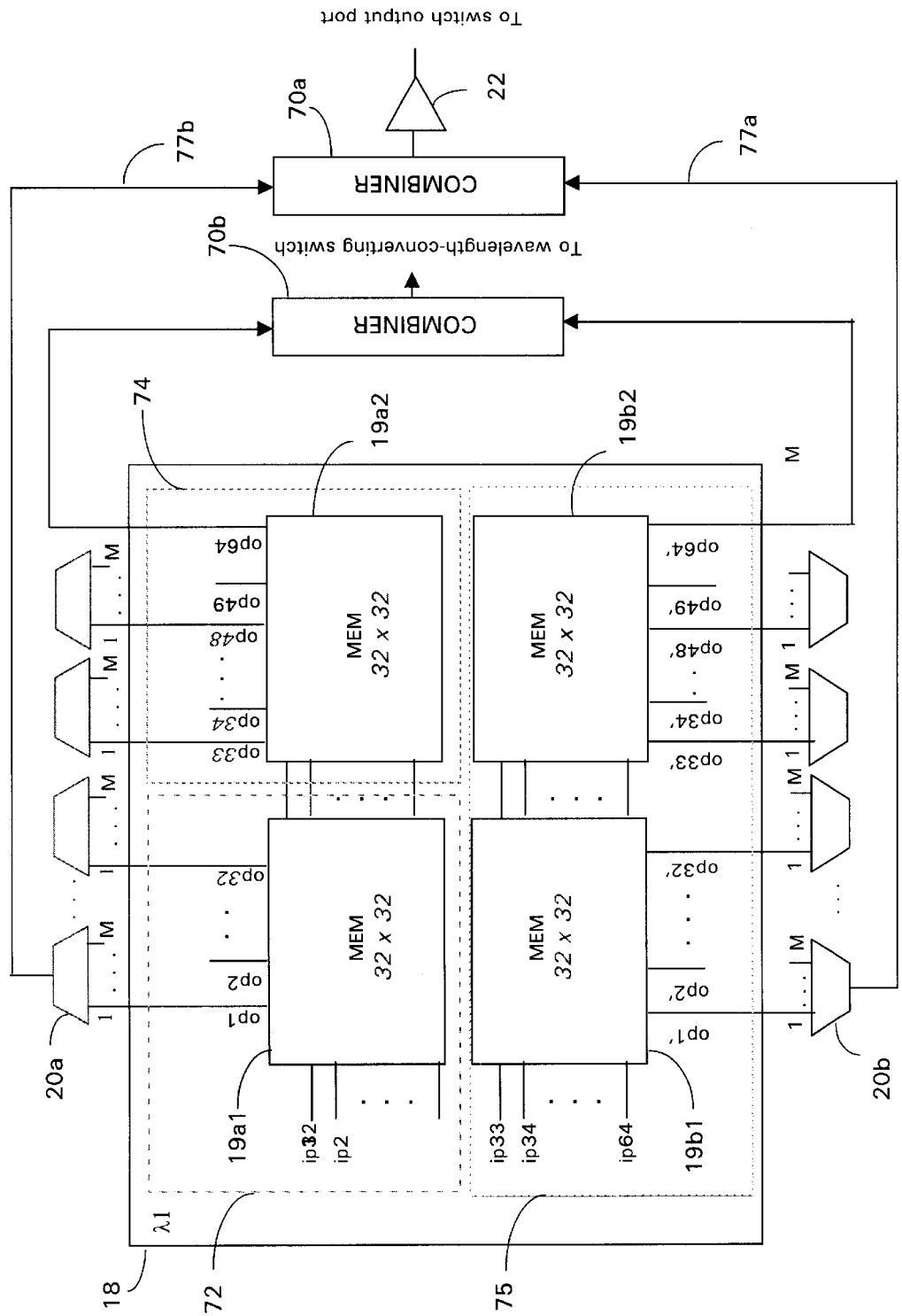
FIG. 9d is a functional block diagram of a fifth embodiment of the optical switching matrix of FIG. 3.

FIGS. 9b to 9d illustrate, in functional block diagrams, other embodiments of the optical switching matrix 18, shown for the first channel wavelength. Several variations exist on the theme of using the through output port/third port of a MEMS device. One of these, already described with reference to FIG. 9a, is to make 32×32 switches out of 16×16 switches. Such an approach is useful before 32×32 MEMs devices are readily commercially available. Another variation, shown in FIG. 9b, is to use four 32×32 MEMS modules to build a 64×64 switching element for each channel wavelength. The result is a 10240×10240 wavelength switch capacity, assuming 160 channel wavelengths (160×64=10240). Again, each pair of respective outputs, for example op64 and op64', are combined with a combiner 70. The output of the combiner 70 is either coupled to a WD multiplexer 20, as shown, or to an input of the wavelength-converting switch 28. Still another variation, shown in FIG. 9c, is to partition the cross-connect switch 10 such that the initial implementation is 32×32 on an initial optical switching matrix card 72, with the provision of an expansion port 73. This expansion port 73 and an extension board 74 are used to extend the initial optical 30 switching matrix card 72 to the size of 32×64. In this case an identical switch having another 32×64 optical switching card 75, can then be used to create an expanded switch having double the capacity in terms of port count. In this case two alternatives exist for coupling together the outputs. The first is shown in FIG. 9c, where per port per wavelength combiners 70 are provided, of which there would be sixty-four per wavelength, and therefore 64×160 per switch. The output of each combiner would be connected to a respective channel wavelength input of a wavelength division multiplexer 20 assigned to the respective port (as shown), or to an input of the wavelength-converting switch 28 (not shown). The second approach, shown in FIG. 9d, is to reverse the sequence of combining outputs of the MEMs and multiplexing the combiner outputs. This approach can be used for outputs that are to be multiplexed and eventually coupled to output ports of the switch 10. However, for outputs that are to coupled to the wavelength converting switch 28, these outputs should be combined in respective pairs (e.g. op64 and op64') before being coupled to the wavelength-converting switch 28. FIG. 9d shows forty-eight outputs of the switching matrix 18 destined for output ports of the switch 10 and sixteen to be coupled to the wavelength converting switch 28 (i.e. N=48 and K=16). In this second approach two banks of wavelength division multiplexers 20a, 20b multiplex the output port destined outputs of the MEMs, one multiplexer per port multiplexing M channel signals. That is, the first bank of multiplexers 20a, multiplexes the outputs op1 to op48 using one multiplexer per port, each multiplexer multiplexing M channel signals of distinct wavelength, and the second bank of multiplexers 20b, performing the same function for ports op1' to op48'. The resultant multiplexed signals of the banks 20a, 20b are combined on a port-by-port basis by respective combiners 71a. Two such resultant multiplexed signals 77a and 77b are shown in the figure. The output of each combiner 70 is then applied to a respective optical amplifier 22 for the port. The outputs, op49 to op64 and op49' to op64', are combined in respective pairs and each combined output is coupled to an input of the wavelength-converting switch 28 in the same manner as described earlier with reference to FIG. 9c. For example, FIG. 9d shows the outputs op64 and op64' connected to the combiner 70b, the resultant combined output of which is then for coupling to the wavelength-converting switch 28. This second approach increases the number of output WDM multiplexers 20a, 20b from 64 to 128, but reduces the number of combiners 70 from 10240 (i.e. 64×160) down to 2608 (i.e. 16×160+48). The second approach also simplifies cabling. Both of the variations shown in FIGS. 9c and 9d use two-port and three-port MEMs to allow the optical telecommunications switch to expand in the ports per wavelength direction.

Figure 9E:
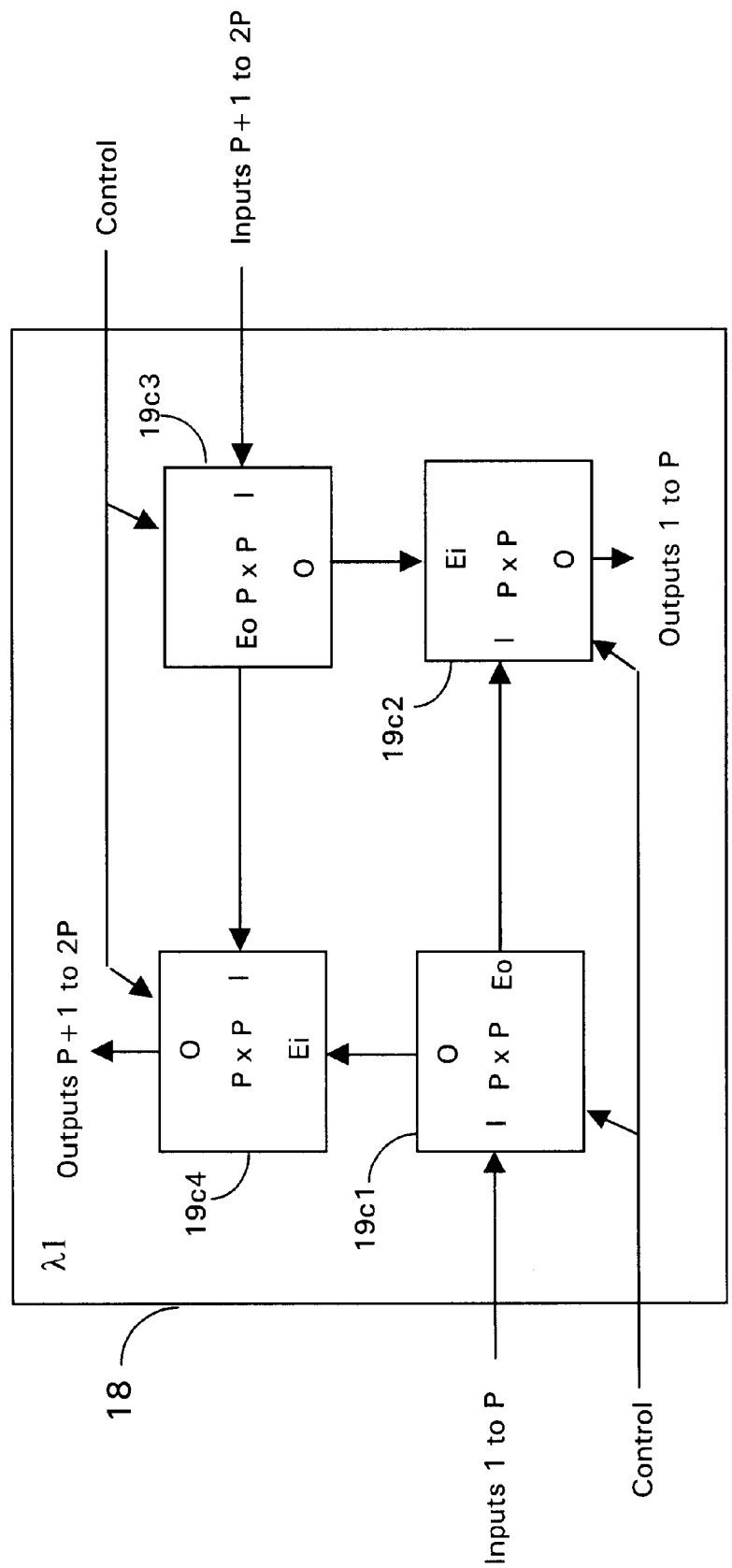
FIG. 9e is a functional block diagram of a sixth embodiment of the optical switching matrix of FIG. 3.

FIG. 9e illustrates, in functional block diagram, still another embodiment of the optical switching matrix 18, shown for the first channel wavelength. The optical switching element is comprised of four three-port P×P MEMs, which are referenced generally as 19c. The three-port MEMs 19c have interchangeable input and output ports and an expansion port, which acts as an input expansion port or an output expansion port, depending on whether the input and output ports are "normal" or "reversed". When the expansion port (third port) acts as an input expansion port it is aligned with the output port, as is the case with the MEMs 19d2 and 19d4. When the expansion port acts as an output expansion port it is aligned with the input ports, as is the case with the MEMs 19c1 and 19c3. MEMs 19c1 and 19c3 have an expansion output port Eo as the third port, and MEMs 19c2 and 19c4 have an expansion input port Ei as the third port. Operation of the MEMs 19c1 and 19c3 are of the same as the MEMs discussed earlier with reference to FIGS. 7 to 9d. In the case of the MEMs 19c2 and 19c4, the inputs of the expansion input port Ei of these MEMs are physically aligned with respective output ports (O) of these devices. An optical signal from an expansion input port (Ei) input will exit the MEMs from the respective output if none of the deflection mirrors in the column corresponding to the output has been activated into an upright position. In this way, any output of the MEMs 19c2, 19c4 can either emit an optical from its respective expansion input port or from an input port (I) of the MEMs.

In FIG. 9e, the MEMs 19c1 is the original MEMs device, that is, before addition of MEMs 19c2 to 19c4, to expand switching element 19. Inputs 1 to P from input ports 1 to P of the switching matrix 18 are connected to the input port (I) of the MEMs 19c1. The input port (I) of MEMs 19c2 is coupled to the expansion output port Eo of the MEMs 19c1, and output 1 to P of the switching matrix 18 are coupled to the output port of MEMs 19c2. The output port (O) of MEMs 19c3 is coupled to the input expansion port Ei of the MEMs 19c2, and has inputs P+1 to 2P from the now expanded switching matrix 18 coupled to its input port (I). The input port (I) of the MEMs 19c4 is coupled to the expansion output port Eo of the MEMs 19c3, and has outputs P+1 to 2P of the expanded switching matrix 18 coupled to its output port (O). In this arrangement any of the inputs 1 to 2P of the expanded switching matrix 18 can be switched to any its outputs 1 to 2P. Hence the original P by P switching element 19 has been expanded to a 2P by 2P switching element without the use of combiners 70, which saves about 2–3 dB in optical power loss. Again, N inputs and N outputs of the switching matrix 18 shown in FIG. 9e would be coupled to input and output ports of the switch 10 through WD demultiplexers 16 and WD multiplexers 20, respectively. Another K inputs and K outputs of the switching matrix 18 would be coupled to the wavelength-converting switch 28.

Figure 9F:
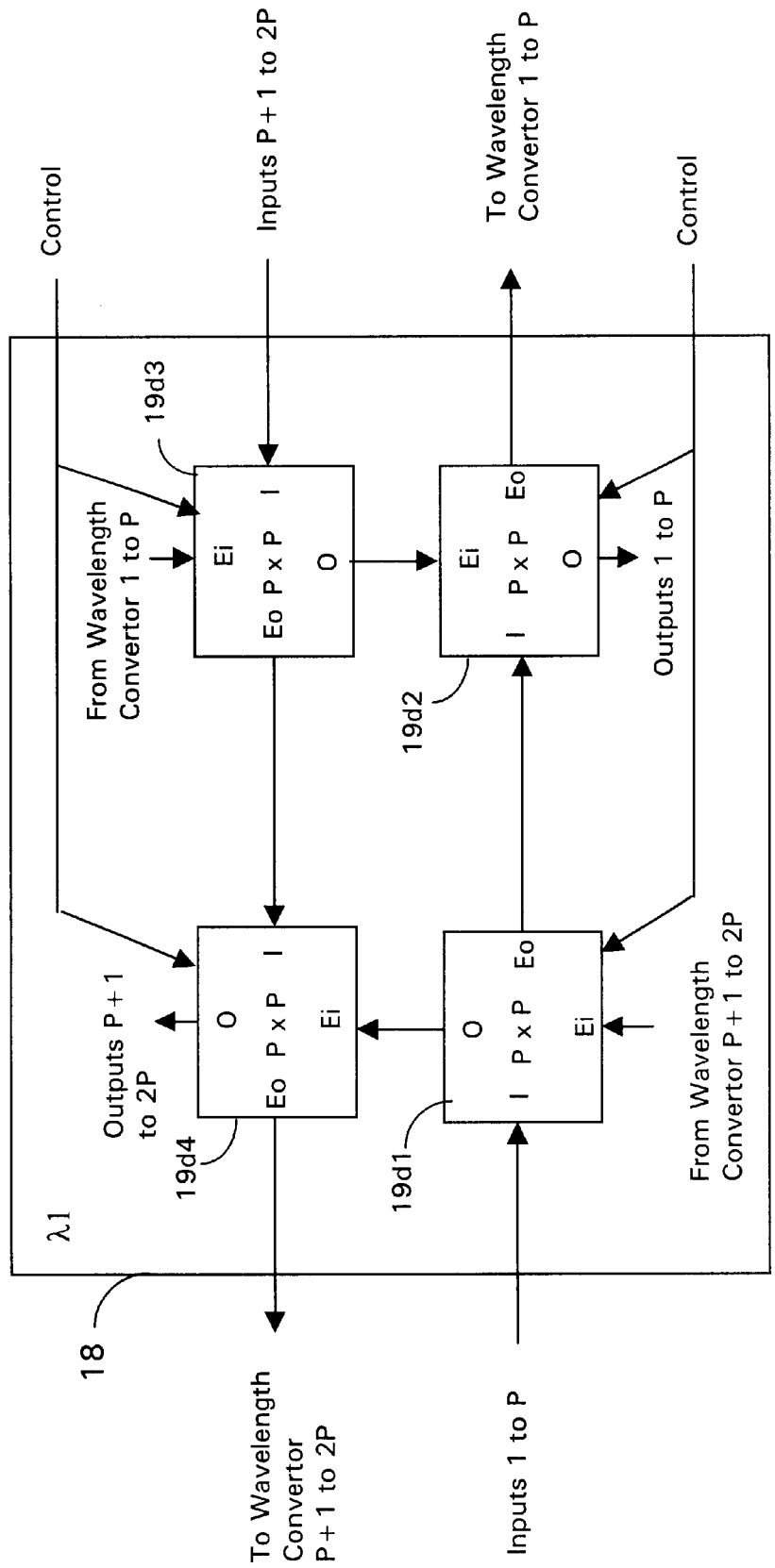
FIG. 9f is a functional block diagram of a seventh embodiment of the optical switching matrix of FIG. 3.

FIG. 9f illustrates, in functional block diagram, yet another embodiment of the optical switching matrix 18, shown for the first channel wavelength. The optical switching element is comprised of four P by P four-port MEMs 19d1 to 19d4, referred to generally as MEMs 19d. Each of the MEMs 19d1 to 19d4 has an input port (I), an output port (O), an expansion output port Eo, and an expansion input port Ei. In this arrangement the original MEMs 19d1 provides support for P inputs and P outputs before expansion of the switching element 19. After expansion, by the addition of the MEMs 19d2 to 19d4, the switching element 19 supports 2P inputs and 2P outputs. The interconnection of the MEMs 19d1 to 19d4 is the same as the MEMs 19c1 to 19c4 in FIG. 9e. The fourth port of the MEMs 19d1 to 19d4 is used for connection to the wavelength-converting switch 28. The expansion output ports Eo of the MEMs 19d2 and 19d4 have outputs 1 to P and P+1 to 2P, respectively, which are coupled to inputs of the wavelength converting switch 28. The input expansion ports Ei of the MEMs 19d3 and 19d1 have inputs 1 to P and P+1 to 2P, respectively, which are coupled to outputs of the wavelength-converting switch 28. In this arrangement an output 1 to P from the wavelength-converting switch 28 can be passed to a respective output 1 to P of the switching element 19, via the MEMs19d3 and 19d2. Similarly, an output N+1 to 2P from the wavelength-converting switch 28 can be passed to a respective output P+1 to 2P of the switching element 19, via the MEMs 19d1 and 19d2. An advantage of this arrangement over the previous expansion arrangements described in FIGS. 9a to 9e, is that input ports (I) and output ports (O) of the MEMs are not required for connection to the wavelength-converting switch 28. This connection is achieved through the expansion input ports (I) and expansion output ports (O) of the MEMs 19d1 to 19d4. Therefore, a 2P by 2P switching element 19 constructed as such with four-port MEMs can provide full interconnection between its 2P inputs and 2P outputs as well as provide connection of its 2P inputs to the wavelength-converting switch 28. However, such a 2P by 2P switching element 19 no longer has the ability to concentrate signals to be converted into a smaller number of ports (i.e. less than 2P) connected to the wavelength-converting switch 28. The lack of this ability places constraints on the implementation of the wavelength-converting switch 28. However, embodiments of the wavelength-converting switch 28 that are compatible with these constraints will be discussed later in this document.

Figure 9G:
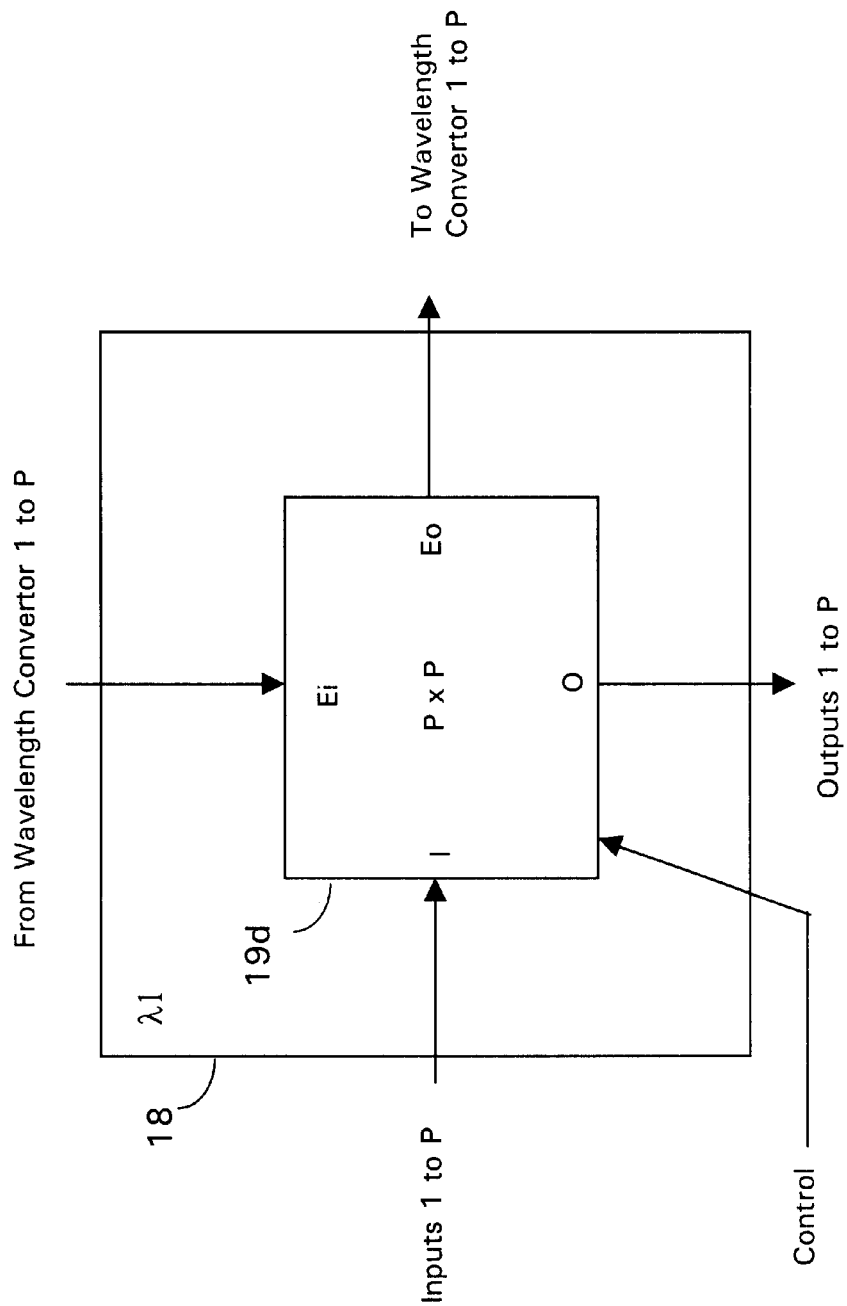
FIG. 9g is a functional block diagram of a eighth embodiment of the optical switching matrix of FIG. 3.

It should be clear that embodiments of the switching matrix 18 shown in FIGS. 9a to 9f that implement schemes for expanding the switching capacity of an original switching matrix 18 exploit a particular property of MEMs devices. That is, these embodiments make use of the fact that the through path has a smaller loss (~1 dB) than the switched path (~5 dB) in order to tandem multiple MEMs devices without incurring excessive losses. This is particularly important in the context of a photonic switch having a link budget which the switched path and through path losses have to remain within. FIG. 9g illustrates, in functional block diagram, yet another embodiment of the optical switching matrix 18, shown for the first channel wavelength. The optical switching element is comprised of one P by P four-port MEMs 19d. The switching matrix 18 provides full interconnection between its P input ports and its P output ports, that is any one of the P inputs can be switched to any one of the P outputs. The switching element 19 further provides interconnection of all P inputs to the wavelength-converting switch 28, through the expansion output ports Eo of the MEMs 19d. Furthermore, the switching element 19 provides interconnection of all P outputs from the wavelength-converting switch 28, through the expansion input ports Ei of the MEMs 19d. However, it should be noted that each input of the MEMs 19d corresponds to a respective expansion port output, which is aligned with the particular input, hence an optical signal arriving at an input can not be switched to a different expansion port output. Likewise, each expansion port input of the MEMs 19d is aligned with a respective output and can not be switched to a different output. Such a 2P by 2P switching element 19 no longer has the ability to concentrate signals to be converted into a smaller number of ports (i.e. less than 2P) connected to the wavelength-converting switch 28. The lack of this ability places constraints on the implementation of the wavelength-converting switch 28. However, embodiments of the wavelength-converting switch 28 that are compatible with these constraints will be discussed later in this document.

Figure 10:
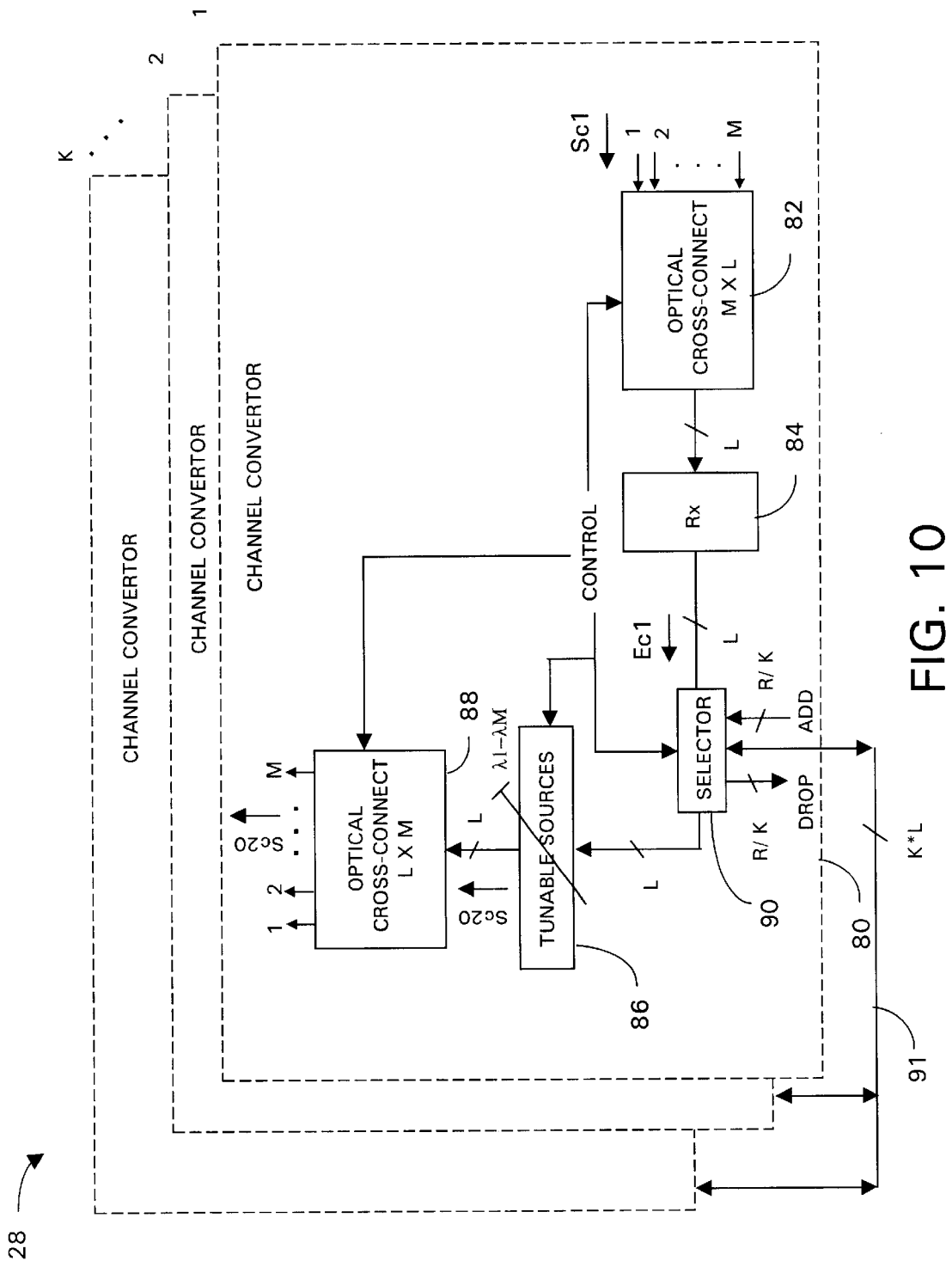
FIG. 10 is a functional block diagram of a second embodiment of the wavelength-converting switch shown in FIG. 3.

FIG. 10 illustrates, in a functional block diagram, a second embodiment of the wavelength-converting switch 28. The wavelength-converting switch 28 includes K channel convertors 80. Each channel convertor 80 has M inputs and M outputs. There is one input and one output for each channel wavelength. Each optical switching matrix 18 for a particular channel wavelength has an inter-matrix output connected to the input for the corresponding channel wavelength and an inter-matrix input connected to the output for the corresponding channel wavelength of each channel convertor 80.

As noted above with reference to FIG. 3, typically 25% of the inputs and outputs of the optical switching matrix 18 are connected to the wavelength-converting switch 28. Thus, a channel convertor is required for each of these input/output connections. Accordingly, K=8 in the case of the optical switching matrices 18 being 32×32 matrices. Furthermore, as shown in FIG. 3, there are R inputs/outputs on the wavelength-converting switch 28 for add/drop traffic.

As shown in FIG. 8, the R drop outputs and the R add inputs are distributed equally among the K cards, resulting in R/K drop outputs and R/K add inputs per card. Each channel convertor 80 has a M×L optical switch 82 connected to the inputs of the wavelength-converting switch 28. Since there are K channel convertors 80, the number of inputs that the wavelength-converting switch 28 has is K*M, which equals 1280 inputs. The wavelength-converting switch 28 also has 1280 outputs. A subset L of the outputs of the M×L optical switch 82 are each connected to respective optical receivers 84. In this embodiment the number L equals 32, but could be any number less than or equal to M. The M×L optical switch 82 directs input optical signals to the optical receivers 84 according to its connection map, which is determined by the controller 26. Each optical receiver 84 converts a received input optical signal into an electrical signal and outputs the electrical signal to a selector 90 (or small electrical switching fabric). The selector 90 includes the R/K inputs for adding channel signals and the R/K outputs for dropping channel signals. Optionally, a bus 91 interconnects the selector on each of the K channel convertors 80. The bus 91 has a width of K*L (i.e. L connections driven by a selector 90 on each of the K channel convertors 80). The controller 26 controls the operation of adding and dropping channel signals via the selector 90. This operation is shown as being done with electrical signals however the selector 90 could include opto-electric conversion capabilities to add/drop optical channel signals. The selector 90 forwards electrical signals to a tunable optical source 86. There are L tunable optical sources 86. Each tunable optical source 86 is operable over a range of M channel wavelengths. Currently available tunable sources typically have a tunable range of thirty-two channel wavelengths, however this range is increasing. Each tunable optical source 86 receives an electrical signal from the optical receiver 84 to which it is connected and outputs an output optical signal, which contains information present in the input optical signal, to an L×M optical switch 88. The output optical signal has a channel wavelength equal to the wavelength at which the controller 26 has set the tunable source 86. The L×M optical switch 88 directs output optical signals, according to its connection map set by the controller 26, to the outputs of the channel convertor 80.

The operation of the channel convertor 80 will now be further explained by way of example. An optical signal Sc1, of channel one wavelength, is applied to the first channel convertor 80 at the first input of the M×L optical switch 82. The optical signal Sc1 is directed by the M×L optical switch 82 to the first optical receiver 84. The first optical receiver 84 converts the information contained in the optical signal Sc1 into an electrical signal Ec1. The electrical signal Ec1 passes through the selector 90 and is applied to the first tunable source 86. The first tunable source 86 has been set to output an optical signal at the channel twenty wavelength. The first tunable source 86 outputs an optical signal Sc20, which contains the information in the electrical signal Ec1, to the first input of the L×M optical switch 88. The L×M optical switch 88 directs the optical signal Sc20 to the twentieth output of the channel convertor 80. The optical signal Sc20 is then further directed by the optical switching matrix 18 assigned to channel twenty.

In the case that the optical switching matrix 18 shown in either of FIGS. 9e or 9f is used in the switch 10, then the wavelength-converting switch 28 would comprise P channel convertors 80 (i.e. K=P) and the bus 91 with a width P*L. The bus 91 would then provide a similar degree of interconnectivity between the ports of the wavelength-converting switch 28, as the embodiment described earlier with reference to FIG. 4a.

A physical implementation of the embodiment of the wavelength-converting switch 28 shown in FIG. 10 would easily be realized in a manner similar to that shown in FIG. 4b. That is, the channel convertors 80 would be implemented on separate circuit cards with the bus 91 interconnecting the cards, and each of the cards connected to each of the switching matrices 18.

Figure 11:
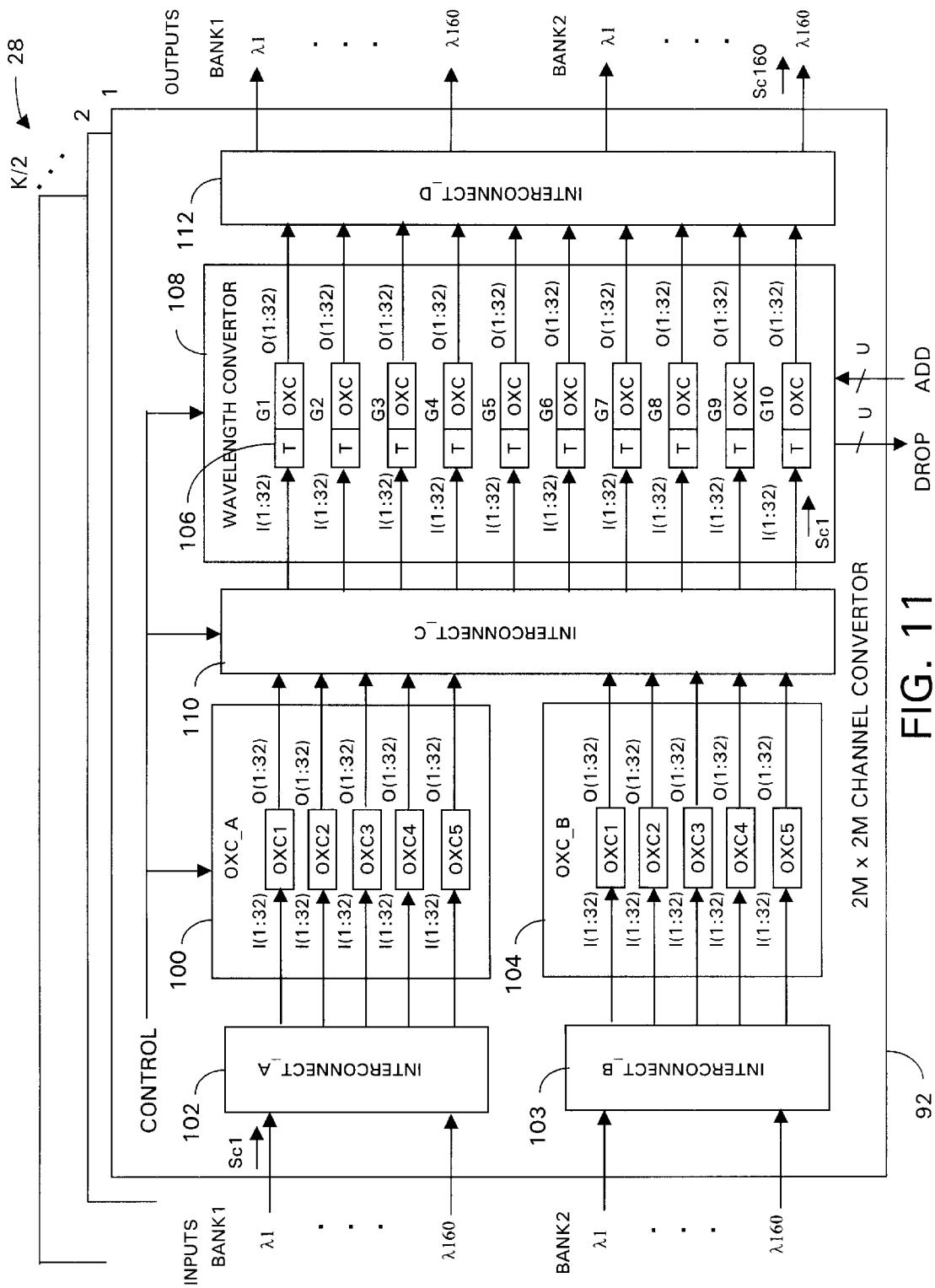
FIG. 11 is a functional block diagram of a third embodiment of the wavelength-converting switch shown in FIG. 3.

FIG. 11 illustrates, in a functional block diagram, a third embodiment of the wavelength converting switch shown in FIG. 3. This embodiment includes K/S, S*M×S*M channel convertors 92, where M=160 and S=2 in FIG. 11. Selection of a value for S will be explained later. The structure of the channel convertor 92 will be explained with reference to FIGS. 13 to 15 which provide tables specifying interconnections between components of the channel convertor 92. The channel convertor 92 has S*M inputs and S*M outputs. The inputs and outputs are arranged in S banks, in this case there are two banks, bank1 and bank2. Each bank has an input and an output for each of the channel wavelengths. That is, there are M inputs and M outputs per bank. The inputs/outputs of the banks connect to inter-matrix outputs/inputs of the appropriate switching matrices according to their channel wavelength. In the present embodiment of the switch 10, where K=8, the wavelength-converting switch includes four 2M×2M channel convertors 92.

The channel convertor 92 includes an optical switch100 (OXC_A), which comprises five 32×32 optical switches OXC1 to OXC5. The optical switch 100 is connected to the first bank of inputs via an interconnect 102 (interconnect_A). The interconnect 102 connects the inputs of bank1, to the inputs of the optical switch 100 according to table 1 in FIG. 13. For example, table 1 shows that the input is connected to the input I1 of the 32×32 optical switch OXC1. The remaining inputs of the optical switch OXC1 are connected to every fifth input of bank1 (e.g. 12 connected to 13 to and so on). Similarly, the optical switches OXC2 to OXC5 have inputs connected every fifth input of bank1 starting at input to ⵍ, respectively, as shown in table 1. The channel convertor 92 also includes another optical switch 104 (OXC_B) and another interconnect (interconnect_B) connected in a similar manner to the inputs of bank2, as shown in table 2 of FIG. 13.

The channel convertor 92 further includes a wavelength convertor 108 which is connected to the optical switches 100, 104 (OXC_A and OXC_B) via an interconnect 110 (interconnect_C). The wavelength convertor 108 includes ten convertor modules 106, labelled G1 to G10. Each convertor module 106 includes up to 32 tunable transponders, a 32×32 optical switch, 32 inputs labelled I(1:32) and 32 outputs labelled O(1:32). The convertor module 106 will be described in more detail later. The value of S, referred to earlier, is chosen to match the range of the tunable transponders to the size of the optical switches in the convertor modules G1 to G10. In this case, the transponders have a range of 16 channel wavelengths and the optical switches are 32×32, hence S is 32/16=2. The interconnect 110 connects the inputs of the wavelength convertor 108 to the outputs of the two optical switches 100, 104, as shown in table 3. For example, the first ten outputs of the optical switch OXC1 (O1 to O10) are connected to the first input of the convertor modules G1 to G10, respectively. Likewise, the second and third sets of ten outputs (O11–O20 and O21–O30) of the optical switch OXC1 are connected to the second and third inputs of the convertor modules G1–G10, respectively. The remaining two outputs O31 and O32 of the optical switch OXC1 are connected to the thirty-first inputs of the first and second convertor modules G1 and G2, according to table 3. The remaining optical switches OXC2 to OXC5 of the optical switch 100 (OXC_A) are connected in a similar manner as shown in table3 of FIG. 14. Similarly, the outputs of the optical switch 104 (OXC_B) are connected to the wavelength convertor in a similar manner, as shown in table3.

The outputs of the wavelength convertor 108 are connected to the two banks of outputs via another interconnect 112 (interconnect_D), as shown in table4 of FIG. 15. For example, the first sixteen outputs O1–O16 of the convertor module G1 are connected to the first sixteen outputs of bank1, respectively. The remaining sixteen outputs O17–O32 are connected to the first sixteen outputs of bank2, respectively. The remaining convertor modules G2 to G10 are connected in a similar manner to the remaining outputs in the banks, according to table4.

The wavelength convertor 108 also has add inputs and drop outputs for adding/dropping channel signals. Since the wavelength converting switch 28 provides R of each such inputs/outputs then each 2M×2M channel convertor, and hence each wavelength convertor 108, provides 2R/K add inputs and 2R/K drop outputs. This will be explained in more detail later.

The controller 26 controls the operation of the optical switches 100, 104 (OXC_A and OXC_B) and the wavelength convertor 108.

The interconnects 102, 103, 112 (interconnect_A, interconnect_B and Interconnect_D) would typically be implemented as optical fiber connection. However, the interconnect 110 (interconnect_C) could be optical fiber, but could additionally include several 32×32 optical switches which interact with the optical switches 100,104 and the optical switches in the convertor modules G1 to G10 to create a standard CLOS arrangement.

Operation of the third embodiment of the wavelength-converting switch 28 will now be further explained by way of example. A channel signal Sc1 of a first wavelength arrives at the first input of bank1. The interconnect 102 (interconnect_A) connects the signal Sc1 to the first input I1 of the optical switch OXC1 which routes the signal Sc1 to its tenth output O10. The interconnect 110 (interconnect_C) connects the signal Sc1 to the first input I1 of the tenth convertor module G10. The tenth convertor module G10 receives the signal Sc1, converts it to another channel signal Sc160 of the 160 channel wavelength, and routes the signal Sc160 to its sixteenth output O16. The interconnect 112 (interconnect_D) connects the signal Sc160 to the 160th output of bank1 where it is output from the wavelength-converting switch 28, into one of the ports on the optical switching matrix 18 associated with the channel wavelength.

Figure 12:
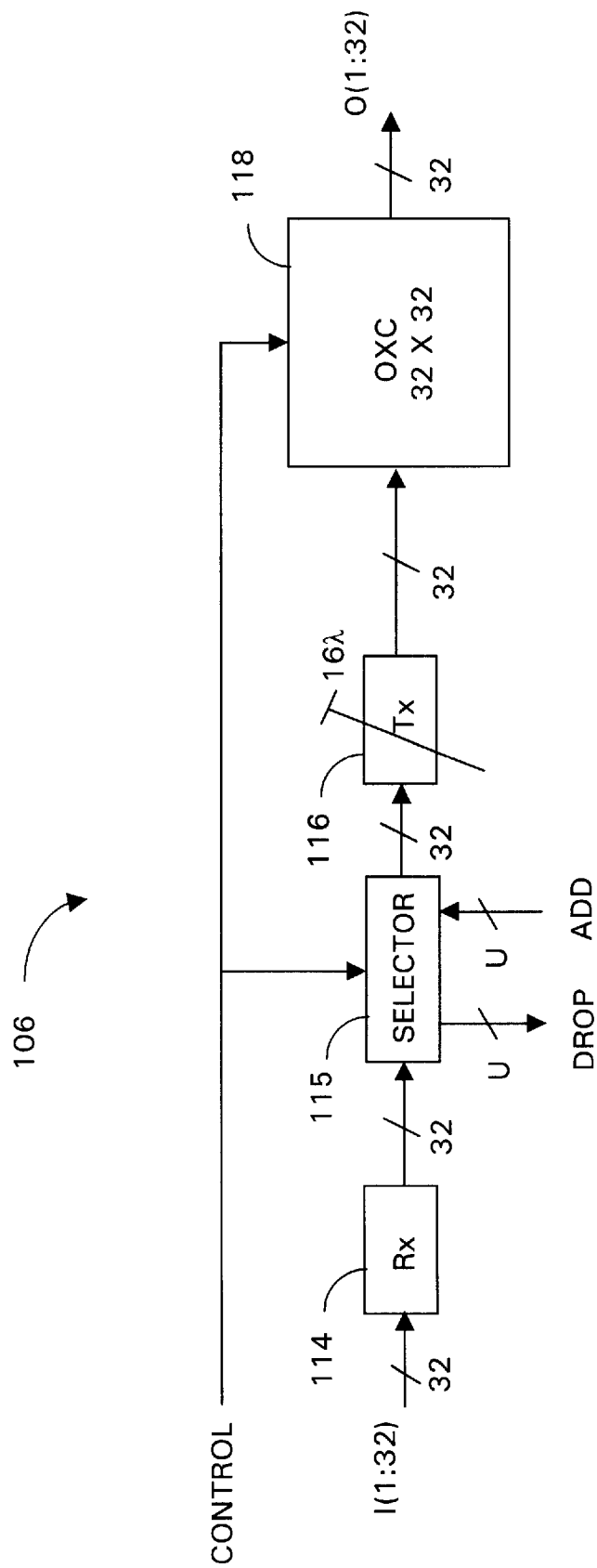
FIG. 12 is a functional block diagram of an embodiment of the converter module shown in FIG. 11.

FIG. 12 illustrates in a functional block diagram an embodiment of a converter module 106 shown in FIG. 11. The convertor module 106 includes receivers 114, connected to the inputs I1 to 132, a selector 115 connected to the outputs of the receivers 114 for add/drop capability, and tunable transponders 116, connected to the outputs of the selector 115. The tunable transponders 116 are tunable over a range of sixteen channel wavelengths in this embodiment. The convertor module 106 is provisionable for up to 32 tunable transponders. However, options exist where some of the tunable transponders can be replaced by fixed transponders. Each receiver 114 can receive a channel signal of any of the M wavelengths, and convert the received channel signal to an electrical signal. The selector 115 is used to add/drop electrical signals in/out of the convertor module. There are U add inputs and U drop outputs shown in FIG. 12, where U=2R/10K. The value for U is derived from the total number (R) of add/drop inputs/outputs for the wavelength converting switch 28 divided by the number of S*M×S*M channel convertors (K/2) divided by the number of wavelength convertor modules (10). The outputs of the transponders 116, are connected to the inputs of a 32×32 optical switch 118. The optical switch 118 routes each channel signal it receives to an output according to the wavelength of the channel signal being routed. Operation of the tunable transponders 116 and the optical switch 118 is under control of the controller 26.

Figure 14:
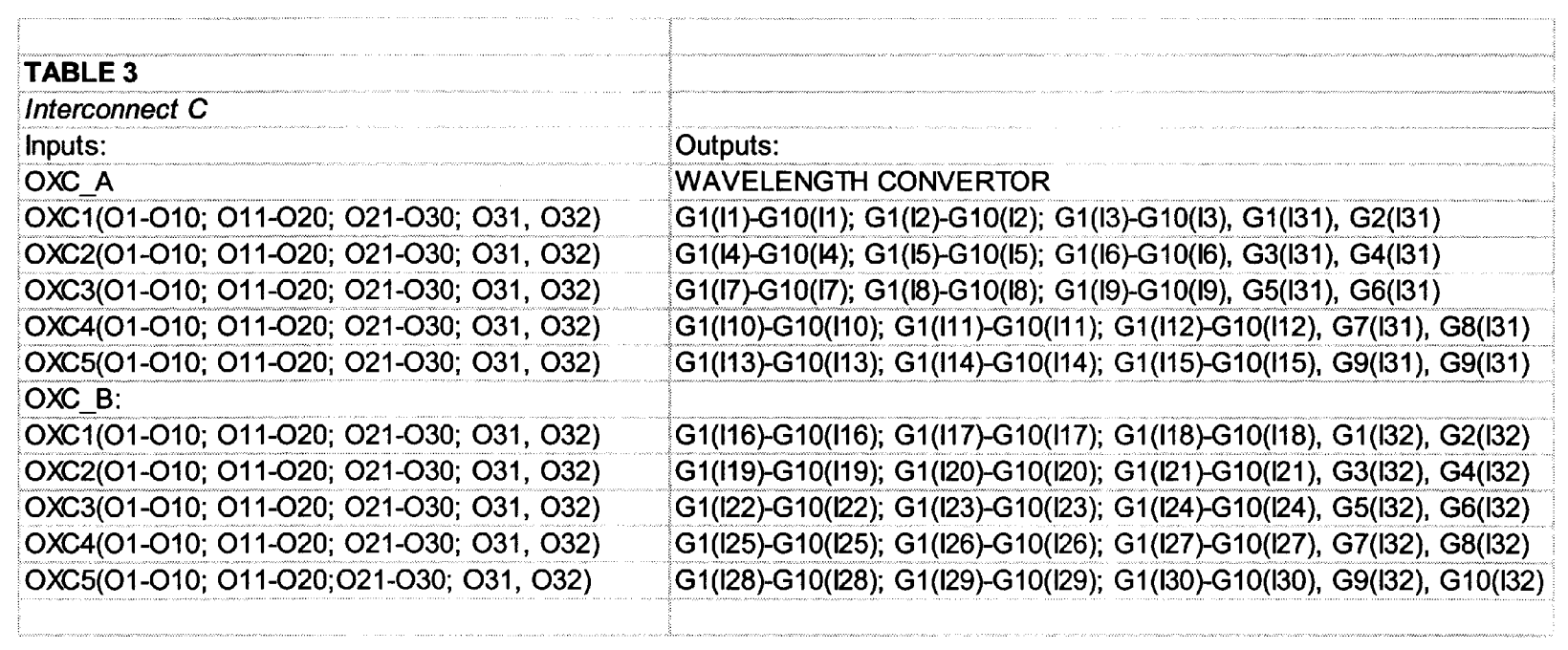

FIGS. 13 to 15 are tables which respectively show the connections made by the interconnects A and B, interconnect C, and interconnect D of FIG. 11.

A physical implementation of the embodiment of the wavelength-converting switch 28 shown in FIG. 11 would easily be realized in a manner similar to that shown in FIG. 4b. That is, the channel 2M×2M convertors 92 would be implemented on separate circuit cards with each of the cards connected to each of the switching matrices 18.

Figure 16A:
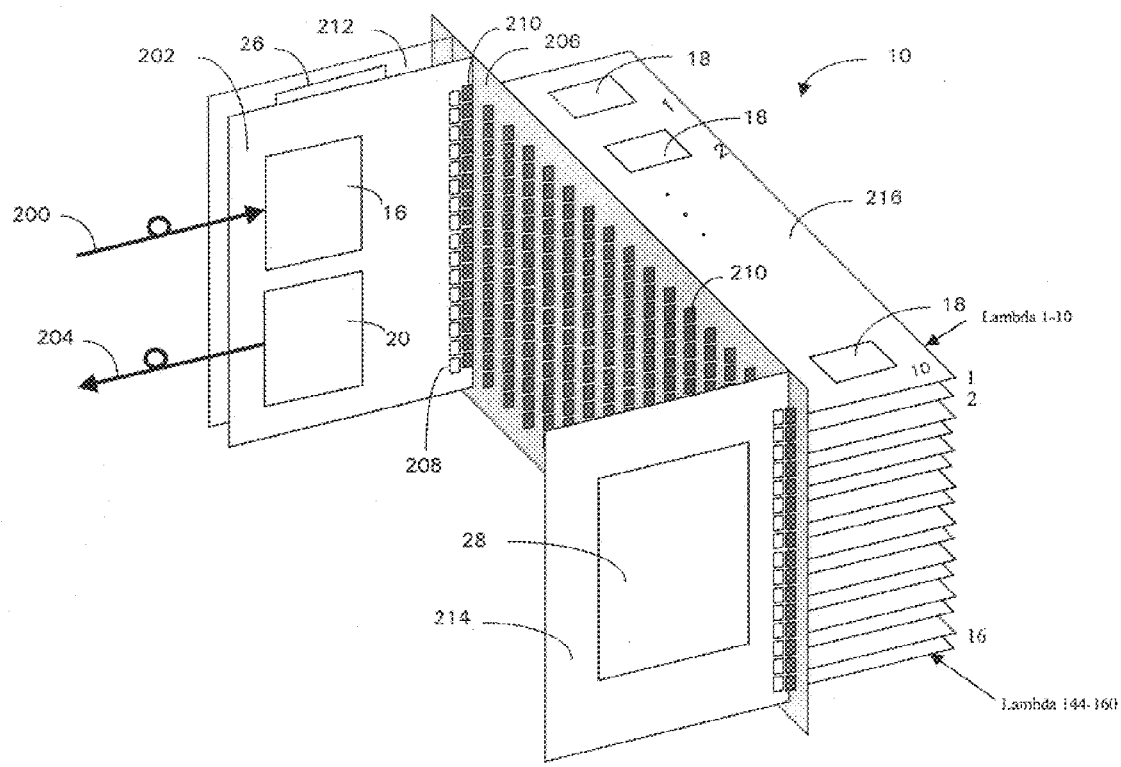
FIG. 16a is a perspective view of a physical arrangement of the cross-connect switch of FIG. 3, which includes the wavelength-converting switch of FIG. 4e.
Figure 17:
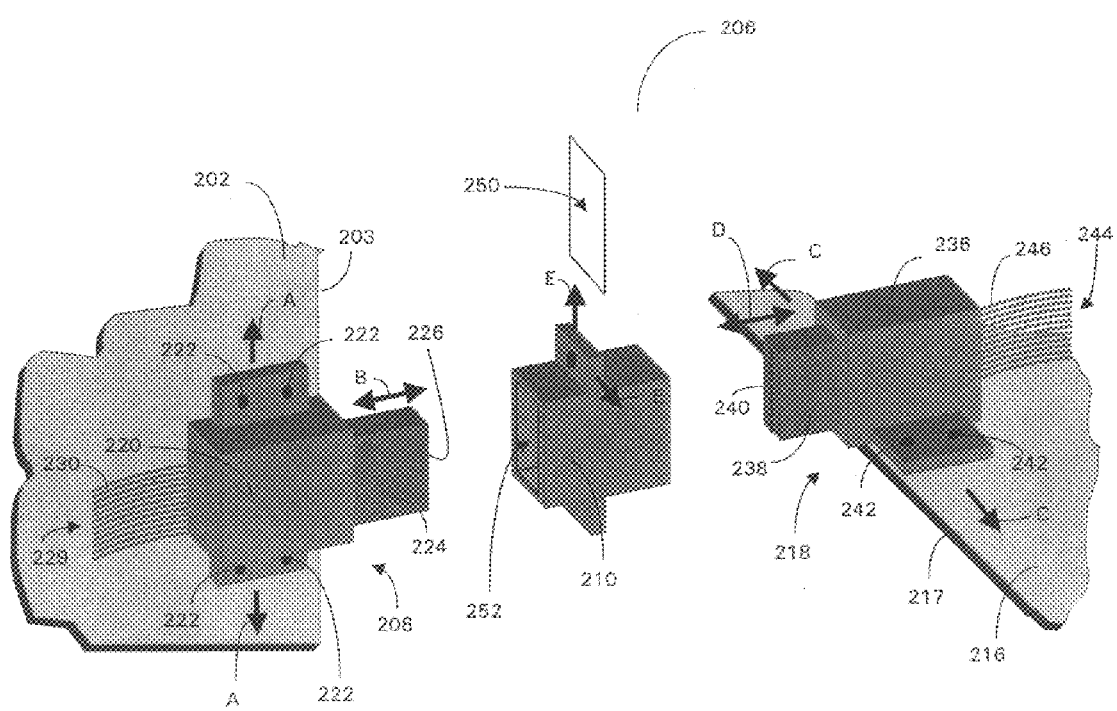
FIG. 17 is a perspective view of the optical connectors in FIG. 16.

With reference to FIGS. 16a and 17, the physical arrangement of the switch 10 will now be described. The basic switch physical structure includes two arrays of circuit cards arranged physically orthogonal to each other. One plane of the physically orthogonal arrangement consists of per lambda switching circuit cards 216 while the other orthogonal plane consists of I/O circuit cards 202 (i.e. tributary/WDM cards) and wavelength convertor circuit cards 214, which also have add-drop ports. Only one wavelength convertor circuit card 214 is shown in FIG. 16a for clarity, however there could be several as described earlier with reference to FIG. 4b. This arrangement facilitates an array of optical connections between the cards, with every I/O card 202 and convertor card 214 having access to every switching card 216. The arrangement also eliminates any need for an optical backplane since all the optical connections simply pass straight through a midplane 206, the function of which is primarily to provide mechanical alignment for the optical connections and electrical interconnect between the cards.

An input fiber 200 is coupled to the WD demultiplexer 16 on an I/O circuit card 202 and an output fiber 204 is coupled to the WD multiplexer 20 on the same I/O card. I/O circuit cards 202 are held in mechanical alignment with respect to the switching circuit cards 216 by the midplane 206. This alignment is accomplished via alignment ferrules 210, which are mounted on and pass through the midplane 20, and by a plurality of optical connectors 208, 218 mounted adjacent an edge 203, 217 of the I/O circuit cards 202 and switching circuit cards 216, respectively. The controller 26, implemented on a controller circuit card 212, and wavelength converting switch 28, implemented on a convertor circuit card 214, are also aligned by optical connectors 208 on the cards 212, 214 which are inserted into the alignment ferrules 210 on the midplane 206. Alternatively, the controller card 212 and convertor card 214 could be interface cards connected to a central controller 26 and central wavelength converting switch 28. These alternatives will be described later in more detail.

Additionally, as is commonly used with circuit cards and midplanes, other hardware such as tracks and clamps (not shown) are used to hold the cards. There is a plurality of such I/O cards, however only one is shown in the FIG. 16 for clarity. Furthermore, there can also be a plurality of convertor circuit cards 214, depending on the size of the wavelength-converting switch 28 and how it is partitioned into circuit cards. All of the aforementioned circuit cards are arranged in a standard orientation with respect to the midplane 206 without the need for propagating optical signals along a backplane structure. That is, the circuit cards are spaced apart at standard intervals, are substantially parallel to each other, and are perpendicular to the midplane 206. Besides providing mechanical alignment, the midplane 206 also provides electrical connectivity and power to the I/O cards 202, controller cards 212, convertor cards 214 and switching cards 216.

There can be several optical switching matrices 18 per switching card 216. There is a plurality of switching circuit cards 216. FIG. 16a shows sixteen switching circuit cards 216 covering channel wavelengths 1 to 160. The switching circuit cards 216 are arranged in the previously mentioned standard orientation with respect to the midplane 206. However, each of the switching circuit cards 216 is on the opposite side of the midplane 206 with respect to the I/O circuit cards 202, convertor circuit cards 214, and controller circuit cards 212, and is also in a perpendicular orientation with respect to the same cards. In this way, each I/O circuit card 202 is in close physical proximity to each switching circuit card 216 and can be communicatively coupled via respective optical connectors 208, 218 on the cards and by way of the alignment ferrules 210 on the midplane 206.

For cross-connect switches 10 having a large number (P) of input/output ports, or a large number (M) of channel wavelength per port, the switch 10 can be configured with shelves, each shelf containing a subset of the circuit cards. Additionally, it may be desirable to include more than one optical switching matrix 18 on a switching circuit card 216, as shown in FIG. 16. For example, referring to the embodiment described earlier in which M=160 and P=32, each switching circuit card 216 could include ten optical switching matrices 18, each matrix 18 for a separate channel wavelength. In this case, sixteen switching circuit cards 216 would be required to support 160 channel wavelengths, ten switching circuit cards 216 per shelf.

Figure 16B:
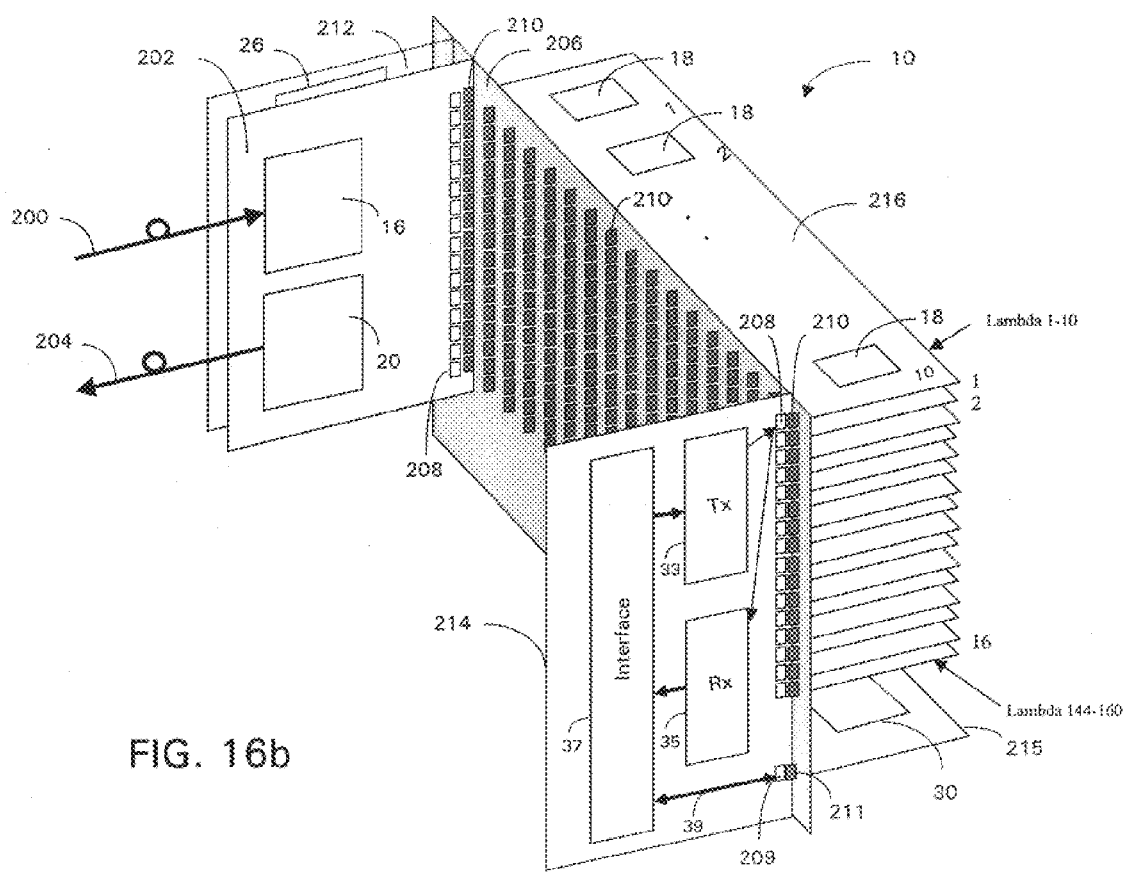
FIG. 16b is a perspective view of another physical arrangement of the cross-connect switch of FIG. 3, which includes the wavelength-converting switch of FIG. 4e.

FIG. 16b is a perspective view of another physical arrangement of the cross-connect switch of FIG. 3, which includes the wavelength-converting switch 28 of FIG. 4e. Only one wavelength convertor circuit card 214 has been shown for clarity, although there could be several such cards (e.g. four) as described earlier with reference to FIG. 4e. The circuit card 214 optically connects to the switching circuit cards 216 via connectors 208, 218 (not shown) and alignment ferrules 210 as described earlier with reference to FIG. 16a. Transmit bank 33 and receive bank 35 are coupled to the connectors 208 via optical fibers. The interface 37 is connected to the transmit bank 33 and receive bank 35 as described earlier with reference to FIG. 4e. A connector 209, either optical like the connector 208, or an electrical connector, couples the interface 37 to the electrical switch 30 via the electrical, or optical, bus 39. The electrical switch 30 is provided on a switch circuit card 215 and connects to the bus 39 via an alignment ferrule 211, similar to the alignment ferrule 210, in the case of an optical connection, or a double-ended male type connector for an electrical connection. A connector (not shown) corresponding to the connector 209 is provided on the switch circuit. card 215.

Figure 18C:
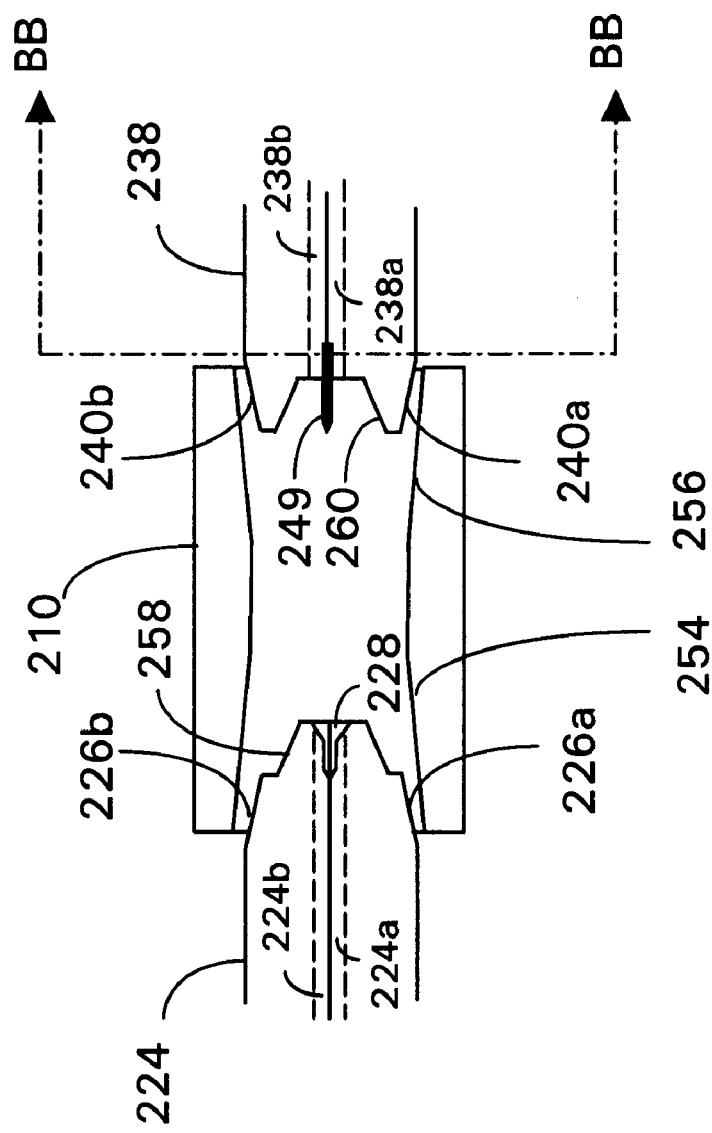
FIG. 18c is a cross-sectional top view of the connectors and alignment ferrule of FIG. 17 taken along the line AA in FIG. 18b.

With reference to FIGS. 17 to 18c, the optical connectors 208, 218 and alignment ferrules 210 will now be described in further detail. The optical connector 208 is mounted adjacent the edge 203 of an I/O circuit card 206. The optical connector 208 is comprised of a housing 220 mounted on the I/O circuit card 202 via elongated, or slotted, through holes 222 and bolts or rivets (not shown). The longitudinal axis of the holes 222 is aligned with the edge 203 of the circuit card 202. Mounting the housing 220 to the circuit card 202 in this manner allows movement of the connector 208 along a portion of the edge 203 of the circuit card 202, as shown by arrows (A) in FIG. 17. The range in movement of the connector 208 should be sufficient to allow the connector 208 to be brought into alignment with the alignment ferrule 210 and inserted in it. Typically, this range is in the order of a millimetre. The housing 220 houses a mating insert 224 having a mating face 226, which faces in the same direction as the edge 203 of the circuit card 202. The mating face 226 has a pair of sockets 228 for receiving alignment pins 249 from the corresponding optical connector 218 mounted adjacent an edge 217 of a switching circuit card 216. The alignment pins 249 are precision tungsten pins, or another hard, durable material. Other positive engagement, or alignment, features could be used as well or instead. An optical fiber ribbon cable 229 having a plurality of optical fibers 230 is held in the mating insert 224. Each fiber 230 has an end 232 that is flush with the mating face 226. A pair of leaf springs 234 mounted in the housing 220 provides flexible biasing of the mating insert 224 in the direction that the mating face 226 faces. The mating insert 224 is mounted in the housing 220 such that it is moveable in the direction of the biasing and in the opposite direction, as shown by arrows B in FIG. 17. The result is the mating insert 224 can move in a direction transverse to the edge 203 of the circuit card 202 and in a plane parallel to the plane of the circuit card 202. The biasing helps ensure the optical fibers of the connectors 208, 218 remain in a communicatively coupled relationship when the connectors 208, 218 are in the alignment ferrule 210.

The corresponding optical connector 218 mounted on the edge 217 of the switching circuit card 216 is similar in structure to the optical connector 208 described above. The difference is that it does not contain the sockets 228, but instead includes the alignment pins 249 and has been rotated by 90 degrees with respect to the card 216. The optical connector 218 has a housing 236, which houses a mating insert 238 having a mating face 240. The housing 236 is mounted adjacent the edge 217 of the switching circuit card 216 via slotted through holes 242. This is done in a manner that allows movement of the housing 236 along the edge 217 of the switching circuit card 216, as shown by arrows C in FIG. 17. A pair of leaf springs 243 provides biasing in the direction of the mating face 240. The mating insert 238 is mounted such that it is moveable in the direction of the biasing and in the opposite direction, as shown by arrows D in FIG. 17. An optical fiber ribbon cable 244 having a plurality of optical fibers 246 is held in the mating insert 238. Each fiber 246 has an end 248 which is flush with the mating surface 240 such that they achieve an optically coupled relationship with a respective fiber 230 of the optical fiber ribbon cable 229 when the mating surfaces 226, 240 are brought into contact with each other. The plurality of optical fibers 230, 246 are connected to optical components such as WD demultiplexers 16, WD multiplexer 20, and optical switching matrices 18 on their respective circuit boards.

The alignment ferrule 210 is mounted on the midplane 206 and extends through an opening 250 therein. There are a plurality of openings 250 in the midplane 206 for mounting a plurality of the alignment ferrules 210, one of such openings 250 is shown without an alignment ferrule 210 in FIG. 17. These openings 250 are located at the intercepts of the switching circuit cards 216 and the convertor circuit cards 214 (or I/O cards 202, controller cards 212) to provide a path for optical connections between the cards 216, 214. The alignment ferrule 210 has an aperture 252 for receiving the mating inserts 224, 238. The alignment ferrule 210 has a chamfered inner edge 254, 256 around the periphery on either side of the aperture 252 for assisting the mating inserts 224, 238 into alignment. Alternatively the aperture 252 could have a tapered inner surface which gradually reduces the size of the aperture, reaching a minimum at, or near, the midpoint of the aperture 252 (as shown in FIG. 18c). In this case the mating inserts 224 and 238 could further have chamfered, or sloped, corners 226a,b and 240a,b on their mating faces 226, 240, respectively. The mating face 226 has a ridge 258 aligned with the sockets 228 and the mating face 240 has a corresponding groove 260 aligned with the pins 249. The ridge 258 and the groove 260 are for assisting the mating faces 226, 240 into alignment such that the pins 249 can be inserted into the sockets 228, thereby aligning the fiber ends on the polished faces 232,248, to establish an optical connection between the plurality of optical fibers 230, 246.

Both connectors 208, 218 require two degrees of movement within the plane of the midplane 206 unless the alignment ferrule 210 is provided this freedom of movement (shown as arrows E in FIG. 17) by the manner in which it is mounted on the midplane 206. In the case where the alignment ferrule 210 is fixedly mounted on the midplane 206, a small amount of flexing of the circuit card (202, 212, 214, and 217) provides one degree of movement while the moveable manner in which the respective connector 208, 218 is mounted on its card (as described earlier) provides the other degree of movement.

With reference to FIG. 18c the operation of the alignment features of the optical connectors 208, 218 and alignment ferrule 210 will now be discussed in further detail. Precision in alignment in the order of at least 1–2 microns is required to optically connect the polished faces of the optical fibers 229, 244. Alignment progresses in three stages; each stage providing a finer degree of precision in the alignment. The first stage is provided by the mechanical interaction of the chambered, or sloped, corners 226a,b and 240a,b with the corresponding chambered, or tapered, surfaces 254, 256 of the alignment ferrule 210. This first stage provides approximately one millimeter of alignment precision. The second stage of alignment is provided by mechanical co-operation between the ridge 258 and corresponding groove 260 on the mating faces 226, 240 of the mating inserts 224, 238, respectively. This stage provides approximately 20–100 microns of alignment accuracy. The final stage of alignment is provided by the engagement of the pins 249 in the sockets 228. This final stage provides approximately 1–2 microns of alignment accuracy. The details of the alignment of the fibers 229, 244 within respective alignment structures 224a,b and 238a,b will be described with reference to FIG. 18d.

Figure 18D:
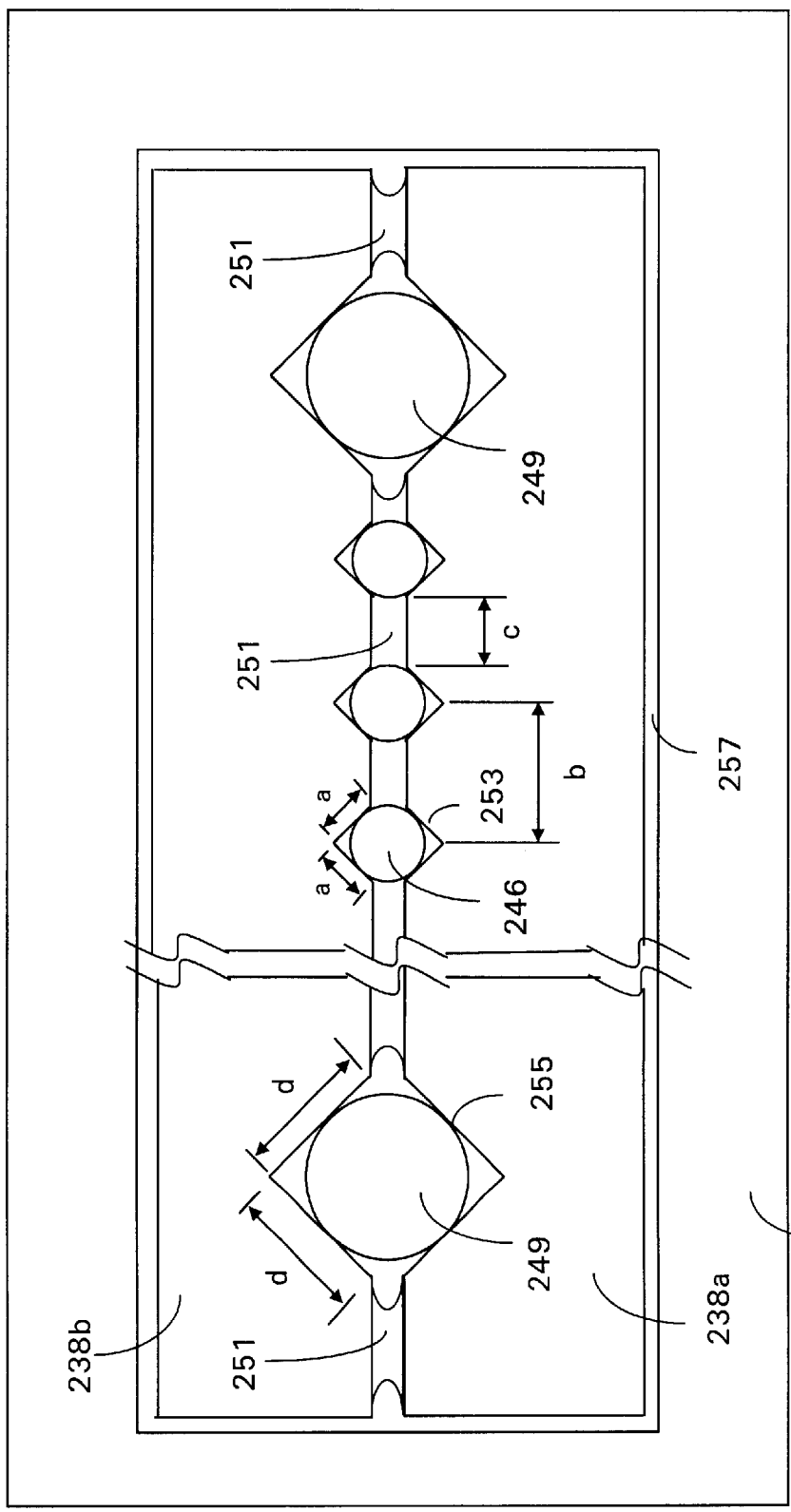
FIG. 18d is a cross-sectional front view of the mating face of the connector taken along the line BB in FIG. 18c.

FIG. 18d is a cross-sectional front view of the mating face 240 of the connector 218 taken along the line BB in FIG. 18c. Two etched silicon wafer slice alignment structures 238a,b are housed in the mating insert 238. Each structure 238a,b has fiber grooves 253 for aligning fibers 246 and pin grooves for aligning pins 249 etched on one of its planar surfaces. The fibers 246 are stripped of their protective cladding before installation in the fiber grooves 253. The fiber grooves 253 are V-shaped with a side dimension (a) equal to approximately 120 microns to accommodate a 125 micron fiber 246 with allowance for an epoxy fill 251 between the structures 238a,b. The thickness of the epoxy is set by compressing the structure 283a,b together thereby clamping the pins 249 and fibers 246 in position. The etched V-shaped grooves on the silicon are dimensioned such that the silicon clamps firmly on to the fibers when a gap of about 5–7 microns exists between the Wafers. Hence the V-shaped grooves clamp the fibers into their locations with high precision. The etched pin grooves 255 are also V-shaped and have a side dimension (d) equal to about 245 micron to accommodate a tungsten pin 249 of just under 250 microns in diameter and a maximum length in the order of 2000 microns (2 mm) of protrusion beyond the mating insert 238. The pin could also be of square cross-section with a thickness of just under 250 microns. The fiber grooves 253 are spaced apart at regular intervals (b), measured from center to center of adjacent grooves, the interval (B) equal to about 250 microns. This spacing results in a surface distance (c) between the grooves of about 80 microns. The pins 249 and fibers 246 are fixedly held between the alignment structures 238a,b by the epoxy fill 251 when hardened. The epoxy fill 251 also holds the alignment structures 238a,b together in addition to forces provided by the matin g Insert 238 when the structures 238a,b and insert 238 have been assembled together. Optionally a "float" space 257 between the mating insert 238 and alignment structure 238a,b, which is housed in an aperture in the mating insert 238, can be provided to allow the pins 249 to carry out the final alignment without fighting the other alignment features. The matting insert 224 of the connector 208 has the same structure except that the pins 249 are replaced by sockets 228, which may additionally have ferrules inserted therein.

Figure 19:
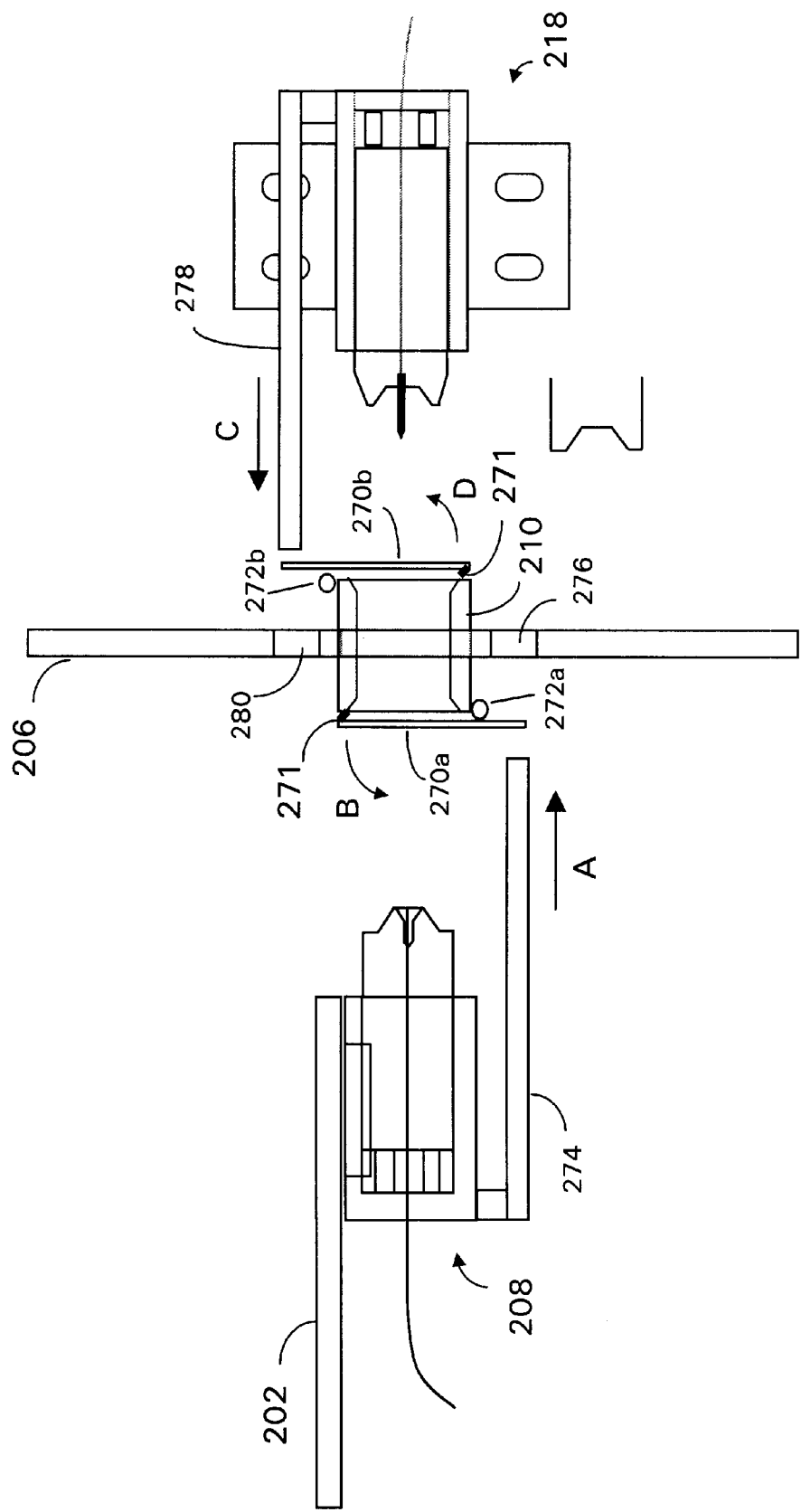
FIG. 19 is a line drawing plan view of a second embodiment of the optical connectors in FIG. 16.

With reference to FIG. 19, a second embodiment of the optical connectors 208, 218 and alignment ferrule 210 will now be described in further detail. The alignment ferrule 210 includes shutters 270a, 270b; each mounted at opposite ends of the aperture 252 via respective biased hinges 272a, 272b and covering the aperture 252 in a closed position . The shutters prevent particulate contaminants from entering the aperture 252, as well as solving a problem of "eye-safety" endemic in modern optical communication systems due to the optical intensity used, by blocking potentially harmful invisible infrared light emissions from a partially equipped shelf (e.g. when, or after, a circuit card has been removed from the midplane 206). Each shutter has a short side that extends past its respective biased hinge and a long side that covers the aperture 252. The shutters have a dust seal 271 on their inner surfaces, which prevents particulate contaminants from entering the aperture 252 of the alignment ferrule 210.

The biased hinges 270a, 270b, are mounted along an outer edge of the alignment ferrule 210 so that their longitudinal axis are parallel to the midplane 206. An activation arm 274 disposed on the optical connector 208 opposite the circuit card 202 opens the shutter 270a outwardly against the closing force of the biased hinge 272a. This is done by applying a force on the short side of the shutter 270a as the optical connector 208 is brought into connection with the alignment ferrule 210. The dust seals 271 come into contact with the exterior side face of the respective optical connector 208, 218 when the shutters 270a, 270b are fully open. This is to prevent contaminants from entering the aperture 210 both on insertion and withdrawal of the optical connectors 208, 218 and requires that, as well as cleaning the optical face of the connector (as would be normal procedure), the area protected by the shutter should be cleaned prior to circuit card insertion. Arrows labelled A and B indicate the motion of the activation arm and the shutter 270a, respectively. An aperture 276 in the midplane 206 receives the activation arm 274 as the optical connector 208 is inserted in the alignment ferrule 210. The optical connector 218 has a similar activation arm 278 for outwardly opening the shutter 272b against the closing force of the biased hinge 270b (see arrows C and D). A similar aperture 280 receives the activation arm 278 when the optical connector 218 is inserted in the alignment ferrule 210. When either of the optical connectors 208 or 218 are removed from the alignment ferrule 210, the respective shutter 270a, 270b returns to the closed position thereby protecting the corresponding optical connector 218 or 208, and alignment ferrule 210 from foreign matter.

Figure 20:
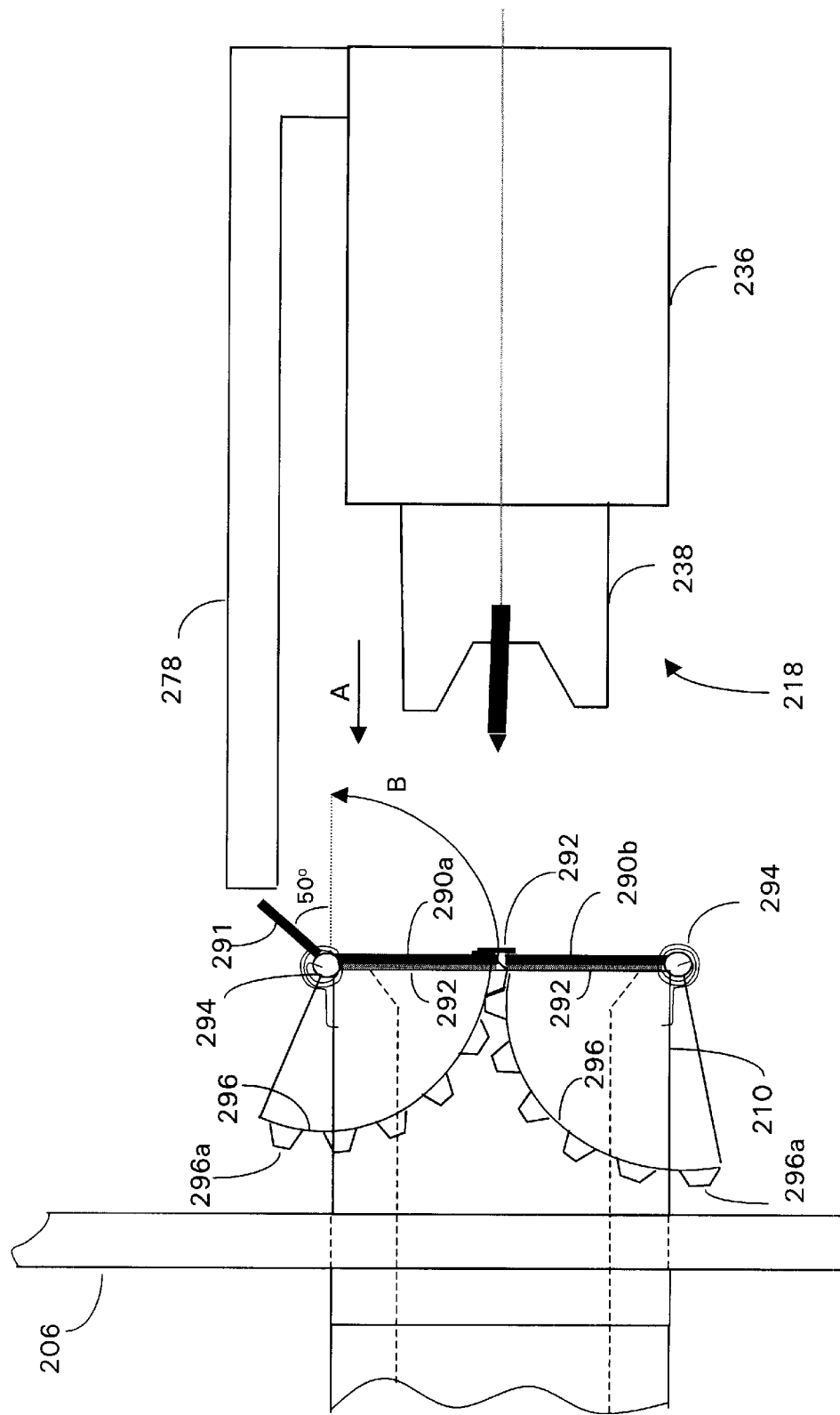
FIG. 20 is a line drawing plan view of a third embodiment of the optical connectors in FIG. 16.

FIG. 20, depicts a third embodiment of the optical connectors 208, 218 and alignment ferrule 210 in which a pair of outwardly opening shutters 290a,b are mounted at each end of the aperture 252 via respective biased hinges 294. FIG. 20 shows only one side of the alignment ferrule 210, however identical shutters would also be included on the other side. The biased hinges 294 bias the shutters to a closed position such that the aperture 252 is covered by the shutters 290a,b. The hinges 294 are mounted along an outside edge of the aperture 252, their longitudinal axis parallel to the midplane 206 when the alignment ferrule 210 is mounted therein. The shutter 290a has an arm 291 extending past its respective hinge 294 at an acute angle (e.g. 50 degrees) with respect to the alignment ferrule 210 for engaging the activation arm 278. Arc-shaped members 296 having a toothed edge 296a are disposed at upper ends of the shutters 290a, 290b. The toothed edge 296a of the member 296 disposed on the shutter 290a engages the corresponding toothed edge 296a of the member 296 disposed on shutter 290b, causing the shutter 290b to open outwardly when the shutter 290a opens outwardly. As the optical connector 218 is brought towards the aperture 252, the activation arm 278 engages the shutter arm 291 causing the shutters 290a,b to open outwardly. In the opened position the shutters 290a,b reside alongside and in contact with either side of the housing 236. Arrows labelled A and B denote the motion of the optical connector 218 and shutters 290a/b, respectively. The shutters 290a,b each include a dust seal 292 on their surface adjacent the aperture 252. Each dust seal comes into contact with an exterior side of the connector housing 236 when the shutter 290a,b is fully open. This helps to prevent entry of contaminants into the aperture 210 both during insertion and withdrawal of the connector 218. When the optical connector 218 is removed, the shutters 290a,b return to their closed position with the dust seal maintaining contact with the alignment ferrule 210 and between the shutters 290a,b, thereby protecting the aperture 252 from foreign material.

Figure 21:
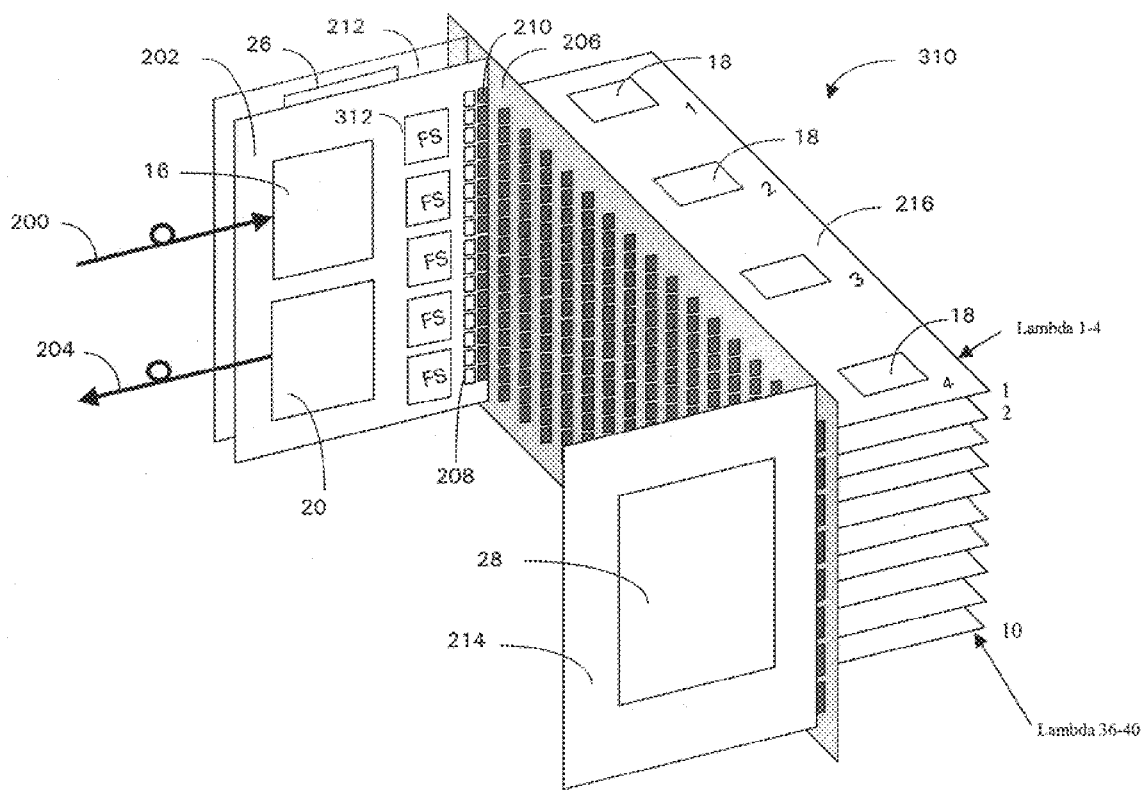
FIG. 21 is a perspective view of a switching shelf, which is a portion of the cross-connect switch of FIG. 3 in a second embodiment.
Figure 22:
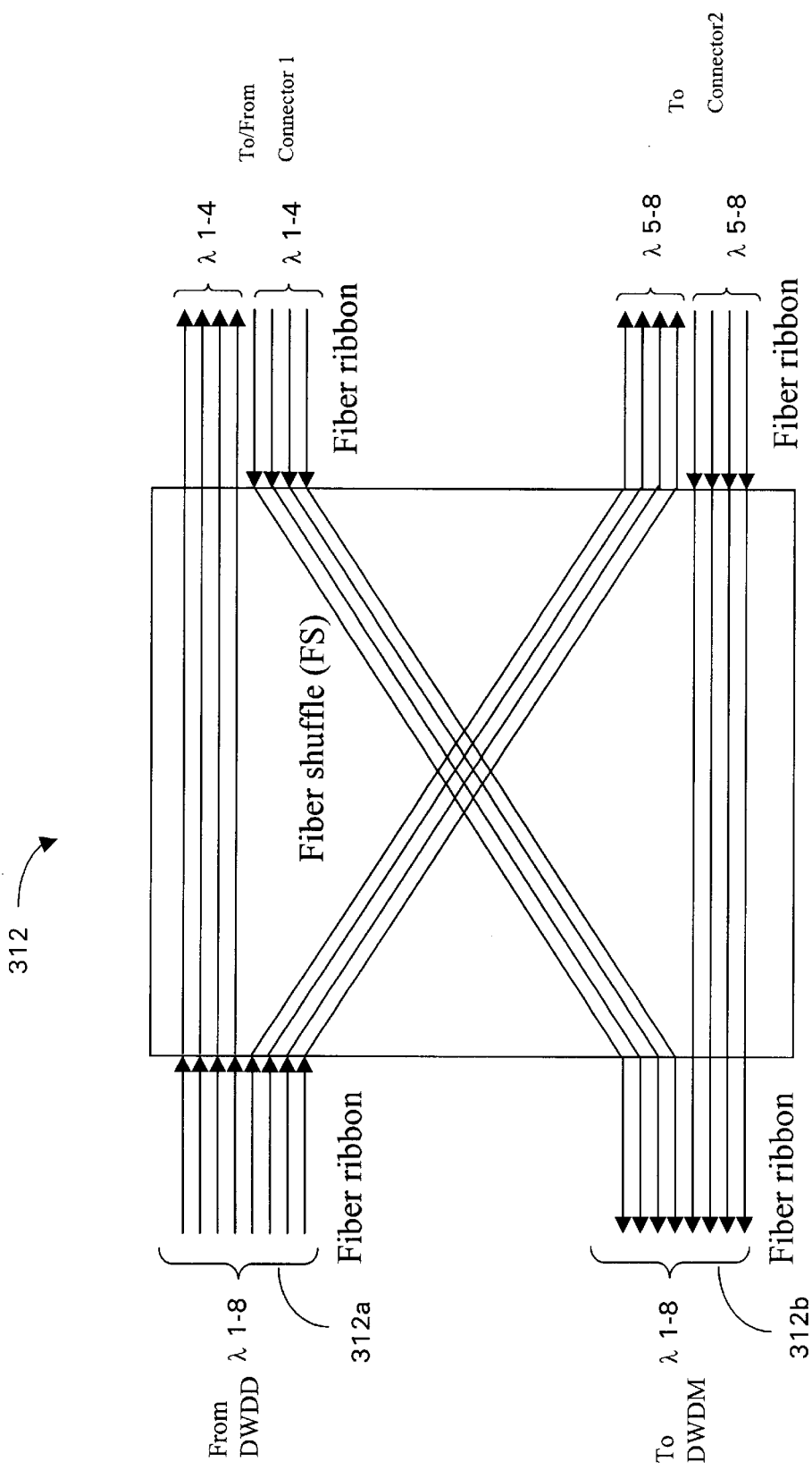
FIG. 22 is a diagram of a fiber shuffle used in the switching shelf of FIG. 21.

FIG. 21 shows a physical arrangement of a switching shelf 310 of the switch 10. In this case the switch 10 has been partitioned into a plurality of switching shelves 310. The physical arrangement of the switch 10 comprising switching shelves will be described later. The switching shelf 310 is similar to the switch 10 of FIG. 16 except that it is configured to handle only 40 channel wavelengths instead of 160, which reduces the demands on technology density for an easier implementation. This reduction in channel wavelengths per shelf 310 also reduces the number of fibers in the optical connectors 208, 218 and the alignment ferrules 210, making the connectors 208,218 easier to manufacture. The switching shelf 310 includes 10 includes ten switching circuit cards 216, with each circuit card 216 having four optical switching matrices on-board. This allows each switching circuit card 216 to switch four channel wavelengths. The WD multiplexer 20 and WD demultiplexer 16, on the I/O circuit card 202, each have a forty-channel wavelength capacity. Five fiber shuffle (FS) modules 312 are included on each I/O circuit card 202 to provide interconnection between the WD multiplexer 20 and WD demultiplexer 16 and the optical connectors 208. Each optical connector 210 is an eight-way ribbon connector. The details of the fiber shuffle module 312 are shown in FIG. 22. The controller circuit card 212 and controller 26 would only control this switching shelf 310 and would provide an interface to a central controller for controlling the entire switch 10.

The card 214 in FIG. 21 could be a wavelength converting switch consisting of a number of receiver and transmitter transponders and an electrical fabric between them. Preferably, it would be an interface and to a centrally located wavelength connecting switch 28 to prevent blocking problems associated with a large number of small switches. Considering the wavelength-converting switch 28 of FIG. 4, the transponder elements 32, 34 would preferably be on the card 214 with the electrical switch 30 in a separate shelf, connected either electrically or via low cost short wavelength, short reach ribbon optics. An optical crosspoint may be included on the card 214 to permit tunable lasers to be connected into various planes as needed, within the wavelength range of each tunable laser. Considering the wavelength-converting switch 28 of FIG. 10, each group of channel converters 80 would be implemented as one card 214. Considering the wavelength-converting switch 28 of FIG. 11, all of the channel convertors 92 would be implemented in a separate shelf, with the card 214 being an interface card with no functionality. Alternatively in the latter case, we may place optical cross-connect elements for OXC_A 100 and OXC_B 104 along with elements for the wavelength converter 108 on each card 214 and create a cabling juncture pattern at interconnect_C 110 between the cards. This would require that interconnects A, B, D (102, 103, and 112) be partitionable into multiple parallel circuit packs.

FIG. 22 illustrates the fiber shuffle module 312. The module 312 is comprised of two fiber ribbon cables 312a and 312b, and has two input ports and two output ports. Each cable 312a, 312b has eight optical fibers and enters a respective input port of the module 312. The module 312 divides the cables so that four fibers from a cable go to one output port and the remaining four fibers go to the other output port. The fiber ribbon cable 312a is for connection of eight channel wavelengths from the WD demultiplexer 16, at the input of the module 312, and for connection of two switching cards 216 at the output of the module. For example, via ribbon cable 312a, channel wavelengths 1 to 8 are coupled from the WD demultiplexer 16 to the first switching circuit card 216, for channel wavelengths 1 to 4, and to the second switching circuit card 216, for channel wavelength 5 to 8. Similarly, via ribbon cable 312b, channel wavelengths 1 to 4, from the first switching circuit card 216, and channel wavelengths 5 to 8, from the second switching circuit card 216, are coupled to the WD multiplexer 20. There are five fiber shuffle modules 312 per I/O circuit card 202 in order to connect the forty channel wavelengths multiplexed/demultiplexed by the card 202 to a respective switching card 216.

Numerous modifications, variations, and adaptations may be made to the particular embodiments of the invention described above without departing from the scope of the invention, which is defined in the claims. For example, the electrical inter-matrix switch 30 in FIG. 4 could be replaced with an optical switch which can be made out of a multi-stage array of MEMS devices since the cross-connect is sitting between transponder banks and is not part of the line system optical reach budget where loss is critical.

The optical loss of a 32×32 MEMS is likely to be about 5–8 dB, so the insertion loss of one pass through a switching matrix 18 does not approach the inter-amplifier link budget (approximately 24 dB).

The plurality of receiver transponders 32 could convert optical signals to short reach optical signals if the output signals of the cross-connect switch 10 are only required to be routed to terminal equipment at the same node.

The leaf springs 234, 243 of the optical connectors 208,218 could be any type of component suitable to provide flexible biasing of the mating inserts 224, 238. For example, coil springs, pads of elastomeric material, or formations of flexibly resilient plastic are a few of the many alternatives that could be used in place of the leaf springs 234, 243.

The slotted through holes 222,242 could be replaced by other mounting means that allow some movement of the optical connector with respect to the circuit card upon which it is mounted in order to align mating faces 226, 240 with the respective sides of the aperture 252. For example, the circuit cards 202,216 could have slotted holes in which pins, bolts, or rivets fastened securely to the optical connectors 208, 218 could move.

We claim:

1. An optical cross-connect switch, comprising:

a plurality of optical switching matrices, each switching matrix having multiple input ports, multiple output ports, at least one inter-matrix input port and at least one inter-matrix output port, each switching matrix being operable to switch an optical channel signal arriving on any input port to either any one of a plurality of the output ports or an inter-matrix output port, and being operable to switch an optical channel signal arriving on any inter-matrix input port to an output port, and each switching matrix being operable to switch optical channel signals having a respective distinct wavelength; and a wavelength-converting inter-matrix switch connected between the inter-matrix output ports of the switching matrices and the inter-matrix input ports of the switching matrices, the wavelength-converting inter-matrix switch being operable to switch a signal arriving from any inter-matrix output port of any switching matrix to an inter-matrix input port of any of a plurality of the other switching matrices and being operable, in switching a first channel signal having a first wavelength from an inter-matrix output port of a first switching matrix to an inter-matrix input port of a second switching matrix, to convert the first channel signal having the first wavelength to a second channel signal having a second wavelength.

2. A cross-connect switch as defined in claim 1, wherein each switching matrix is operable to switch a signal arriving on any input port to any of the output ports.

3. A cross-connect switch as defined in claim 2, wherein each inter-matrix switch is operable to switch a signal arriving from any inter-matrix output port of any switching matrix to an inter-matrix input port of any of the other switching matrices.

4. A cross-connect switch as defined in claim 1, wherein:
each switching matrix has multiple inter-matrix output ports;
the wavelength-converting inter-matrix switch comprises multiple switching elements connected in parallel; and
each inter-matrix output port of a particular switching matrix is coupled to a respective one of the switching elements of the wavelength-converting inter-matrix switch.

5. A cross-connect switch as defined in claim 1, wherein:
the inter-matrix switch comprises at least one add input port and at least one drop output port;
the inter-matrix switch is operable to couple an add input signal arriving at the add input port to an inter-matrix input port of any switching matrix; and
the inter-matrix switch is operable to couple a signal arriving from an inter-matrix output port of any switching matrix to the drop output port.

6. A cross-connect switch as defined in claim 1, further comprising:
a plurality of wavelength division demultiplexers, each demultiplexer being operable to separate an optical input signal into a plurality of output channel signals having respective distinct wavelengths and to apply each output channel signal to a respective input port of a respective switching matrix such that each switching matrix receives only channel signals having a respective distinct wavelength;
a plurality of wavelength division multiplexers, each multiplexer having a plurality of inputs, each respective input of each multiplexer being coupled to an output port of a respective switching matrix to receive a respective channel signal having a respective wavelength, each multiplexer being operable to combine channel signals having distinct wavelengths into an optical output signal.

7. A cross-connect switch as defined in claim 1, wherein the wavelength-converting inter-matrix switch comprises:
multiple optical receivers coupled to inter-matrix output ports of the switching matrices, the optical receivers being operable to convert channel signals arriving from the inter-matrix output ports to electrical signals;
multiple optical transmitters coupled to the inter-matrix input ports of the switching matrices, the optical transmitters being operable to convert electrical signals to channel signals having predetermined wavelengths; and
an electrical switch connected between the optical receivers and the optical transmitters, the electrical switch being operable to switch an electrical signal from any optical receiver to any of a plurality of the optical transmitters.

8. A cross-connect switch as defined in claim 7, wherein the electrical switch is operable to switch an electrical signal from any optical receiver to any optical transmitter.

9. A cross-connect switch as defined in claim 1, wherein:
the wavelength-converting inter-matrix switch comprises an optical switch and a plurality of optical transponders connected to the switch;
each optical transponder is operable to convert a channel signal having a first wavelength into a channel signal having a second wavelength; and
the optical switch is operable to couple a channel signal arriving from an inter-matrix output port of any switching matrix to an inter-matrix input port of any of a plurality of other switching matrices via an optical transponder.

10. A cross-connect switch as defined in claim 9, wherein the optical switch is operable to couple a channel signal arriving from an inter-matrix output port of any switching matrix to an inter-matrix input port of any other switching matrix via a transponder.

11. A cross-connect switch as defined in claim 9, wherein the optical switch is coupled between the inter-matrix output ports and the optical transponders.

12. A cross-connect switch as defined in claim 9, wherein the optical switch comprises plural optical switching stages and the optical transponders are coupled between optical switching stages.

13. A cross-connect switch as defined in claim 12, wherein the optical switch comprises a multistage CLOS switch.

14. A cross-connect switch as defined in claim 9, wherein at least one optical transponder is a tunable optical transponder that is tunable to transmit channel signals of selectable distinct wavelengths.

15. A cross-connect switch as defined in claim 9, wherein at least one optical transponder is a fixed wavelength transponder that is operable to transmit channel signals of a single wavelength.

16. An optical switching matrix, comprising first and second pairs of switching elements and a plurality of optical combiners;
each pair of switching elements comprising a first switching element and a second switching element;
each switching element comprising:
a rectangular substrate having a plurality of input ports on a first side, a first plurality of output ports on a second side opposite the first side and a second plurality of output ports on a third side adjacent the first side and the second side; and
a plurality of optical diverters aligned between each input port and a corresponding output port on the second side, each diverter being aligned with a respective output port on the third side and being movable from a first position, in which the diverter allows an optical signal incident from the input port to propagate in a direction toward the respective output port on the second side, to a second position, in which the diverter diverts an optical signal incident from the input port toward a respective output port on the third side;
for each of the first and second pairs of switching elements, each input port of the second optical switching element being optically coupled to a respective output port of the first optical switching matrix; and
each combiner being coupled to a respective output port of the first pair of optical switching elements and to a respective output port of the second pair of optical switching elements.

17. An optical switching matrix as defined in claim 16, wherein each combiner is coupled to the respective output port of the first pair of optical switching elements via a first respective WDM multiplexer and is coupled to the respective output port of the second pair of optical switching elements via a second respective WDM multiplexer.

18. A wavelength-converting switch for interconnecting optical switching matrices of an optical cross-connect switch, each optical switching matrix having an inter-matrix input port and an inter-matrix output port, the wavelength-converting switch comprising an optical switch and a plurality of optical transponders connected to the switch:

each optical transponder being operable to convert a channel signal having a first wavelength into a channel signal having a second wavelength; and the optical switch being operable to couple a channel signal arriving from an inter-matrix output port of any switching matrix to an inter-matrix input port of any of a plurality of other switching matrices via an optical transponder.

19. A wavelength-converting switch as defined in claim 18, wherein the optical switch is operable to couple a channel signal arriving from an inter-matrix output port of any switching matrix to an inter-matrix input port of any other switching matrix via a transponder.

20. A wavelength-converting switch as defined in claim 18, wherein the optical switch is coupled between the inter-matrix output ports and the optical transponders.

21. A wavelength-converting switch as defined in claim 18, wherein the optical switch comprises plural optical switching stages and the optical transponders are coupled between optical switching stages.

22. A wavelength-converting switch as defined in claim 21, wherein the optical switch comprises a multistage CLOS switch.

23. A wavelength-converting switch as defined in claim 18, wherein at least one optical transponder is a tunable optical transponder that is tunable to transmit channel signals of selectable distinct wavelengths.

24. A wavelength-converting switch as defined in claim 18, wherein at least one optical transponder is a fixed wavelength transponder that is operable to transmit channel signals of a single wavelength.

25. A switching fabric for an optical cross-connect switch, the switching fabric comprising a plurality of optical switching matrices, each switching matrix:

having multiple inter-node input ports and at least one intra-node input port for receiving incoming optical channel signals, the incoming optical channel signals having a wavelength that is particular to that particular switching matrix;

having multiple inter-node output ports and at least one intra-node output port; and being operable to switch optical channel signals arriving on any input port to any of a plurality of the inter-node output ports and the intranode output port.

26. A switching fabric as defined in claim 25, wherein each switching matrix is operable to switch optical channel signals arriving on any input port to any of the output ports.

27. A switching fabric as defined in claim 25, further comprising:

a plurality of wavelength division demultiplexers, each demultiplexer being operable to separate an optical input signal into a plurality of output channel signals having respective distinct wavelengths and to apply each output channel signal to a respective inter-node input port of a respective switching matrix such that each switching matrix receives only channel signals having the respective wavelength that is particular to that switching matrix;

a plurality of wavelength division multiplexers, each multiplexer having a plurality of inputs, each respective input of each multiplexer being coupled to an inter-node output port of a respective switching matrix to receive a respective channel signal having a respective wavelength, each multiplexer being operable to combine channel signals having distinct wavelengths into an optical output signal.

28. A switching fabric as defined in claim 25, further comprising an add/drop multiplexer coupled to the intra-node input port and intranode output port of each switching matrix and being operable:

to couple, to the intra-node input port of any switching matrix of the plurality of switching matrices, optical channel signals having the wavelength that is particular to that switching matrix; and to receive, from the intra-node output port of any switching matrix of the plurality of switching matrices, optical channel signals having the wavelength that is particular to that switching matrix.

29. A method of cross-connecting optical channel signals at an optical cross-connect switch comprising a plurality of switching matrices, each switching matrix having input ports including at least one inter-node input port and at least one intra-node input port, each switching matrix having output ports including at least one inter-node output port and at least one intra-node output port, wherein the intra-node output ports are coupled to the intra-node input ports, the method comprising:

coupling each optical channel signal having a particular wavelength to an input port of a particular switching matrix assigned to that particular wavelength; and switching the optical channel signal in the particular switching matrix to either an inter-node output port or an intra-node output port selected according to a desired crossconnection of the optical channel signal.

30. A method as defined in claim 29, wherein the step of switching the optical channel signal comprises switching the optical channel signal to an inter-node output port of the particular switching matrix when the optical channel signal is to be cross-connected to an optical channel having the same particular wavelength.

31. A method as defined in claim 29, wherein the step of switching the optical channel signal comprises switching the optical channel signal to an intra-node output port of the particular switching matrix when the optical channel signal is to be cross-connected to an optical channel having a wavelength other than the particular wavelength of the optical signal.

32. A method as defined in claim 31, further comprising:

coupling the optical signal from the intra-node output port to a wavelength converter;

converting the optical signal to an optical channel signal having another wavelength;

coupling the optical signal at the other wavelength to an intra-node input port of another switching matrix, the other switching matrix being assigned to that other wavelength; and switching the optical channel signal in the other switching matrix to an output port selected according to the desired cross-connection of the optical channel signal.

33. A method as defined in claim 29, wherein the step of switching the optical channel signal comprises switching the optical channel signal to an intra-node output port of the particular switching matrix when the optical channel signal is to be dropped at the cross-connect switch.

34. An optical network comprising at least one optical cross-connect switch of claim 1, wherein optical fibers couple the optical switching matrices to the optical network via the input and output ports.

35. An optical network comprising at least one optical cross-connect switch of claim 6, wherein optical fibers couple the wavelength division multiplexers and demultiplexers to the optical network for respectively transmitting and receiving said optical output and optical input signals.

36. The optical cross-connect switch of claim 4, wherein:
   said switching elements are oriented into a first set of parallel planes;
   said switching matrices are oriented into a second set of parallel planes that are orthogonal to the first set of parallel planes; and
   each switching matrix of the second set of parallel planes is optically interconnected with each switching element of the first set of parallel planes.

37. A method of upgrading an optical cross-connect switch having a plurality of switching matrices, each switching matrix assigned to -a respective channel wavelength and having multiple input and output ports, the method comprising the steps of:
   providing each switching matrix with an expansion port;
   providing a plurality of extension switching matrices, each extension switching matrix having multiple input and output ports; and
   coupling a respective extension switching matrix to each switching matrix, via said expansion port and at least one of the input ports of the respective extension switching matrix, to form a plurality of expanded switching matrices.

38. The method of claim 37, further comprising the steps of:
   providing another optical cross-connect switch having a plurality of said expanded switching matrices; and
   coupling each output port of an expanded switching matrix of the optical cross-connect switch to a respective output port of an expanded switching matrix of the another optical cross-connect switch.

39. A cross-connect switch as defined in claim 1, wherein each switching matrix is operable to switch a signal arriving on any input port to any of a plurality of the inter-matrix output ports.

40. A cross-connect switch as defined in claim 1, wherein each switching matrix is operable to switch a signal arriving on any inter-matrix input port to any of a plurality of the inter-matrix output ports and any of a plurality of the output ports.

* * * * *